United States Patent
Bao et al.

(10) Patent No.: US 9,254,606 B2
(45) Date of Patent: Feb. 9, 2016

(54) NANOSCALE FIBER FILMS, COMPOSITES, AND METHODS FOR ALIGNMENT OF NANOSCALE FIBERS BY MECHANICAL STRETCHING

(75) Inventors: Jianwen Bao, Beijing (CN); Zhiyong Liang, Tallahassee, FL (US); Ben Wang, Tallahassee, FL (US); Chun Zhang, Tallahassee, FL (US); Qunfeng Cheng, Tallahassee, FL (US)

(73) Assignee: FLORIDA STATE UNIVERSITY RESEARCH FOUNDATION, Tallahassee, FL (US)

( * ) Notice: Subject to any disclaimer, the term of this patent is extended or adjusted under 35 U.S.C. 154(b) by 895 days.

(21) Appl. No.: 12/690,558

(22) Filed: Jan. 20, 2010

(65) Prior Publication Data
US 2010/0227155 A1 Sep. 9, 2010

Related U.S. Application Data

(60) Provisional application No. 61/145,849, filed on Jan. 20, 2009.

(51) Int. Cl.
*B29C 55/02* (2006.01)
*B29C 55/04* (2006.01)
*B29C 70/14* (2006.01)
*B29K 105/16* (2006.01)
*B29K 105/24* (2006.01)

(52) U.S. Cl.
CPC ............... *B29C 55/04* (2013.01); *B29C 70/14* (2013.01); *B29K 2105/162* (2013.01); *B29K 2105/167* (2013.01); *B29K 2105/243* (2013.01); *Y10T 156/1002* (2015.01); *Y10T 428/25* (2015.01)

(58) Field of Classification Search
CPC ........................................................ B29C 55/02
USPC .................................................................. 264/291
See application file for complete search history.

(56) References Cited

U.S. PATENT DOCUMENTS

| | | | |
|---|---|---|---|
| 6,036,857 A | 3/2000 | Chen et al. | |
| 6,436,221 B1 | 8/2002 | Chang et al. | |
| 6,555,945 B1 * | 4/2003 | Baughman et al. | 310/300 |
| 7,459,121 B2 | 12/2008 | Liang et al. | |
| 7,641,829 B2 | 1/2010 | Liang et al. | |
| 2002/0098135 A1 | 7/2002 | Smalley et al. | |

(Continued)

FOREIGN PATENT DOCUMENTS

WO 0130694 A1 5/2001

OTHER PUBLICATIONS

Ajayan, et al. "Aligned carbon nanotube arrays formed by cutting a polymer resin-nanotube composite," Science, vol. 265, pp. 1212-1214 (Aug. 26, 1994).

(Continued)

*Primary Examiner* — Christina Johnson
*Assistant Examiner* — Xue Liu
(74) *Attorney, Agent, or Firm* — Sutherland Asbill & Brennan LLP

(57) ABSTRACT

Methods for aligning nanoscale fibers are provided. One method comprises providing a network of nanoscale fibers and mechanically stretching the network of nanoscale fibers in a first direction. The network of nanoscale fibers is substantially devoid of a liquid. A network of aligned nanoscale fibers and a composite comprising a network of aligned nanoscale fibers are also provided.

12 Claims, 50 Drawing Sheets

(56) References Cited

U.S. PATENT DOCUMENTS

| | | | |
|---|---|---|---|
| 2003/0146529 A1 | 8/2003 | Chen et al. | |
| 2004/0065969 A1 | 4/2004 | Chatterjee et al. | |
| 2007/0176319 A1 | 8/2007 | Thostenson et al. | |
| 2007/0243124 A1* | 10/2007 | Baughman et al. | 423/447.1 |
| 2008/0018012 A1* | 1/2008 | Lemaire et al. | 264/82 |
| 2008/0048364 A1* | 2/2008 | Armeniades et al. | 264/328.1 |
| 2008/0170982 A1* | 7/2008 | Zhang et al. | 423/447.3 |
| 2008/0280115 A1 | 11/2008 | Liang et al. | |
| 2009/0075545 A1 | 3/2009 | Lashmore et al. | |

OTHER PUBLICATIONS

Ajayan, et al. "Single-walled carbon nanotube-polymer composites: strength and weakness," Advanced Materials 12:750-753 (2000).

Andrews, et al. "Nanotube composite carbon fibers," Applied Physics Letters, 75(9) pp. 1329-1331 (Aug. 30, 1999).

Atkinson, Ken, et al. "Multifunctional carbon nanotube yarns by downsizing an ancient technology," Science 306, 2004, 1358-1361.

Chauvet, et al. "Magnetic anisotropies of aligned carbon nanotubes," The American Physical Society, 52(10): pp. 6963-6966 (Sep. 1, 2005).

Chen, et al. "Electrochemical synthesis of polypyrrole/carbon nanotube nanoscale composites using well-aligned carbon nanotube arrays," Applied Physics A, vol. 73, pp. 129-131 (2001).

Cheng, Qunfeng, et al. "High mechanical performance composite conductor: multi-walled carbon nanotube sheet/bismaleimide nanocomposites," Adv. Funct. Mat. 19, 2009, 3219-3225 (published by Wiley-VCH Verlag GmbH & Co.).

Cooper, et al. "Distribution and alignment of carbon nanotubes and nanofibrils in a polymer matrix," Composites Science and Technology 62:1105-1112 (2002).

Dai, "Carbon nanotubes: opportunities and challenges," Surface Science 500 (2002), pp. 218-241.

De Heer, et al. "Aligned carbon nanotube films: production and optical and electronic properties," Science 268:845-847 (1995).

Dresselhaus, et al., Graphite Fiber and Filament (M. Cardon, Ed.) pp. 12-34 (Springer, Berlin 1988).

Ericson, L. M. et al. "Macroscopic, neat, single-walled carbon nanotube fibers," Science, 305, 2004, 1447-1450 (published by the American Association for the Advancement of Science).

Fan, et al. "Self-oriented regular arrays of carbon nanotubes and their field emission properties," Science 283:512-514 (1999).

Fujiwara, et al. "Magnetic orientation and magnetic properties of a single carbon nanotube," The Journal of Physical Chemistry, 105(18): pp. 4383-4386 (May 10, 2001).

Garg, et al. "Effect of chemical functionalization on the mechanical properties of carbon nanotubes," Chemical Physics Letters, 295(4): pp. 273-278 (Oct. 16, 1998). Abstract.

Gou, et al. "Development of nanotube bucky paper/epoxy nanocomposites," Proceedings of the TEXCOMP-6 International Symposium on Textile Composites, Sep. 11-13, 2002, pp. 1-5.

Gou, et al. "Process analysis and optimization of SWNT bucky paper reinforced epoxy composites," Proceedings of the 48th International Society for Advancement of Material Process Engineering (SAMPE) Symposium and Exhibition, Long Beach, CA May 12-14, 2003, pp. 1-12.

Hertel, et al. "Deformation of carbon nanotubes by surface van der Waals forces," Physical Review B. 58:13870-13873 (1998).

Holloway, et al. "Texture development due to preferential grain growth of Ho—Ba—Cu—O in 1.6-T magnetic field," J. Mat. Res. 8:727-733 (Apr. 1993).

Jiang, K. et al. "Nanotechnology: spinning continuous carbon nanotube yarns," Nature, 419, 2002, 801 (published by Nature Publishing Group, a division of Macmillan Publishers Ltd.).

Knez, et al. "Electrochemical modification of individual nano-objects," Journal of Electroanalytical Chemistry, vol. 522: pp. 70-74 (2002).

Kumar, et al. "Fibers from polypropylene/nano carbon fiber composites," Polymer 43:1701-1703 (2002).

Kyotani, et al. "Preparation of ultrafine carbon tubes in nanochannels of an anodic aluminum oxide film," Chem. Mater. 8:2109-2113 (1996).

Li, et al. "Large-scale synthesis of aligned carbon nanotubes," Science 274:1701-1703 (1996).

Lourie, et al. "Evaluation of Young's modulus of carbon nanotubes by micro-Raman spectrscopy," Journal of Materials Research, 13(9): pp. 2418-2422 (Sep. 1998).

Ni, et al. "Chemical functionalization of carbon nanotubes through energetic radical collisions," Physical Review B. 61: R16343-R16346 (2000).

Qian, et al. "Load transfer and deformation mechanisms in carbon nanotube-polystyrene composites," Applied Physics Letters, 76(20): pp. 2868-2870 (May 15, 2000).

Smith, et al. "Structural anisotropy of magnetically aligned single wall carbon nanotube films," Applied Physics Letters, 77(5): pp. 663-665 (Jul. 31, 2000).

Stephan, et al. "Characterization of singlewalled carbon nanotubes—PMMA composites," Synthetic Metals, 108(2): pp. 139-149 (Jan. 17, 2000). Abstract.

Treacy, et al. "Exceptionally high Young's Modulus observed for individual carbon nanotubes," Nature 381:678-680 (1996).

Velasco-Santos, et al. "Chemical functionalization of carbon nanotubes through an organosilane," Nanotechnology 13:495-498 (2000).

Wang, Z. et al. "Processing and property investigation of single-walled carbon nanotube (SWNT) buckypaper/epoxy resin matrix nanocomposites," Composites Part A: Applied Science and Manufacturing, 35, 2004, 1225-1232 (published by Elsevier Ltd.).

Wang, S. et al. "Controlled nanostructure and high loading of single-walled carbon nanotubes reinforced polycarbonate composite," Nanotech. 18, 2007, 095708 (published by IOP Publishing).

Wang, et al. "Fabrication and characterization of in-plan aligned nanotube composites with magnetically aligned carbon nanotube bucky papers," Proc. 14th Int. Conf. on Composite Materials (ICCM-14), 1 (San Diego, CA, Jul. 14-18), (2003) pp. 1-7.

Wang, et al. "Growth and characterization of buckybundles," Applied Physics Letters, 62(16): pp. 1881-1883 (Apr. 19, 1993).

Wang, S. et al. "High-strength and multifunctional macroscopic fabric of single-walled carbon nanotubes," Adv. Mat. 19, 2009, 1257-1261 (published by John Wiley & Sons, Inc.).

Wood, et al. "Orientation of Carbon Nanotubes in Polymers and its Detection by Raman Spectroscopy," Composites: Part A 32:391-399 (2001).

* cited by examiner (A) (B)

(C) (D)

NANOSCALE FIBER FILMS, COMPOSITES, AND METHODS FOR ALIGNMENT OF NANOSCALE FIBERS BY MECHANICAL STRETCHING

CROSS-REFERENCE TO RELATED APPLICATIONS

This application claims benefit of U.S. Provisional Application No. 61/145,849, filed Jan. 20, 2009, which is incorporated herein by reference.

STATEMENT REGARDING FEDERALLY SPONSORED RESEARCH OR DEVELOPMENT

This invention was made with U.S. government support under Contract No. FA9550-05-1-0271 awarded by the Air Force Office of Scientific Research and Contract No. NOOI4-08-M-0348 awarded by the Office of Navel Research STTR Program. The U.S. government has certain rights in the invention.

BACKGROUND OF THE INVENTION

This invention relates generally to nanoscale fibers, and more particularly to methods for aligning carbon nanotubes or other nanoscale fibers to a high degree of alignment in the production of buckypaper composite materials.

Carbon nanotubes and nanofibers have both rigidity and strength properties, such as high elasticity, large elastic strains, and fracture strain sustaining capabilities. Such a combination of properties is generally not present in conventional materials. In addition, carbon nanotubes and nanofibers are some of the strongest fibers currently known. For example, the Young's Modulus of single-walled carbon nanotubes can be about 1 TPa, which is about five times greater than that for steel (about 200 GPa), yet the density of the carbon nanotubes is about 1.2 $g/cm^3$ to about 1.4 $g/cm^3$. The tensile strength of single-walled carbon nanotubes is generally in the range of about 50 GPa to about 200 GPa. This tensile strength indicates that composite materials made of carbon nanotubes and/or nanofibers could likely be lighter and stronger as compared to current high-performance carbon fiber-based composites.

In addition to their exceptional mechanical properties, carbon nanotubes and nanofibers may provide either metallic or semiconductor characteristics based on the chiral structure of fullerene. Some carbon nanotubes and nanofibers also possess superior thermal and electrical properties such as thermal stability up to about 2800° C. in a vacuum and about 750° C. in air, thermal conductivity about twice as much as that of diamond, and an electric current carrying capacity about 1000 times greater than that of copper wire. Therefore, carbon nanotubes and nanofibers are regarded as one of the most promising reinforcement materials for the next generation of high-performance structural and multifunctional composites.

Thin films or sheets of nanoscale fiber networks, or buckypapers (BP), offer a promising platform to fabricate high-performance nanoscale fiber composites because BPs are easy to handle during fabrication of the composite, and thus, may be incorporated into conventional composites processing to fabricate nanocomposites.

Nanoscale fibers have both exceptional mechanical and functional properties, which conventional macroscopic carbon fibers do not offer. However, four main factors tend to affect the performance of nanocomposites: 1) nanoscale fiber dispersion, 2) nanoscale fiber alignment, 3) interface bonding between the nanoscale fibers and the composite matrix, and 4) aspect ratio of the nanoscale fibers. For instance, the composite nanoscale fiber loading may be too low (less than 20 wt %), there may be a lack of adequate nanoscale fiber alignment, or the smaller aspect ratios of nanoscale fibers such as CNTs (less than 10,000) may result in poor load transfer between the matrix and CNTs when the composites are under loads.

Methods for aligning nanoscale fibers such as carbon nanotubes include magnetic field-induced alignment, mechanical stretching of synthesized nanotube forests, shear force-induced alignment, AC electric field alignment, electrospinning, and electrophoretic alignments during nanotube composite fabrication. However, the loose and weakly bonded structures of nanotube networks make it difficult to uniformly transfer force throughout nanotube networks, thus hindering the development of practical methods to further improve nanoscale fiber alignment in BP through mechanical stretching to achieve a high degree of alignment (e.g., greater than 20%).

It would therefore be desirable to provide improved nanotube alignment techniques for alignment of nanoscale fibers in BP.

SUMMARY OF THE INVENTION

A method for aligning carbon nanotubes or other nanoscale fibers is provided. In one aspect, the method comprises providing a network of nanoscale fibers substantially devoid of a liquid and mechanically stretching the network of nanoscale fibers in a first direction. In one embodiment, the network is a buckypaper. In certain embodiments, the method further comprises providing a supporting medium on or in the network of nanoscale fibers before the step of mechanically stretching. The step of mechanically stretching stretches the network of nanoscale fibers and the supporting medium in a first direction.

In some embodiments, the nanoscale fibers comprise carbon nanotubes. In one embodiment, the carbon nanotubes have an average length of at least 1 millimeter.

In another aspect, a method for aligning carbon nanotubes or other nanoscale fibers comprises providing a network of nanoscale fibers, providing a supporting medium on or in the network of nanoscale fibers, and mechanically stretching the network of nanoscale fibers and the supporting medium in a first direction. In one embodiment, the network is substantially devoid of a liquid.

In certain embodiments, the supporting medium comprises a flexible thermoplastic material. In one embodiment, the flexible thermoplastic material comprises a polyethylene film.

In particular embodiments, the method further comprises, after the step of stretching, removing the supporting medium from the network of nanoscale fibers. In some embodiments, the step of removing comprises thermally decomposing the supporting medium. In one embodiment, the method further comprises annealing the supporting medium before the step of thermally decomposing.

In yet another aspect, a method for making a composite material is provided. The method comprises providing a network of nanoscale fibers, mechanically stretching the network of nanoscale fibers in a first direction to form a network of aligned nanoscale fibers, and incorporating the network of aligned nanoscale fibers onto or into a matrix material.

In another aspect, an article comprising a network of nanoscale fibers is provided. The network has been mechanically stretched to align at least a portion of the nanoscale fibers and the network has a Young's modulus ranging from 5

GPa to 25 GPa, in the direction of the nanoscale fiber alignment. In particular embodiments, the network has a tensile strength ranging from 200 MPa to 668 MPa in the direction of the nanoscale fiber alignment.

DESCRIPTION OF THE INVENTION

Figure 1:
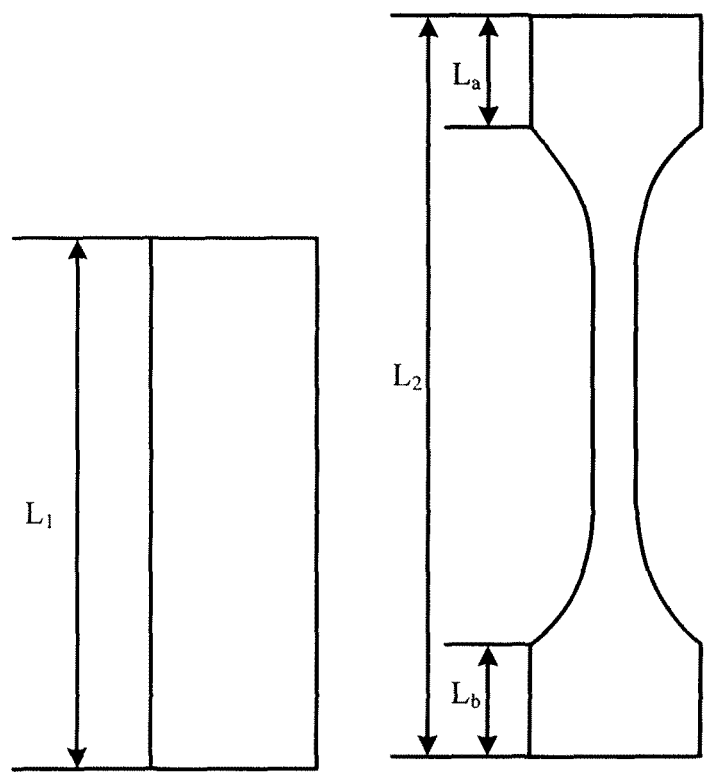
FIG. 1 illustrates an embodiment of an unstretched and stretched buckypaper labeled with notations for calculating stretching ratio according to Equation 1.

Methods have been developed for inducing a selected orientation of nanoscale fibers by mechanical stretching of buckypapers and/or nanoscale fiber composites that include a thermoplastic film. Buckypapers comprising aligned nanoscale fibers, and composites comprising the same, are also provided. In one aspect, the methods use a supporting medium, such as a flexible polymer film, to protect and support nanotube networks in a buckypaper during a mechanical stretching process to further increase nanotube alignment. The supporting medium effectively transfers the stretching load to the buckypaper nanotube network uniformly so that the BP does not break under high stretching strains (e.g., stretching strains for achieving a high degree of alignment). As used herein, "degree of alignment" refers to the percentage of nanoscale fibers in the network which is aligned in a particular direction of alignment. The degree of alignment may be calculated using Raman spectrometer, X-ray defraction, or any other methods known in the art.

In certain embodiments, the methods may mechanically stretch a buckypaper without using a supporting medium. No liquid treatment (e.g., solvent or surfactant treatment) of the buckypaper or network is necessary to achieve alignment of the nanoscale fibers. These methods rely on relatively simple mechanical force, requiring inexpensive materials and equipment to achieve a high degree of nanoscale fiber alignment in the buckypaper, which can lead to inexpensive future scaling-up and commercialization.

Since nanotubes are highly anisotropic in nature, the alignment of nanotubes in buckypaper is desirable for achieving strong mechanical properties and high electrical and thermal conductivity. In addition, alignment of nanoscale fibers, such as nanotubes, in buckypaper is desirable for utilizing the exceptional mechanical properties of nanotubes along their axial direction. Furthermore, enhanced contact efficiency between the nanotubes allows for realization of more self-assembly and high density packing of the nanotubes, thereby providing improved load transfer in the composites.

Aligned buckypaper can be impregnated by thermosetting and/or thermoplastic resins, such as epoxy, for fabricating nanocomposites. Use of the aligned BP in composites facilitates realizing the full potential of carbon nanotubes or nanofiber buckypaper for high mechanical performance and multifunctional applications, such as lightweight high-performance structural materials, electromagnetic interference shielding materials, and thermal management materials, and other applications.

Methods of Nanotube Alignment and Composite Production

In some embodiments, the method for aligning nanoscale fibers includes providing a network of nanoscale fibers and mechanically stretching the network of nanoscale fibers in a first direction. The network of nanoscale fibers is substantially devoid of a liquid. As seen herein, "substantially devoid of a liquid" means the network comprises liquid in an amount less than about 10 wt % of the network, typically less than about 1 wt %, 0.1 wt %, or 0.01 wt %.

Without being bound by a particular theory, the frictional forces or similar forces between nanoscale fibers in the network films or buckypapers that are substantially devoid of a liquid act to distribute the mechanical stretching force more uniformly throughout the network. Thus, the films and buckypapers remain intact at high stretching strains. The absence of a liquid or a lubricant would reduce the effectiveness of the load transfer due to the frictional forces between the nanoscale fibers.

In one embodiment, the network of nanoscale fibers is devoid of solvent or surfactants during the step of mechanically stretching.

As used herein, "mechanically stretching" or "mechanically stretch" refers to treatment of sheets of networks of fibers or buckypapers by pulling or applying mechanical loads to the sheets in opposed or offset directions. For example, the sheets could be mechanically stretched by passing the sheets between rollers set a different speeds such that one roller set at a relatively slower rotational speed "holds" the sheet and the other side set at a relatively faster rotational speed "stretches" the sheet. In certain embodiments, a multiple stage roll stretching machine may be used to for a continuous process of mechanically stretching buckypaper.

In one embodiment, a buckypaper is stretched using a Shimadzu machine. In such embodiments, the stretching ratio (or stretch ratio, $\Delta\%$) of BP samples was calculated by Equation 1.

$$\Delta\% = \frac{L_2 - L_1}{L_1 - L_a - L_b} \times 100\%. \qquad \text{Equation 1}$$

Where $L_1$, and $L_2$ are length of a BP strip before and after stretching, $L_a$ and $L_b$ are the lengths of the segments held by the stretching clamp as shown in FIG. 1. It should be understood that Equation 1 can be used as stated, or modified to suit the buckypaper shape and the particular process used to stretch the buckypaper.

Figure 2:
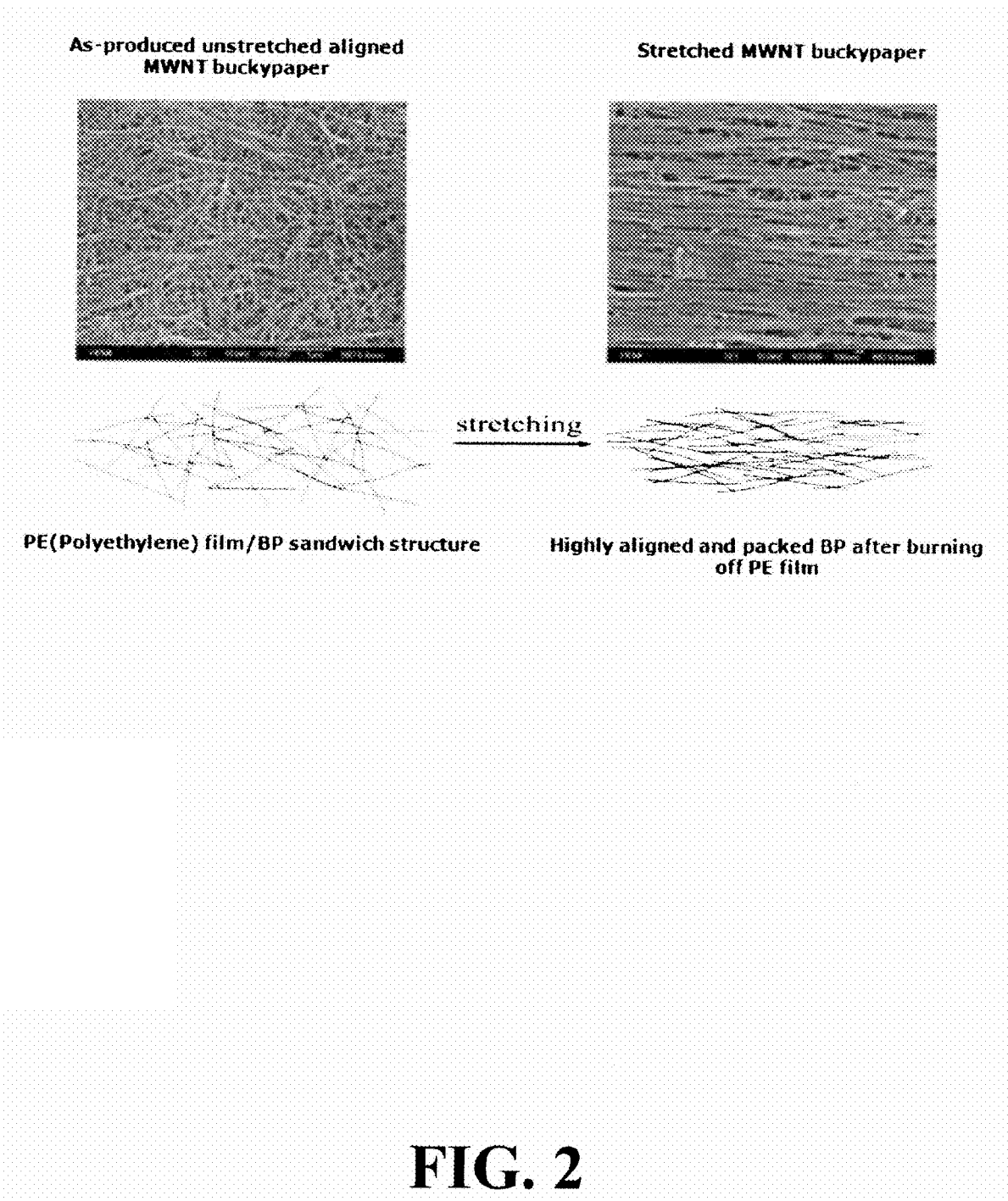
FIG. 2 illustrates an embodiment of a method for mechanically stretching nanotube buckypaper in SEM micrographs and in an analogous schematic representation.

In certain embodiments, a buckypaper and supporting media are stretched together to align the nanoscale fibers of the buckypaper. In one embodiment, the flexible thermoplastic films (i.e., plastic films) are used as supporting media sandwiching a buckypaper to form a thermoplastic/nanotube composite film with the aid of heat and pressure. For example, the supporting media and BP sandwich may be compressed using in a vacuum bag and heated to form a composite film. Then, the composite film is mechanically stretched. FIG. 2 illustrates an embodiment of a method for mechanically stretching nanotube buckypaper in SEM micrographs and in an analogous schematic representation.

In some embodiments, the composite film may be heated prior to and/or during the stretching step, to enhance stretching without breakage.

During stretching, the supporting media hold and bring the nanotubes closer together in the nanotube network to induce nanotube alignment along the stretching direction. The supporting media uniformly transfer the stretching force to the nanotubes in the buckypaper to realize alignment and avoid nanotube network breakdown.

In one embodiment, the composite film may be burned off (e.g., in a furnace) after being stretched. As used herein, "burned" or "burning" refers to the thermal decomposition, melting, or degradation of the supporting media. In other embodiments, a solvent may be used to dissolve and wash out the supporting medium (e.g., a polymer supporting medium).

In particular embodiments, the BP/supporting media composite may be annealed to prevent the composite from shrinking at high temperatures (e.g., during the burning off of the supporting media). Shrinking of the composite would undesirably affect the alignment of the stretched BP. In one embodiment, a BP/polyethylene (PE) film supporting media composite is annealed in a vacuum bag at 90-100° C. for 10 minutes. Without being bound by a particular theory, the annealing disorients the PE molecules, which were previously oriented during the stretching process, to prevent shrinking of the PE film at high temperatures.

Using a supporting medium for the BP stretching process provides particular advantages. First, the supporting medium protects and holds the nanotube network together during stretching, as interactions among nanotubes in the BP may be weak, such that the nanotube network may break down during stretching and cannot transfer the stretching load uniformly throughout entire nanotube networks. In addition, the supporting medium may provide a force to hold the nanotube network to avoid the BP breaking down due to local nanotube slippage during stretching.

When a polymeric supporting medium is used, the polymer may be infused into the nanotube network so that the loading can be transferred more uniformly to the nanotube network and result in an even deformation of the BP during the stretching process. Therefore, in sandwich composites, supporting medium provide a large deformation capability and a uniform transfer of stretching load to the entire nanotube network to induce nanotube alignment.

Some supporting medium, such as PE, also do not strongly interact and adhere with nanotubes due to the non-reactive natures of both molecules.

In addition, supporting media used in some embodiments may have high breaking strain (e.g., more than several hundred percent). For instance, a large stretching ratio (>20%) may be realized in a PE/BP composite film to achieve a high degree of nanotube alignment.

In addition, certain supporting media may be easily thermally decomposed by heating, leaving almost no residue on the buckypaper, thus resulting in thermally stable materials. Therefore, purification of the stretched BP materials may be achieved by simple thermal burning processes.

In one embodiment, a method is provided that includes using PE polymer as a supporting medium in a PE/BP composite, mechanically stretching the PE/BP composite, and then burning the PE/BP composite to remove the PE polymer from the stretched BP/PE composite film to obtain purified BP with improved nanotube alignment.

In certain embodiments, the stretching deformation is irreversible because the original nanoscale fiber entanglements have been changed due to the stretching force, and the nanoscale fibers self-assemble into an aligned assembly due to van der Waals interaction. Hence, in particular embodiments there is no retraction of the BP after stretching.

Embodiments of the methods have an excellent potential for use in the mass production of high-performance nanotube and nanofiber-reinforced polymer composites. In some embodiments, the aligned buckypapers undergo composite fabrication processes for making final composites, such as vacuum-assisted resin transfer molding (VARTM), resin transfer molding (RTM), vacuum infusion process (VIP), autoclave/prepreg process, carbon-carbon impregnation, or a combination thereof.

In addition to using mechanically stretched buckypaper to provide aligned nanoscale fibers in composites, the methods described herein also provide high loading and larger aspect ratios. Without being bound by a particular theory, the effect of nanoscale fiber orientation on the mechanical properties of BP composites is significant because the orientation of the nanotubes allows for control of the contact efficiency, and thus the efficiency of load transfer, between the relatively rigid neighboring nanotubes. Specifically, the mechanically stretched buckypaper provides nanoscale fibers in a more compacted form, as well being comprised of longer networks of nanoscale fibers which are capable of being stretched mechanically. In certain embodiments, the nanotube rope sizes are increased and the packing density is higher as compared to pre-stretched nanotube sheets. These features are further enhanced, for example, by using large-aspect-ratio, MWNTs having an average length of at least 1 millimeter ("millimeter-long MWNTs").

In certain embodiments, the method of making a composite further comprises impregnating the mechanically stretched buckypaper with a resin and then B-stage curing the resin to form a prepreg. By using (1) a prepregging process to achieve high nanotube loading and good resin/nanotube impregnation in each thin prepreg layer (10-20 mm) through resin B-stage compression; and (2) a precise control of the nanotube concentration, higher loading of the nanoscale fibers in the resultant composite is realized. In addition, nanoscale fiber film prepregs may be much easier to handle than untreated buckypaper. Thus, in one embodiment, the method making a composite includes layup of a plurality of aligned buckypaper prepregs and then curing the B-stage cured resin of the prepregs to form a composite.

In certain embodiments, the method further comprises functionalizing the nanoscale fibers. In one embodiment, nanoscale fibers are functionalized by covalently attaching chemical groups to the nanoscale fiber to facilitate covalent bonding between the nanoscale fiber and a resin matrix. Without being bound by a particular theory, covalent functionalization creates defects in nanotube lattice, which also lowers electrical and thermal conductivity of the CNTs. Hence, covalent functionalization is a double-edged sword for realizing high mechanical properties of CNT reinforced composites. Thus, the degree of functionalization should balance the increase in the interfacial bonding with decrease in mechanical properties of CNTs to maximize the mechanical properties in the resultant composites. Specific degrees of functionalization (DOF) that can improve interfacial bonding without unduly sacrificing the intrinsic mechanical properties of CNTs.

In certain embodiments, the method for making a composite further comprises functionalizing the nanoscale fibers by contacting the nanoscale fibers with a peroxyacid (e.g., meta-chloromethaneperoxylbenzoic acid or m-chloroperoxybenzoic acid (m-CPBA)) to graft an epoxide group onto the nanoscale fibers.

Nanoscale Fiber Films

As used herein, the term "nanoscale fibers" refers to a thin, greatly elongated solid material, typically having a cross-section or diameter of less than 500 nm. In certain embodiments, the nanoscale fibers are single-walled carbon nanotubes (SWNTs), multiple-walled carbon nanotubes (MWNTs), carbon nanofibers (CNFs), or mixtures thereof. Carbon nanotubes and carbon nanofibers have high surface areas (e.g., about 1,300 $m^2/g$), which results in high conductivity and high multiple internal reflection. In a preferred embodiment, the nanoscale fibers comprise or consist of carbon nanotubes, including both SWNTs and MWNT. SWNTs typically have small diameters (~1-5 nm) and large aspect ratios, while MWNTs typically have large diameters (~5-200 nm) and small aspect ratios. CNFs are filamentous fibers resembling whiskers of multiple graphite sheets or MWNTs.

In certain embodiments, the nanoscale fibers comprise carbon nanotubes an average length of at least 1 millimeter (available from Nanocomp Technologies, Concord, N.H.).

As used herein, the terms "carbon nanotube" and the shorthand "nanotube" refer to carbon fullerene, a synthetic graphite, which typically has a molecular weight between about 840 and greater than 10 million grams/mole. Carbon nanotubes are commercially available, for example, from Unidym Inc. (Houston, Tex. USA) or Carbon Nanotechnologies, Inc. (Houston Tex. USA), or can be made using techniques known in the art.

The nanotubes optionally may be opened or chopped, for example, as described in U.S. Pat. No. 7,641,829 B2.

The nanotube and nanofibers optionally may be chemically modified or coated with other materials to provide additional functions for the films produced. For example, in some embodiments, the carbon nanotubes and CNFs may be coated with metallic materials to enhance their conductivity.

As used herein, the term "nanoscale film" refers to thin, preformed sheets of well-controlled and dispersed porous networks of SWNTs, MWNTs, CNFs, or mixtures thereof. Films of carbon nanotubes and nanofibers, or buckypapers, are a potentially important material platform for many applications. Typically, the films are thin, preformed sheets of well-controlled and dispersed porous networks of SWNTs, MWNTs, carbon nanofibers CNFs, or mixtures thereof. The carbon nanotube and nanofiber film materials are flexible, light weight, and have mechanical, conductivity, and corrosion resistance properties desirable for numerous applications. The film form also makes nanoscale materials and their properties transferable to a macroscale material for ease of handling.

The nanoscale fiber films be made by essentially any suitable process known in the art. In one embodiment, the buckypaper is made by stretching or pushing synthesized nanotube "forests" to form sheets or strips. In another embodiment, the buckypaper is made by consolidation of syntheses nanotube aerogel to form film membranes.

In some embodiments, the nanoscale fiber film materials are made by a method that includes the steps of (1) suspending SWNTs, MWNTs, and/or CNF in a liquid, and then (2) removing a portion of the liquid to form the film material. In one embodiment, all or a substantial portion of the liquid is removed. As seen herein, "a substantial portion" means more than 50%, typically more than 70, 80%, 90%, or 99% of the liquid. The step of removing the liquid may include a filtration process, vaporizing the liquid, or a combination thereof. For example, the liquid removal process may include, but is not limited to, evaporation (ambient temperature and pressure), drying, lyophilization, heating to vaporize, or using a vacuum.

The liquid includes a non-solvent, and optionally may include a surfactant (such as Triton X-100, Fisher Scientific Company, NJ) to enhance dispersion and suspension stabilization. As used herein, the term "non-solvent" refers to liquid media that essentially are non-reactive with the nanotubes and in which the nanotubes are virtually insoluble. Examples of suitable non-solvent liquid media include water, and volatile organic liquids, such as acetone, ethanol, methanol, n-hexane, benzene, dimethyl formamide, chloroform, methylene chloride, acetone, or various oils. Low-boiling point liquids are typically preferred so that the liquid can be easily and quickly removed from the matrix material. In addition, low viscosity liquids can be used to form dense conducting networks in the nanoscale fiber films.

For example, the films may be made by dispersing nanotubes in water or a non-solvent to form suspensions and then filtering the suspensions to form the film materials. In one embodiment, the nanoscale fibers are dispersed in a low viscosity medium such as water or a low viscosity non-solvent to make a suspension and then the suspension is filtered to form dense conducting networks in thin films of SWNT, MWNT, CNF or their mixtures. Other suitable methods for producing nanoscale fiber film materials are disclosed in U.S. patent application Ser. No. 10/726,074, entitled "System and Method for Preparing Nanotube-based Composites;" U.S. Patent Application Publication No. 2008/0280115, entitled "Method for Fabricating Macroscale Films Comprising Multiple-Walled Nanotubes;" and U.S. Pat. No. 7,459,121 to Liang et al., which are incorporated herein by reference.

Additional examples of suitable methods for producing nanoscale fiber film materials are described in S. Wang, Z. Liang, B. Wang, and C. Zhang, "High-Strength and Multifunctional Macroscopic Fabric of Single-Walled Carbon Nanotubes," *Advanced Materials*, 19, 1257-61 (2007); Z. Wang, Z. Liang, B. Wang, C. Zhang and L. Kramer, "Processing and Property Investigation of Single-Walled Carbon Nanotube (SWNT) Buckypaper/Epoxy Resin Matrix Nanocomposites," *Composite, Part A: Applied Science and Manufacturing*, Vol. 35 (10), 1119-233 (2004); and S. Wang, Z. Liang, G. Pham, Y. Park, B. Wang, C. Zhang, L. Kramer, and P. Funchess, "Controlled Nanostructure and High Loading of Single-Walled Carbon Nanotubes Reinforced Polycarbonate Composite," *Nanotechnology*, Vol. 18, 095708 (2007).

In certain embodiments, the nanoscale fiber films are commercially available nanoscale fiber films. For example, the nanoscale fiber films may be preformed nanotube sheets made by depositing synthesized nanotubes into thin sheets (e.g., nanotube sheets from Nanocomp Technologies Inc., Concord, N.H.). MWNT sheets from Nancomp have substantial nanotube entanglements and possible interconnection through Nanocomp's proprietary floating catalyst synthesis and aerogel condense method. Theses MWNT sheets can reach up to a meter long and are commercially available, which makes them practical for manufacturing bulk composites.

In various embodiments, good dispersion are realized in buckypapers materials, which assists the production of high nanoscale fiber content (i.e., greater than 20 wt. %) buckypaper for high performance composites materials.

In various embodiments, the films have an average thickness from about 5 to about 100 microns thick with a basis weight (i.e., area density) of about 20 $g/m^2$ to about 50 $g/m^2$. In one embodiment, the buckypaper is a thin film (approximately 20 μm) of nanotube networks.

Upon mechanical stretching of the buckypapers, the aligned nanoscale fiber films may have a tensile strength ranging from 20 MPa to 668 MPa. In other embodiments, the aligned nanoscale fiber films have a tensile strength ranging from 200 MPa to 668 MPa. In yet other embodiments, the aligned nanoscale fiber films have a tensile strength greater than 668 MPa.

In other embodiments, the aligned nanoscale fiber films have a Young's modulus ranging from 2 GPa to 25 GPa. In still other embodiments, the aligned nanoscale fiber films have a Young's modulus ranging from 5 GPa to 25 GPa. In yet other embodiments, the aligned nanoscale fiber films have a Young's modulus greater than 25 GPa.

Nanoscale Fiber Composites and Uses Thereof

Supporting Medium

Suitable supporting medium for use in stretching methods described herein include PE, polypropylene, polymethyl methacrylate, polycarbonate, polyamide, or any other materials known in the art which are compatible for use with nanoscale fibers. In certain embodiments, the supporting medium is capable of thermal decomposition so that substantially all of or at least a portion of the supporting medium is removed from the composite. In other embodiments, the supporting medium is dissolved by a solvent.

Matrix Material

Composite materials are provided that comprise aligned nanoscale fibers and a supporting medium and/or a matrix material. In one embodiment, the composite materials may include a matrix material and the supporting material may or may not be present in the composite. Suitable matrix materials include epoxy resins, phenolic resins, bismaleimide (BMI), polyimide, thermoplastic resins (e.g., nylon and polyetheretherketone resins), and other polymers.

In certain embodiments, the matrix material may comprise a B-stage cured resin (e.g., an epoxy, a polyimide, a bismaleimide, a phenolic resin, a cyanate, or a combination thereof) such that the composite material comprises a prepreg.

Composites

In certain embodiments, composites comprising mechanically stretched buckypaper have a nanoscale fiber concentration (loading) ranging from 5 wt % to 62 wt %.

In certain embodiments, composites comprising mechanically stretched buckypaper have a tensile strength ranging from 620 MPa to 2,088 MPa. In other embodiments, composites comprising mechanically stretched buckypaper have a tensile strength ranging from 620 MPa to 3,081 MPa. In yet other embodiments, composites comprising mechanically stretched buckypaper have a tensile strength greater than 3,081 MPa.

In other embodiments, composites comprising mechanically stretched buckypaper have a Young's modulus ranging from 47 GPa to 169 GPa. In still other embodiments, composites comprising mechanically stretched buckypaper have a Young's modulus ranging from 47 GPa to 350 GPa. In yet other embodiments, composites comprising mechanically stretched buckypaper have a Young's modulus greater than 350 GPa.

Embodiments of the aligned nanoscale fibers may also have tight packing, which is desirable for high loading in composites. Improvement of the alignment of the nanoscale fibers and loading is a desirable factor toward realizing the potential of nanotubes for high mechanical, electrical and thermally conductive applications in composites and electronic devices. Thus, embodiments of the high-performance buckypaper nanocomposites can be used for EMI shielding, thermal management and structural materials applications. Immediate applications include composite applications for aircraft and thermal management for electronic device package. Other applications may include lightning strike protection, other lightweight structural materials applications, and electronic and energy applications, such as high-conducting thin film and powerful and efficient battery and fuel cell electrodes. High-performance buckypaper materials may also be used to develop lightweight-conducting films and current-carrying materials for electronic products.

The methods and compositions can be further understood with the following non-limiting examples.

Example 1

BP/PE composite films were made using the following procedure: The BP was sandwiched with PE film (two layers on both sides of the BP) in a vacuum bag with 14.7 PSI vacuum pressure at 190° C. for 30 min. The BP/PE composite was cooled in the vacuum bag to room temperature. The buckypaper used was slightly aligned (i.e., less than 20% degree of alignment) MWNT film sheets from Nanocomp (Concord, N.H.). The aerial density of the buckypaper was 20-25 g/m². The PE film was clear plastic cling wrap that was manufactured by the GLAD®Products Company (CA 94612), which had an area density of about 13.5±0.5 g/m².

Figure 3:
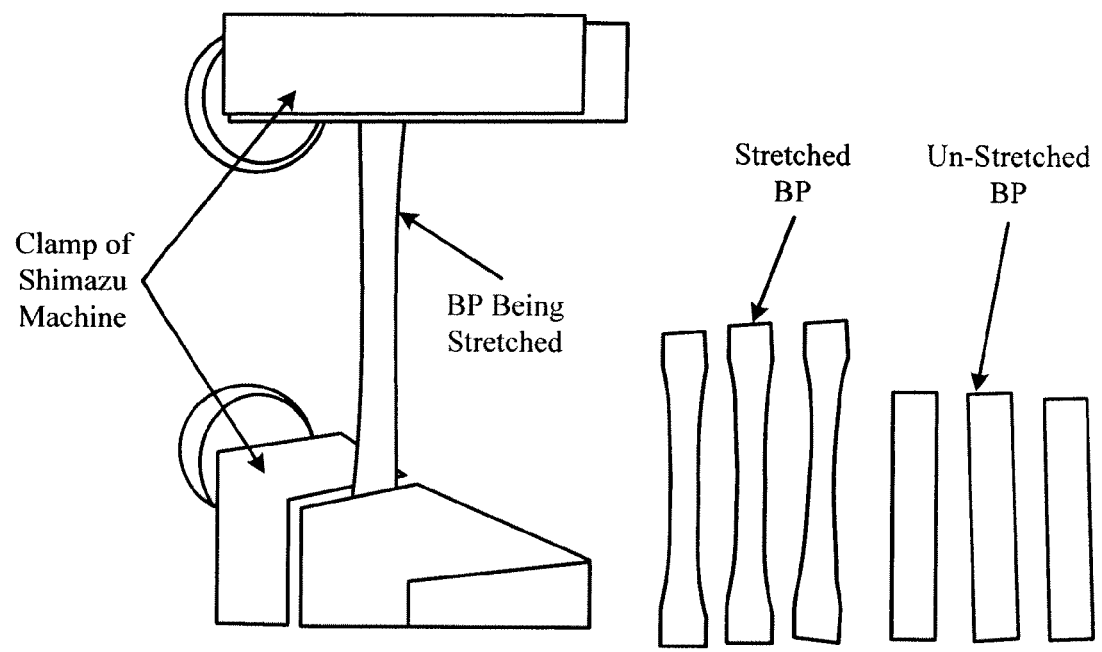
FIG. 3 shows the stretching setup and stretched BP/PE film used in Example 1.

The BP/PE composite films were stretched using the following steps: The composite strip was mounted on the clamp of a Shimazu machine (AGS-J Model) and stretched by the machine at a speed of 1 mm/min to the desired deformation or stretching ratio. An electric dryer (Dryer 00415, L&R® Manufacturing, NJ 07032) was used to heat the composite film to about 60±10° C. during stretching. FIG. 3 shows the stretching setup and stretched BP/PE film used.

Before the stretched PE/BP composite films were "burned," the stretched BP composite film was treated in a vacuum bag at 90-100° C. for 10 minutes to disorient the PE molecules and keep the nanotubes' alignment. Otherwise, the composite film would have shrunk at high temperatures during the burning process, thus affecting the quality of the stretched BP. After being annealed, the BP/PE composite film was put into a tube furnace (GSL-1600X, MTI Co. Richmond, Calif.) in a nitrogen or argon atmosphere at 550° C. for 1 hour to burn off the PE molecules in the composite film.

Figure 4:
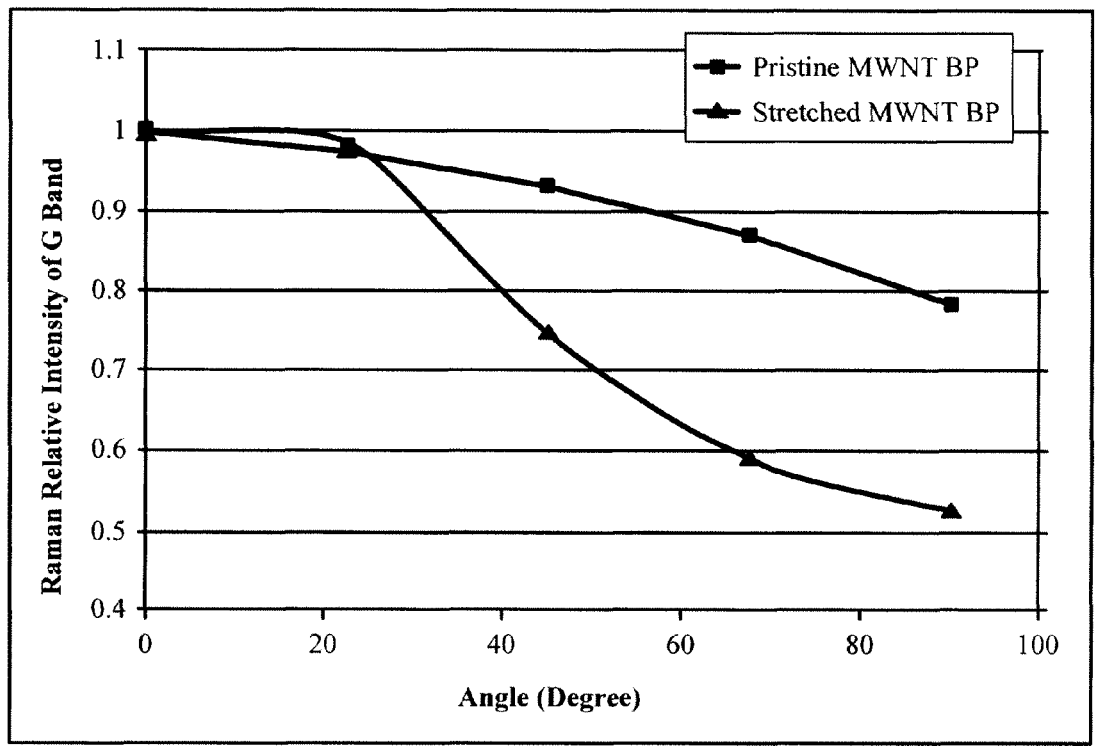
FIG. 4 is a graph showing the degree of alignment via Raman spectrum comparison of the stretched (30% stretch ratio) and unstretched BP samples of Example 1 using a polarized Raman spectrometer (InVia, Renishaw, Inc).

After burning off the PE material, the alignment of the nanotubes was analyzed through mechanical tests, Raman spectrum and electronic scanning microscope (SEM) experiments. FIG. 4 shows the degree of alignment via Raman spectrum comparison of the stretched (30% stretch ratio) and unstretched BP samples using a polarized Raman spectrometer (InVia, Renishaw, Inc). A high Raman G-band intensity ratio along the stretching direction (0 degree direction) indicated nanotube alignment along that direction. In particular, large angular changes of Raman spectrum intensity (normalized) indicated more nanotube alignment in the stretched MWNT buckypaper.

Figure 5:
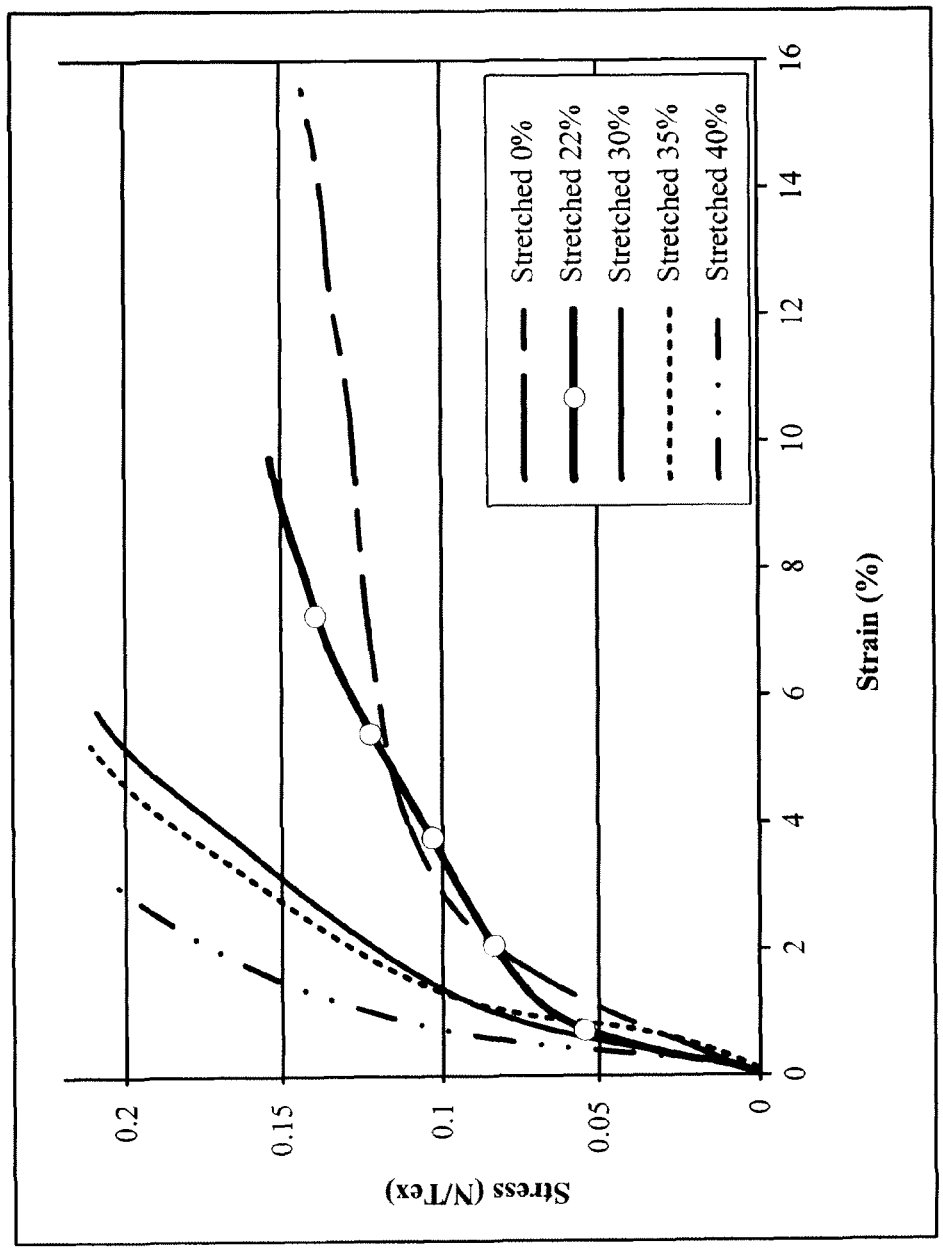
FIG. 5 shows typical stress-strain curves for embodiments of a mechanically stretched buckypaper.
Figure 6:
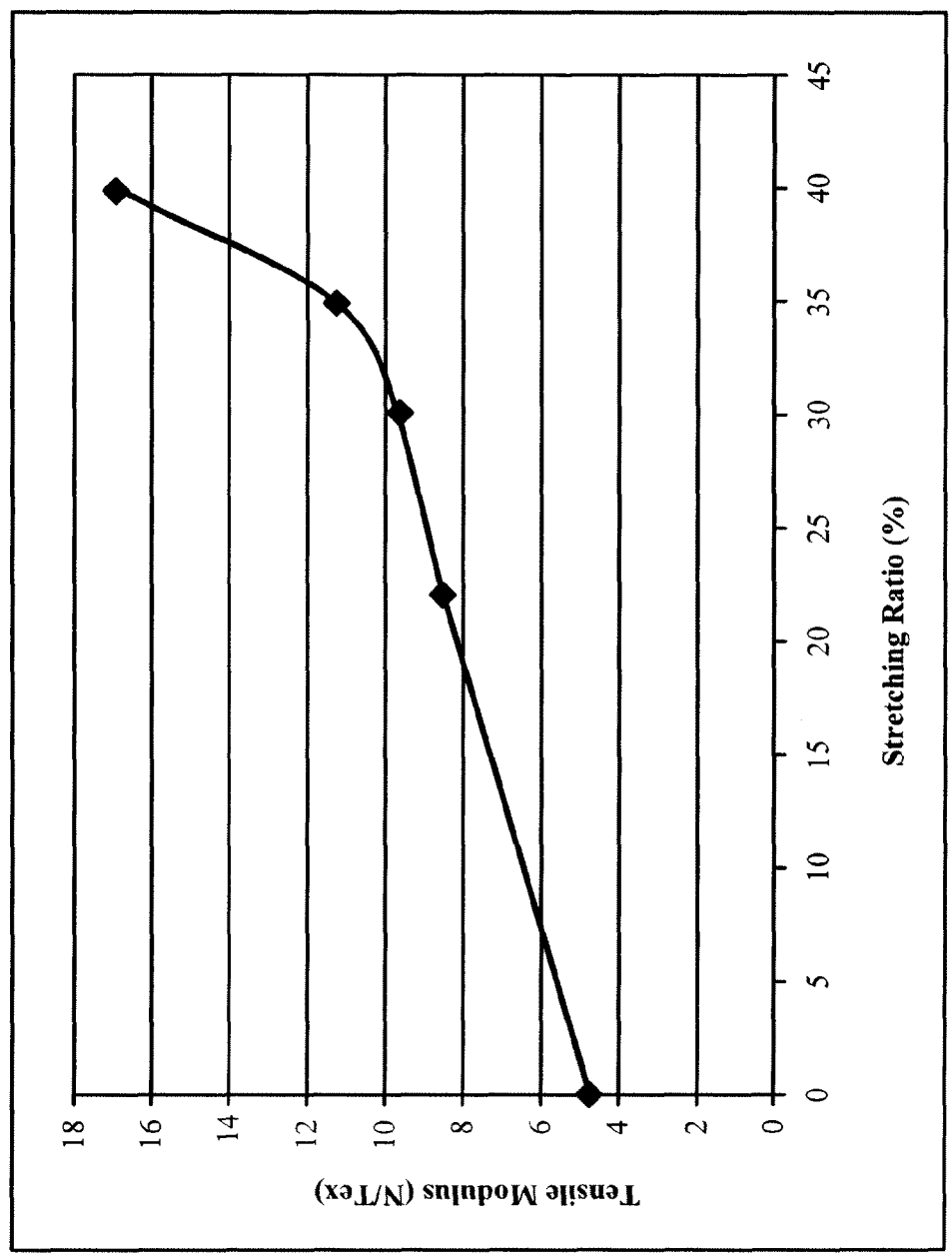
FIG. 6 is a graph showing the tensile modulus of embodiments of a mechanically stretched buckypapers at various stretch ratios made in Example 1.
Figure 7:
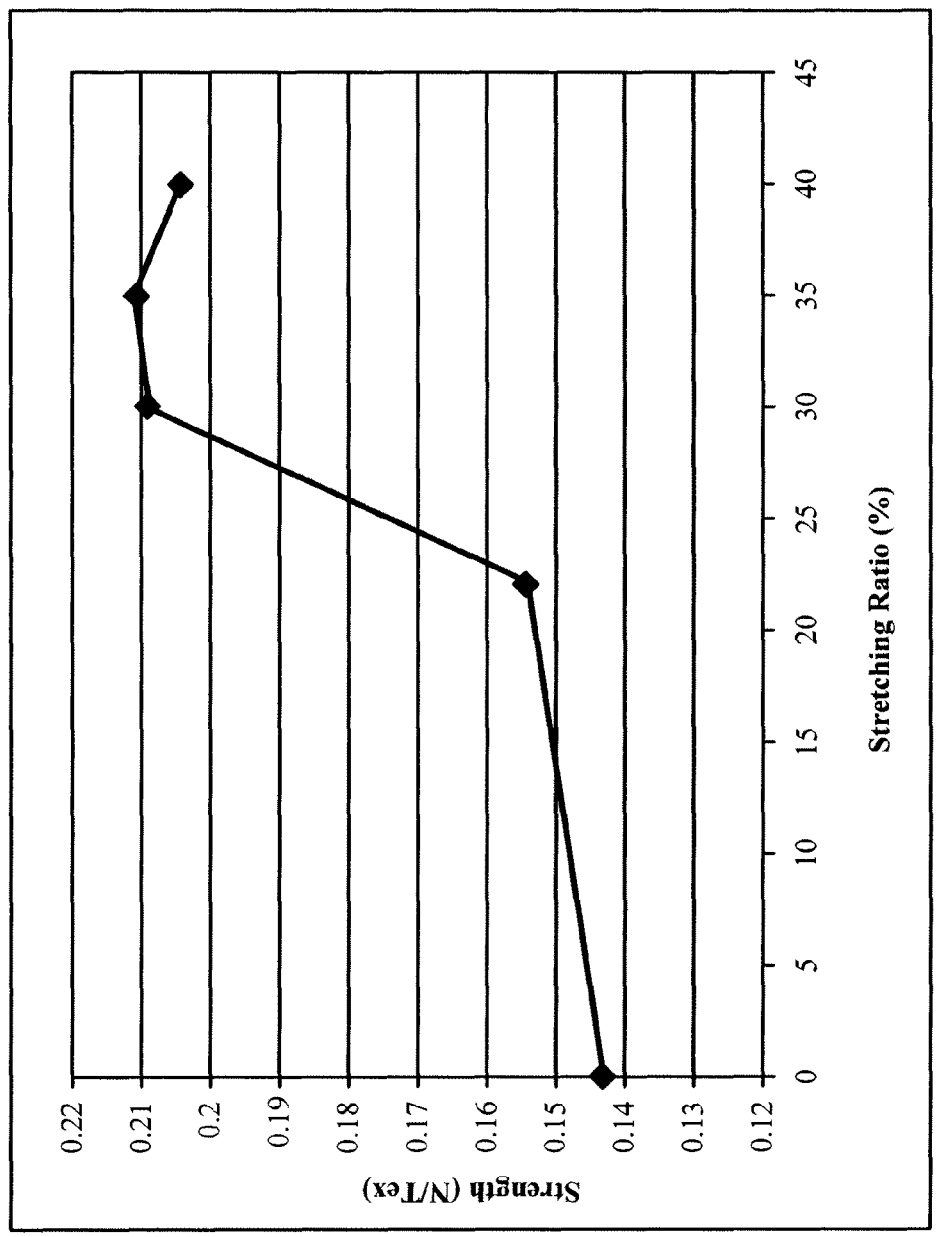
FIG. 7 is a graph showing the strength of embodiments of the mechanically stretched buckypapers at various stretch ratios made in Example 1.

Mechanical tests of neat buckypaper samples were also conducted to reveal the effects of stretching on mechanical properties. Samples with different stretching ratios were tested using a Dynamic Mechanical Analysis (DMA) machine (DMA 2980, TA Instrument Co.) under control force mode to obtain tensile strength and modulus values. FIG. 5 shows typical stress-strain curves, indicating noticeable property changes of the stretched BP samples. FIGS. 6 and 7 show the modulus and strength increased with the increase of the stretching ratios, respectively. The breaking strains decreased with the increase of the stretching ratios, indicating alignment improvement in the samples. The modulus of the pristine BP was about 4.67 N/tex (GPa/(g/cc)), and the modulus of the BP sample with a stretching ratio of 40% went up to 16.96 N/tex, achieving a 3.6 fold increase. The results also showed the non-linear behaviors of the modulus and strength increase with an increase of the stretching ratio. A dramatic modulus increase was observed with stretching ratios higher than 30%. For the strength increase, the same transition point was about 25% of the stretching ratio. However, there exists a peak of strength increase. A very high stretching ratio will lead to damage of the nanotube network, and the strength would decrease. The results show that the strength of the neat buckypaper samples increased from 0.143 N/tex (pristine buckypaper) to the maximum of about 0.21 N/tex at approximately 30%-35% stretching ratio. The maximum strength increase was only about 50% of the pristine sample performance, much less than the approximately 360% enhancement in the modulus.

Figure 8:
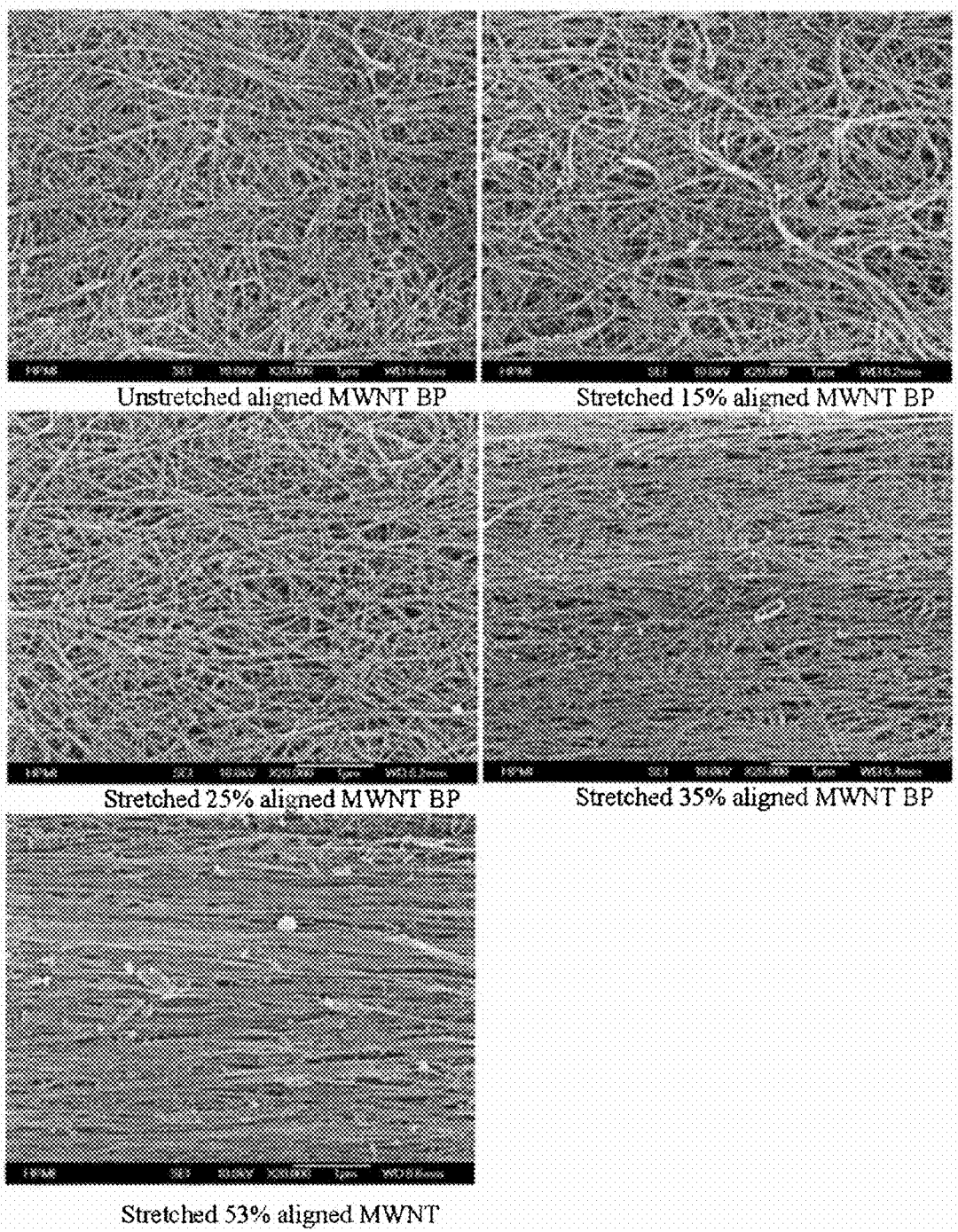
FIG. 8 shows the SEM images of buckypapers with different stretching ratios.

FIG. 8 shows the SEM images of buckypapers with different stretching ratios. A significant improvement of nanotubes in the stretched buckypaper samples was observed, which further indicated the effectiveness of the stretching process.

Figure 9:
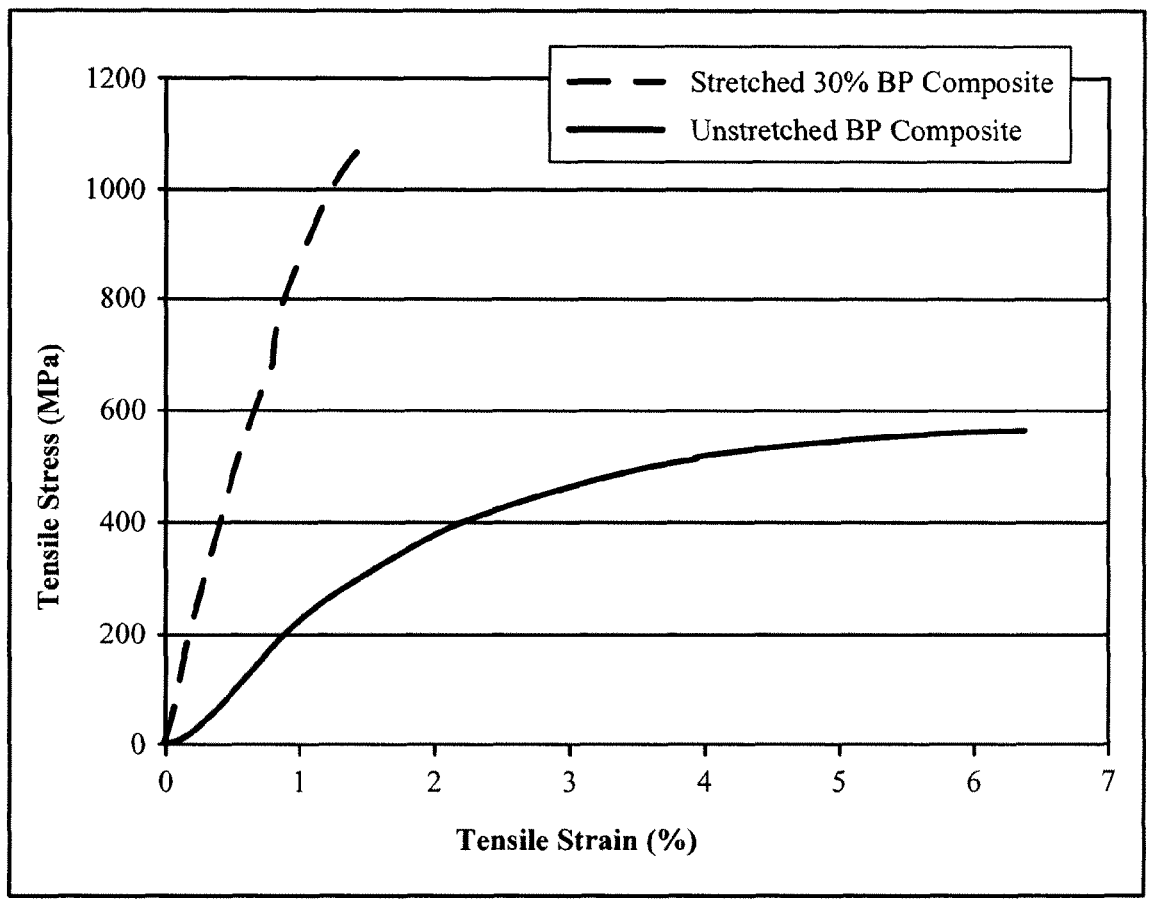
FIG. 9 shows typical stress-strain curves for the control (unstretched) and stretched composites for epoxy/BP composites made in Example 1.

Stretched MWNT buckypaper/epoxy buckypaper composites were also produced and tested to determine the effectiveness of stretching on the composite properties. MWNT buckypaper samples with a 30% stretching ratio were used after burning off the PE film. Epon 862 epoxy and curing agent W (diethyltoluenediamines) from E.V. Rubber Inc. were used as received for composite fabrication. The stretched BP samples were impregnated with an EPON 862 resin solution. The solution was 15 wt. %-20 wt. % epoxy, and the curing agent W (weight ratio: 100:26.4) was in acetone. After evaporating the acetone in a vacuum oven at 70±10° C. for 30 min at a vacuum degree lower than 1 Psi, from the resin impregnated buckypaper, ten layers of the impregnated buckypaper sheets were stacked together and hot pressed using a hot press machine Model 3925, from Carver Inc. The composite curing parameters were 177° C. for 2.5-3 hours at 20 MPa pressure. Composite testing was conducted according to ASTM D 638-03 standards, and the Shimazu machine was used. The typical stress-strain curves of the control (unstretched) and stretched composites are shown in FIG. 9, revealing that the tensile modulus and strength of the stretched 30% BP composites was 125.1 GPa and 1,056 MPa, respectively, which is much higher than the values of the control sample. Significant property improvements were achieved through the stretching process.

Example 2

A bismaleimide (BMI) resin (BMI resin 5250-4 from Cytec Inc.) was used to make composites with improved thermal and mechanical properties. In particular, composites reinforced with BMI were fabricated with high carbon nanotube loading (up to 60 wt %) BP. The BP used were randomly oriented MWNT film sheets from Nanocomp (Concord, N.H.).

Mechanical Stretching Alignment

The random BP were stretched using a Shimadzu machine to align the CNTs. The crosshead speed during stretching was 0.5 mm/min in all stretching experiments. Since the randomly oriented CNT BPs had good stretch characteristics and strength, they could be stretched without using a supporting medium. The randomly oriented CNT BPs were stretched to a stretch ratio up to about 40%. Attempts to stretch the BPs beyond a 40% stretch ratio led to breakage of CNT BP strips. The alignment degree was characterized by polarized Raman spectrum and small angle X-ray scattering.

Fabrication of BP/BMI Composites

The bulk BP/BMI composite samples were fabricated with a BP prepreg and hot press molding technique. First, the buckypaper was impregnated with BMI resin solution to make a prepreg with about 60±2 wt % CNT concentration. The concentration of the BMI resin solution was adjusted to be less than 10 wt % to ensure a low viscosity for facilitating impregnation. The solvent used was acetone. Then six layers of BP prepreg were stacked together and cured with a 25 MPa hot-press process following a curing cycle of 375° F. for 4 hours and 440° F. for 2 hours. The CNT weight percent of the final composite samples was controlled at 60±1%. Using this method, high quality CNTs/BMI composites with high loading, good dispersion and alignment of CNTs in BMI matrix were made.

Carbon fiber polymer composites were also fabricated using these prepreg and hot-press steps.

Characterization

Mechanical property tests of the BP/BMI composites were conducted by a Shimadzu machine (AGS-J) according to ASTM D 638-03. The crosshead speed was 1 mm/min with 20 mm gauge length. Fracture surfaces of the tensile test specimens were coated with gold layer and observed using a electronic scanning microscope (SEM: JEOL JSM-7401F USA, Inc.). The SEM image after stretching showed that the CNTs are well aligned. DMA was performed on a DMA 800 machine (TA instrument Inc.) using film mode with a constant frequency of 1 Hz in a temperature from room temperature to 400° C. with the heating rate of 5° C./min. The electrical conductivity properties of the BP/BMI composites were characterized by a standard four-probe method using a source meter.

Results and Discussions

Mechanical Properties and Fracture Surface Morphology

Figure 10:
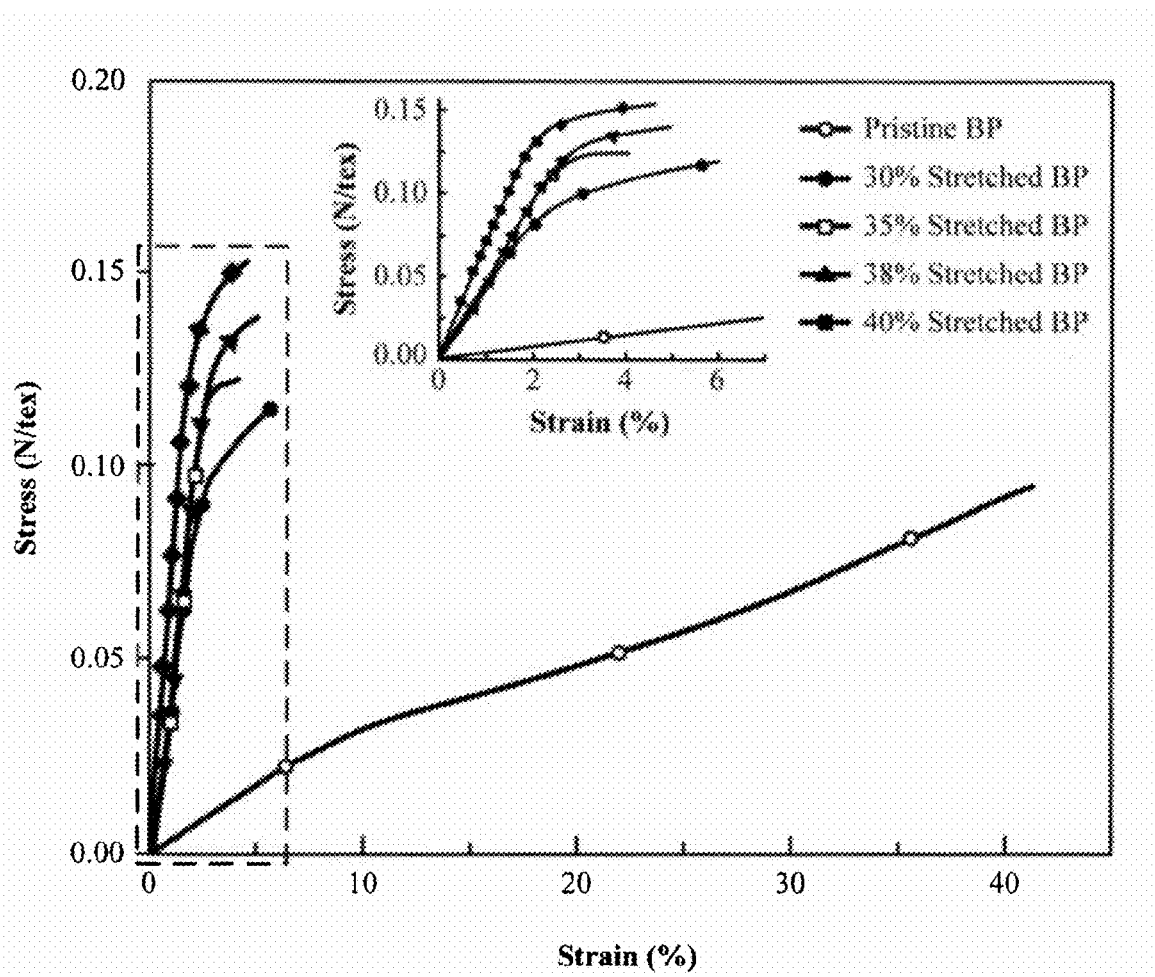
FIG. 10 shows stress-strain curves for embodiments of mechanically stretched and unstretched buckypaper made in Example 2.

Four stretched, aligned CNT BP having different stretch ratios were compared with randomly oriented CNT BP. The DMA static mode was used to test the mechanical properties of CNT BP before and after stretching. The stress-strain curves are shown in FIG. 10. The tensile stress of CNT BPs increased after stretching from 0.095 N/tex for randomly oriented CNT BP to 0.118 N/tex, 0.123 N/tex, 0.139 N/tex and 0.153 N/tex for 30%, 35%, 38% and 40% stretched BP, respectively. Compared to tensile stress, the Young's modulus exhibited even more improvement after stretching—from 0.346 N/tex for randomly oriented CNT BP to 4.150 N/tex, 5.105 N/tex, 5.433 N/tex and 6.970 N/tex for 30%, 35%, 38% and 40% stretched BP, respectively.

Figure 11A:
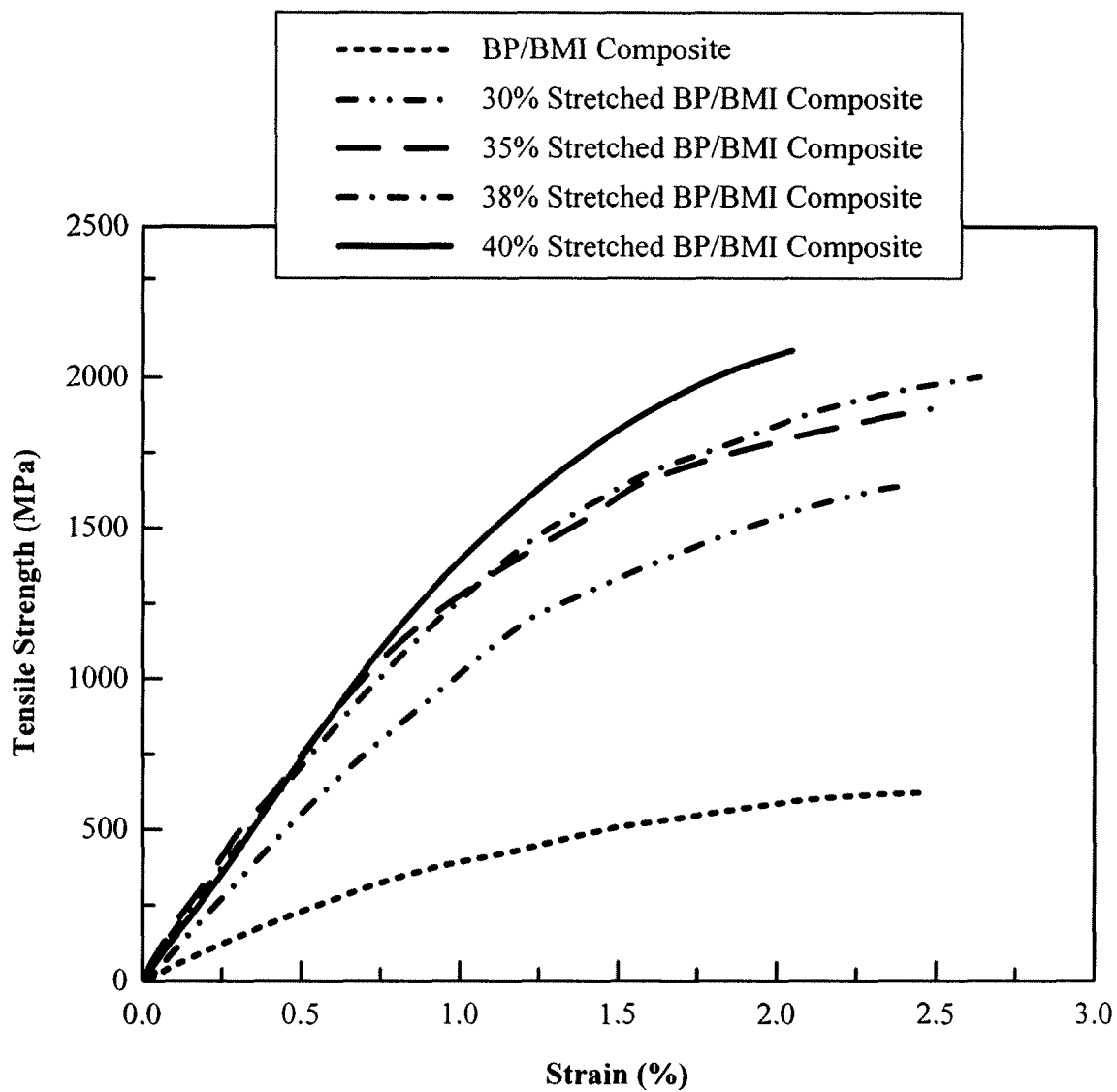
FIG. 11A shows tensile stress-strain curves for CNTs/BMI composites made in Example 2.
Figure 11B:
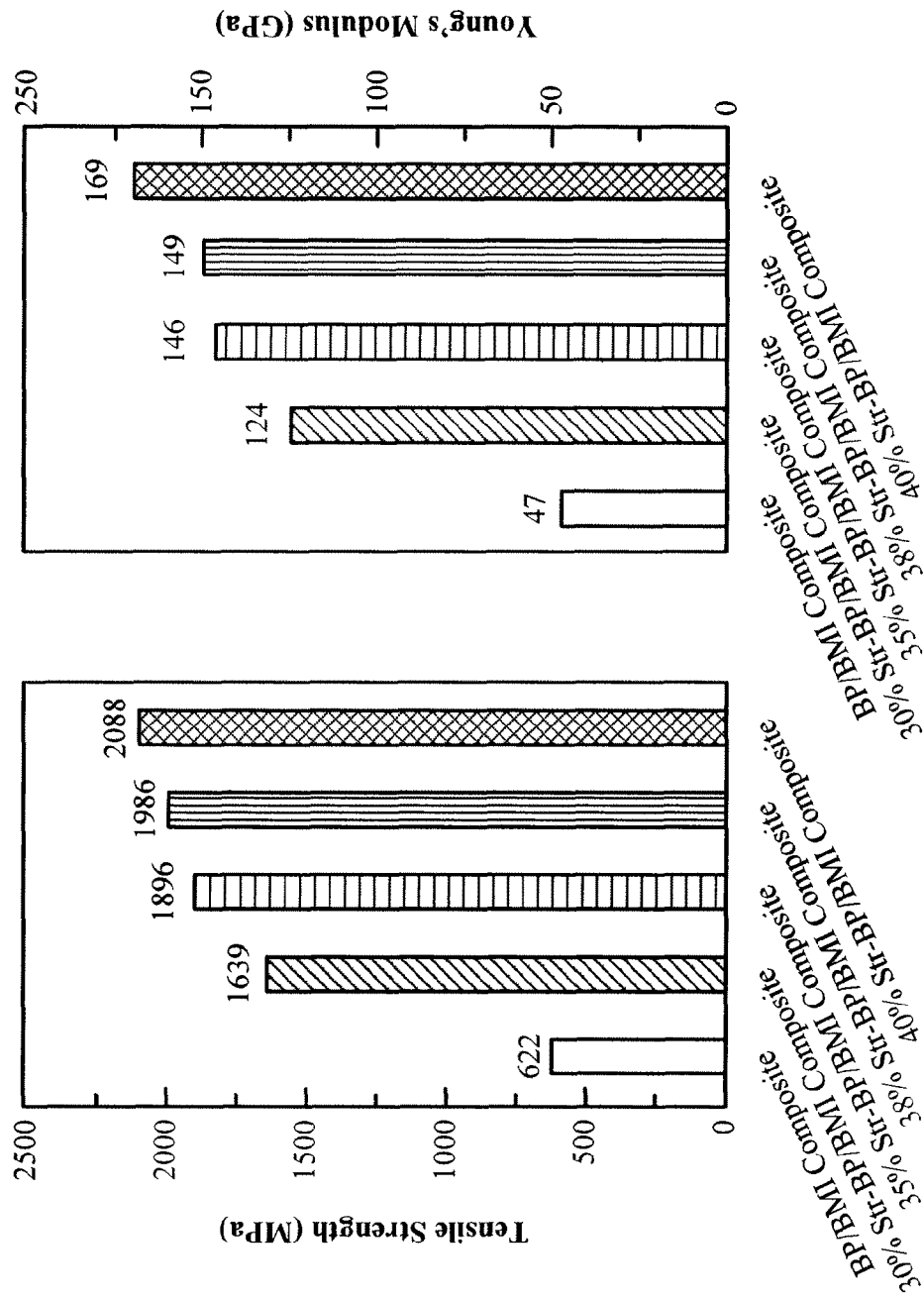
FIG. 11B shows the tensile strength and Young's modulus of these samples.

Tensile stress-strain curves for CNTs/BMI composites are shown in FIG. 11A, and the tensile strength and Young's modulus of these samples are shown in FIG. 11B. The effect of CNT orientation on their mechanical properties appeared to be significant. The BP/BMI composite showed a much higher tensile strength and Young's modulus as compared to literature reported values. The mechanical properties were noticeably improved with stretching ratio increase because of better CNT alignment.

The tensile strength and Young's modulus of 30% stretched BP/BMI composite samples were about 1639 MPa and about 124 GPa, respectively. When the BP was further stretched to 35%, the tensile strength and Young's modulus of its composites was increased to about 1896 MPa and about 146 GPa, respectively. The tensile strength and Young's modulus of the 40% stretched CNTs/BMI composites were 2088 MPa and 169 GPa, respectively.

Figure 12:
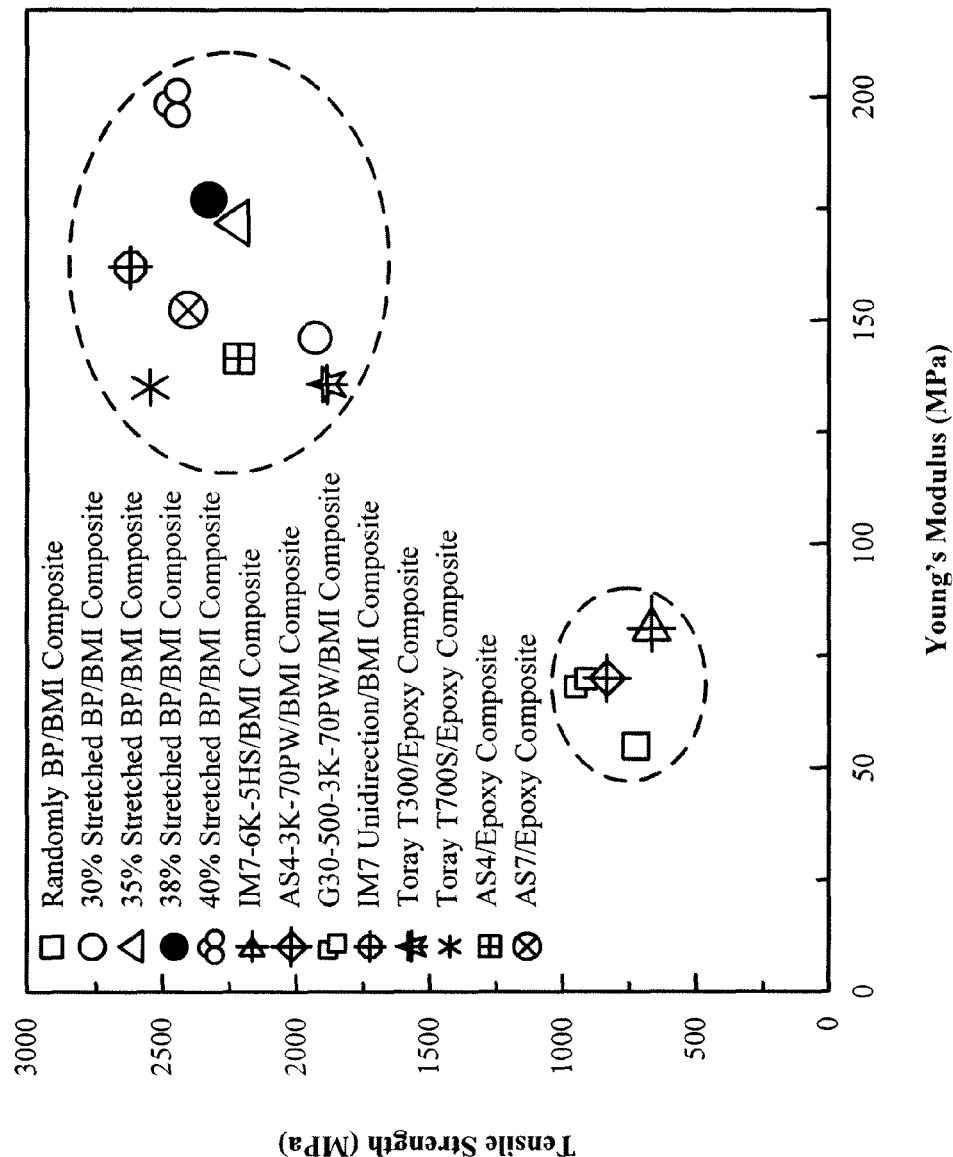
FIG. 12 is a graph which shows the comparison of mechanical properties between the CNTs/BMI composites made in Example 2 with state-of-the-art unidirectional (UD) carbon fiber composites for aerospace structural applications.

FIG. 12 shows the comparison of mechanical properties between the CNTs/BMI composites with state-of-the-art unidirectional (UD) carbon fiber composites for aerospace structural applications. The mechanical properties of CNTs/BMI composites were normalized to 60 vol % with the density of CNTs 1.8 g/cm$^3$. The randomly oriented, or pristine, BP/BMI composites were comparable to or lower than that of carbon fiber fabric composites for structural applications. After CNT alignment by stretching, the mechanical properties dramatically increased with the alignment degree of CNTs. When the CNT BP was stretched to 35%, the Young's modulus exceeded the traditional carbon fiber composites. When the CNT BP was stretched to 40%, the tensile strength is comparable to that of unidirectional Toray T700 and IM7 carbon fiber composites and higher than that of unidirectional Toray T300, AS4, AS7, and IM7 UD carbon fiber composites.

Figure 13:
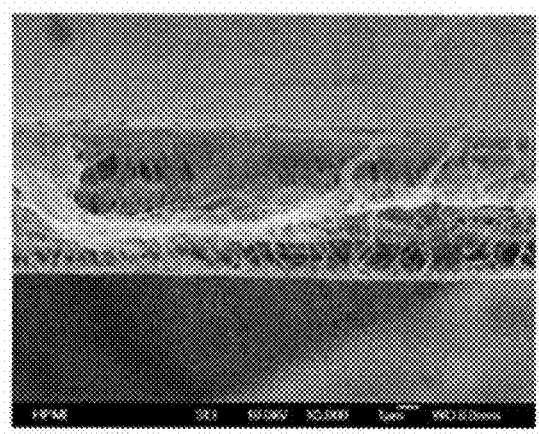
FIGS. 13A-D are SEM micrographs showing the fracture surface morphology of the BP composites samples made in Example 2.
Figure 13:
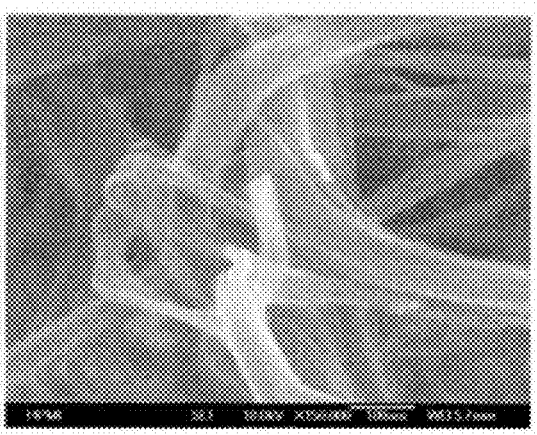
Figure 13:
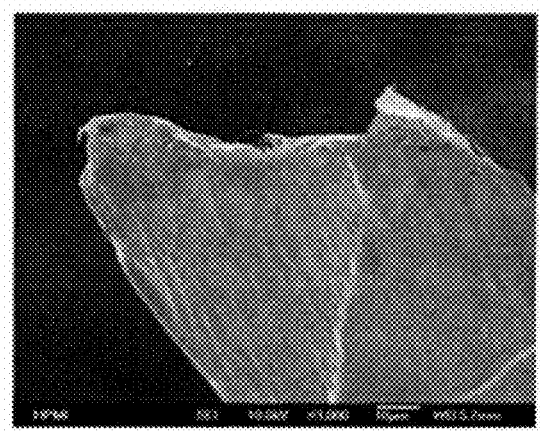
Figure 13:
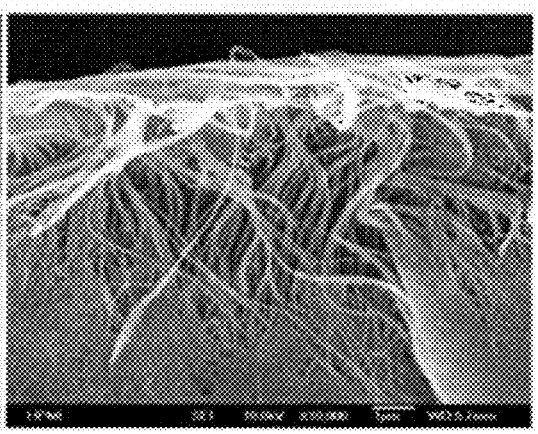

The fracture surface morphology of the BP composites samples is shown in FIG. 13. It can be seen that only a few broken nanotubes (CNTs) were observed at the fracture surface of the 35% stretched BP/BMI composites, as shown in FIG. 13B. The CNTs formed large strips due to possible self-assembly during fracture deformation, as shown in FIGS. 13B and 13D. Such self-assembly may lead to lower stress concentration in CNTs, and hence improve composite properties. On the other hand, this also indicates that further improvement of alignment and interfacial bonding should lead to more CNT breaks (i.e., more loading on the CNTs and thus, composite fracture due to CNT breaks rather than BMI fracture), which could lead to much higher mechanical performance.

Dynamic Mechanical Analysis

The DMA tests were conducted to confirm the Young's modulus and $T_g$ of BP/BMI composites.

Figure 14A:
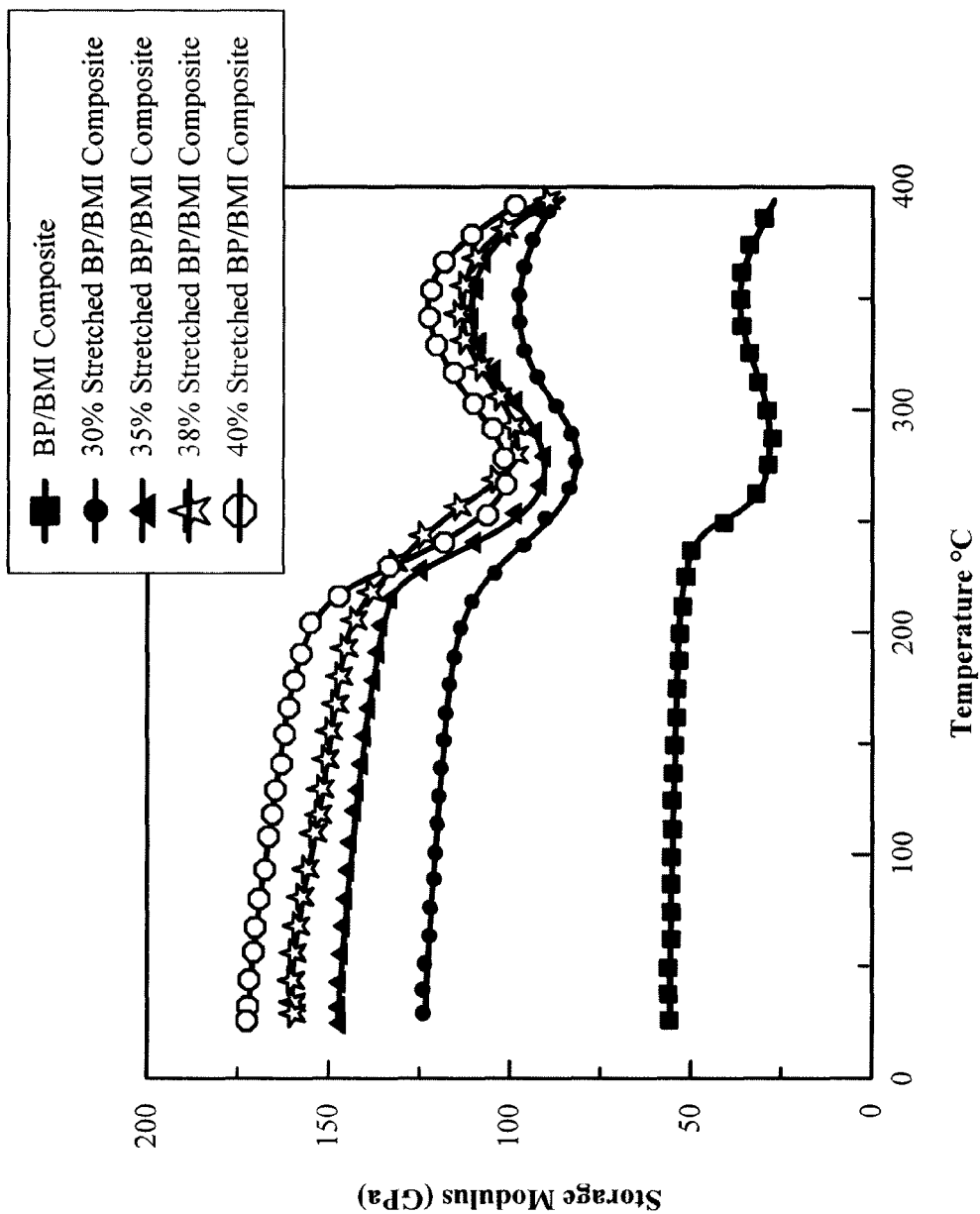
FIG. 14A is a graph comparing storage modulus of the $CNT_s$/BMI composites made in Example 2.
Figure 14B:
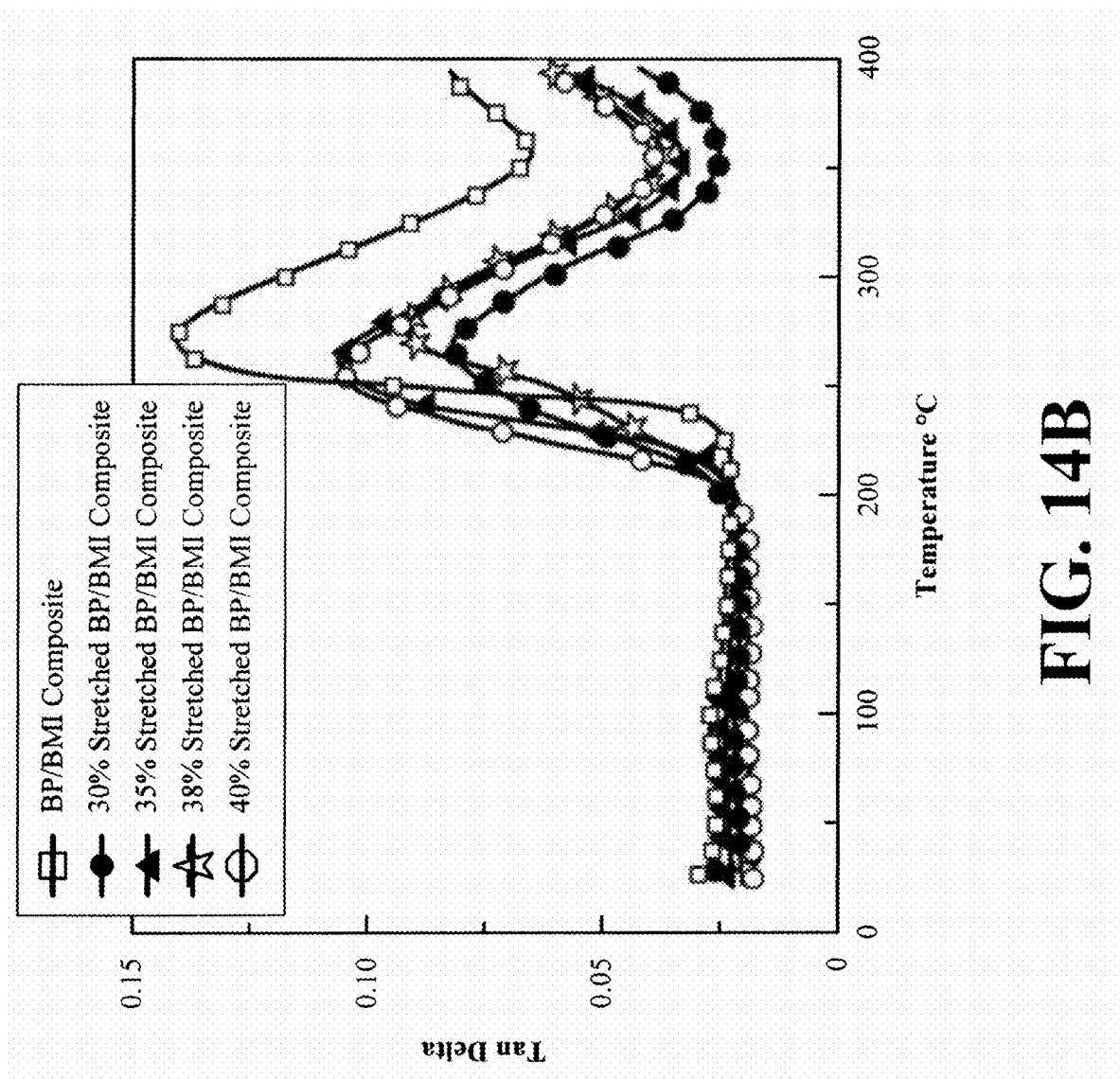
FIG. 14B is a graph showing $T_g$ determined by Tan Delta for the BP composites made in Example 2.

FIG. 14A shows the comparison of storage modulus of the $CNT_s$/BMI composites. The storage modulus of the composites was 55.4 GPa, 123.3 GPa, 146.7 GPa and 171.7 GPa, respectively corresponding to the CNTs/BMI composite, 30% stretched CNTs/BMI composite, 35% stretched CNTs/BMI composite and 40% stretched CNTs/BMI composite. The storage modulus of the CNTs/BMI composites was consistent with Young's modulus tested by tensile testing. The $T_g$ determined by Tan Delta is 269.98° C., 266.77° C., 259.76° C. and 256.70° C., respectively, corresponding to the CNTs/BMI composite, 30% stretched CNTs/BMI composite, 35% stretched CNTs/BMI composite and 40% stretched CNTs/BMI composite, seen FIG. 14B. Although the CNT loading was as high as approximately 60 wt %, the $T_g$ was fairly consistent, which showed that the introduction of high loading CNTs does not reduce the cross-linkage of BMI resin as large as observed in epoxy resin systems. Such high $T_g$ and good thermal stability of the BP/BMI composites are desirable for high temperature structural applications. The reduction of the Tan Delta areas of the stretched MWNT composites could imply more molecular interactions between MWNTs and BMI due to more spreading of the MWNT ropes and large interface areas.

Electrical Properties

Figure 15:
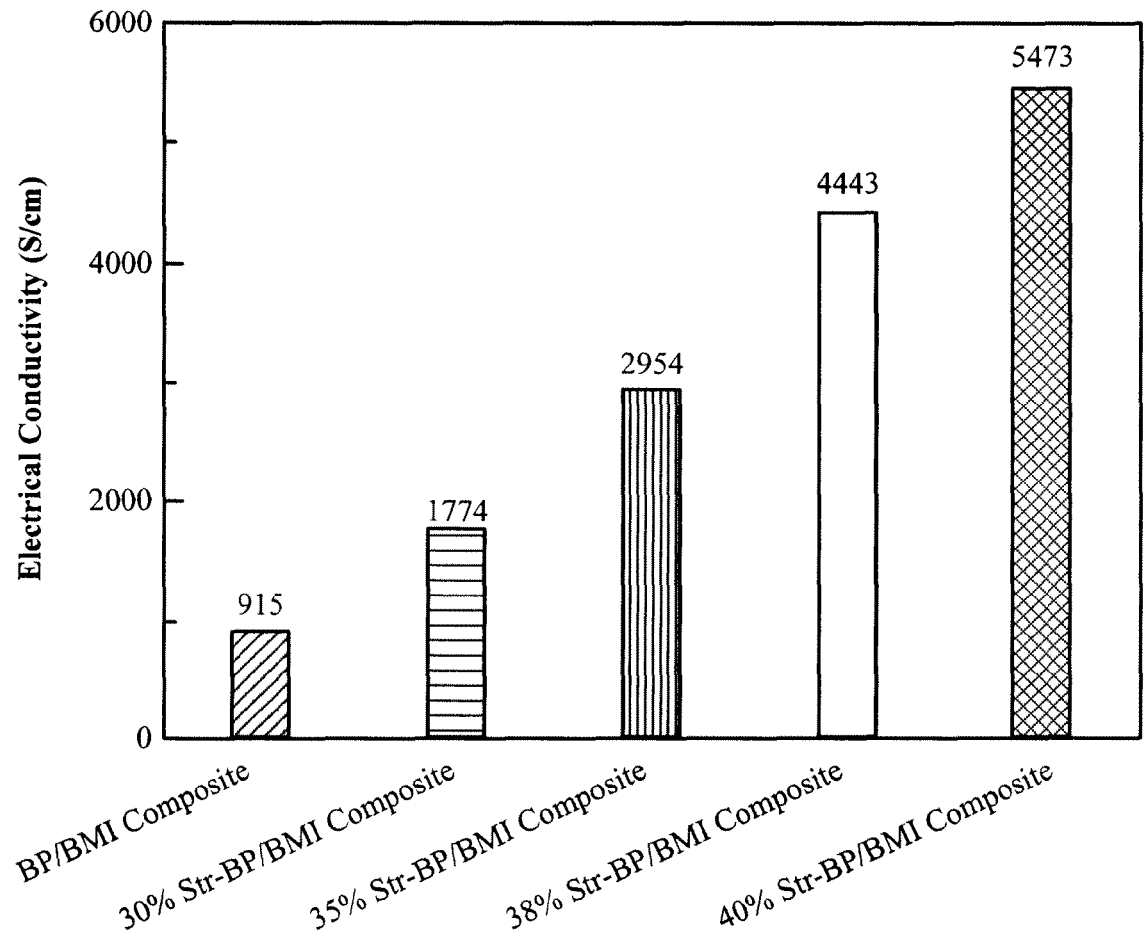
FIG. 15 is a graph comparing the electrical conductivity values of the CNTs/BMI composites made in Example 2.

The electrical properties comparison of the CNT/BMI composite is shown in FIG. 15. Due to the high loading of CNTs in the composites, the electrical conductivity was high. For the randomly CNT/BMI composite, the electrical conductivity reached 915 S/cm, which was higher than that of reported results of carbon fiber reinforced composites. The improved CNT loading and the contact of CNTs may have been the two reasons for this increase. For the stretched CNT/BMI composites, the electrical conductivity along the CNTs direction ($\sigma_{//}$) was much higher: 1774 S/cm, 2954 S/cm and 5473 S/cm corresponding to 30% stretched CNTs/BMI composite, 35% stretched CNTs/BMI composite and 40% stretched CNTs/BMI composite, respectively. The reason for this increase was likely well-oriented CNTs in the BMI matrix seen FIGS. 13C and 13D. Such high composite conductivity enables EMI shielding and lightning strike multifunctional applications of structural composites.

Conclusions

High mechanical performance nanotube buckypaper/BMI composites with comparable mechanical properties to the state-of-the-art high performance carbon fiber composites were successfully demonstrated. This was a desirable milestone for developing high performance nanotube composites for structural applications.

Example 3

Slightly aligned (i.e., less than 20% degree of alignment) MWNT film sheets from Nanocomp Technologies Inc. were mechanically stretched using a Shimadzu machine (AGS-J, Shimadzu Scientific Inc., Japan) to enhance nanotube alignment. The randomly dispersed MWNT sheets manufactured by Nanocomp Technologies Inc. (Concord, N.H.) include millimeter-long and small-diameter (~3-8 nanometers) MWNTs with a range of 2-5 walls, providing an aspect ratio up to 100,000.

The crosshead speed during stretching was 0.5 mm/min. There was no observed retraction after stretching. The stretching ratio of the MWNT sheets was calculated using Equation 1. MWNT sheets were processed at three stretch ratios (30%, 35%, and 40%) for composite fabrication. The composite samples had approximately 60 wt % nanotube weight fraction or loading. For a 40%-stretched CNT sheet (i.e., the post-stretch sheet was 40% longer than the pre-stretch sheet), the degree of alignment of the CNT sheet was dramatically improved.

To further understand and quantify the effects of the stretch ratio on the alignment degree, polarized Raman scattering tests were conducted and the alignment degree was calculated. Polarized Raman intensity of the G-band was measured as a function of angle between laser polarized direction and nanotube alignment direction or stretch axis. G-band Raman intensity showed the maximum if the polarization was parallel to the stretched axis ($\theta=0$) and was at a minimum at the perpendicular direction ($\theta=90$).

Figure 16:
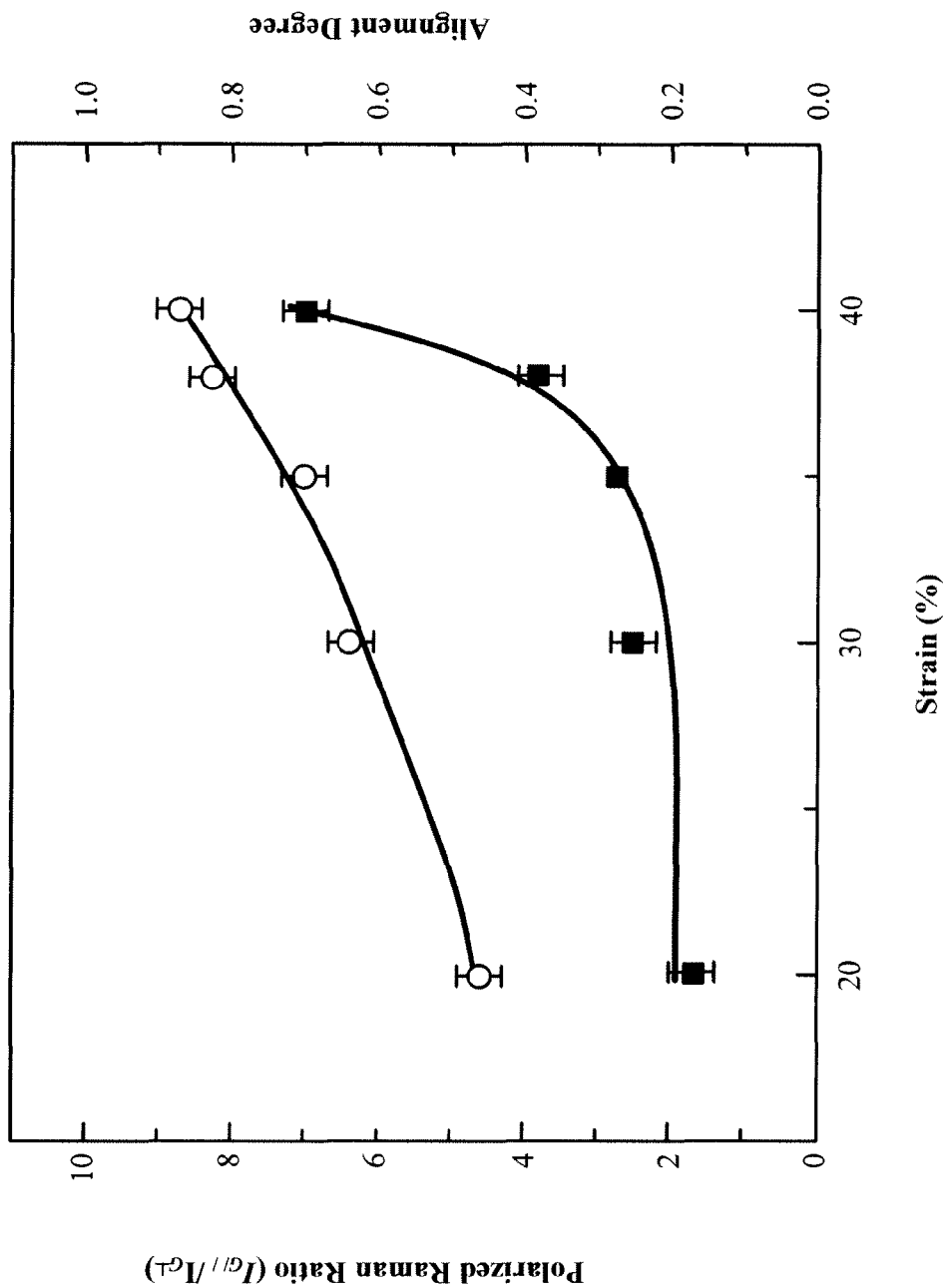
FIG. 16 is a graph showing the best fitting curve of the Raman intensity versus orientation angle as described in Example 3.

Theoretical Raman intensity change simply follows $\cos^4 \theta$ versus nanotube orientation angle ($\theta$). A two-dimensional distribution function was used to describe nanotube orientation distribution in the MWNT sheets. Then, the best fitting curve of the Raman intensity versus orientation angle can be obtained, as shown in FIG. 16. From the trend of the best fitting curve, the near perfect alignment (more than 95% nanotubes aligned along stretch direction) at an approximate 50% stretch ratio was predicted. However, the actual highest stretch ratio could only reach about 40%. Attempts to stretch CNT sheets over 40% were not successful due to nanotube network breakage beyond what the nanotube aspect ratio could handle.

Both randomly dispersed (i.e., as-received) and stretched MWNT sheets were used to make MWNT/BMI resin matrix composites. Aerospace-grade BMI resin 5250-4 (Cytec. Inc) was used as the matrix resin. First, the MWNT sheets were impregnated with a BMI resin solution of the same composition as used in Example 2 to make individual MWNT prepreg sheets with approximately 60±2 wt % nanotube concentration (i.e., loading). The prepregging process involved solution impregnation under 2-5 MPa pressure. The concentration of BMI resin in the solution was adjusted to ensure low viscosity for facilitating impregnation. The residual solvent (i.e., acetone) was removed from the MWNT/BMI prepreg using a vacuum oven at 80° C. for 2 hours, resulting in the BMI/MWNT prepreg.

Second, six layers of the MWNT sheet prepregs were stacked together and cured by the hot-press process under 5-20 MPa pressure following the curing cycle of: 375° F. (190.5° C.) for 4 hours and then 440° F. (226.7° C.) for 2 hours. The weight percentage of the nanotubes was determined by the weight of total amount of the MWNT sheets used during composite fabrication. The MWNT weight ratio in the final composite was controlled to the range of 60±2 wt %. The weight fractions of the randomly oriented, 30%-, 35%-, and 40%-stretched MWNT composite samples were 60 w %, 61.7 wt %, 60.5 wt % and 61.7 wt %, respectively. The densities of MWNT and BMI resin were 1.8 g/cm³ and 1 25 g/m³, respectively. The measured density values of the composite samples are 1.525, 1.536, 1.530 and 1.536 g/cm³ respectively.

Hence, the calculated void volume fractions were 0.367 vol %, 0.286 vol %, 0.227 vol %, 0.286 vol % for the samples, respectively. For comparison purposes, the void volume fraction requirement of conventional structural carbon fiber composites was less than 2 vol %. Hence, the samples had good wetting between MWNTs and BMI resin, indicated by the low void volume content.

Characterization

Mechanical properties tests were conducted using a Shimadzu machine with crosshead speed of 1 mm/min and gauge length of 20 mm under room temperature. The strain was recorded by Shimadzu non-contact video extensometer DVE-201. The specimens were cut into a dog-bone shape with a length of 35 mm and a working length of 20 mm and thickness of 60 mm according to ASTM D638. After the tensile tests, the fracture surface morphology of the specimens was coated with a gold layer and observed using an electronic scanning microscope (JEOL JSM-7401F USA, Inc.). DMA was performed on a DMA 800 machine (TA instrument Inc.) using the film mode with a constant frequency of 1 Hz from room temperature to 400° C. with a heating rate of 5° C./min.

Figure 17:
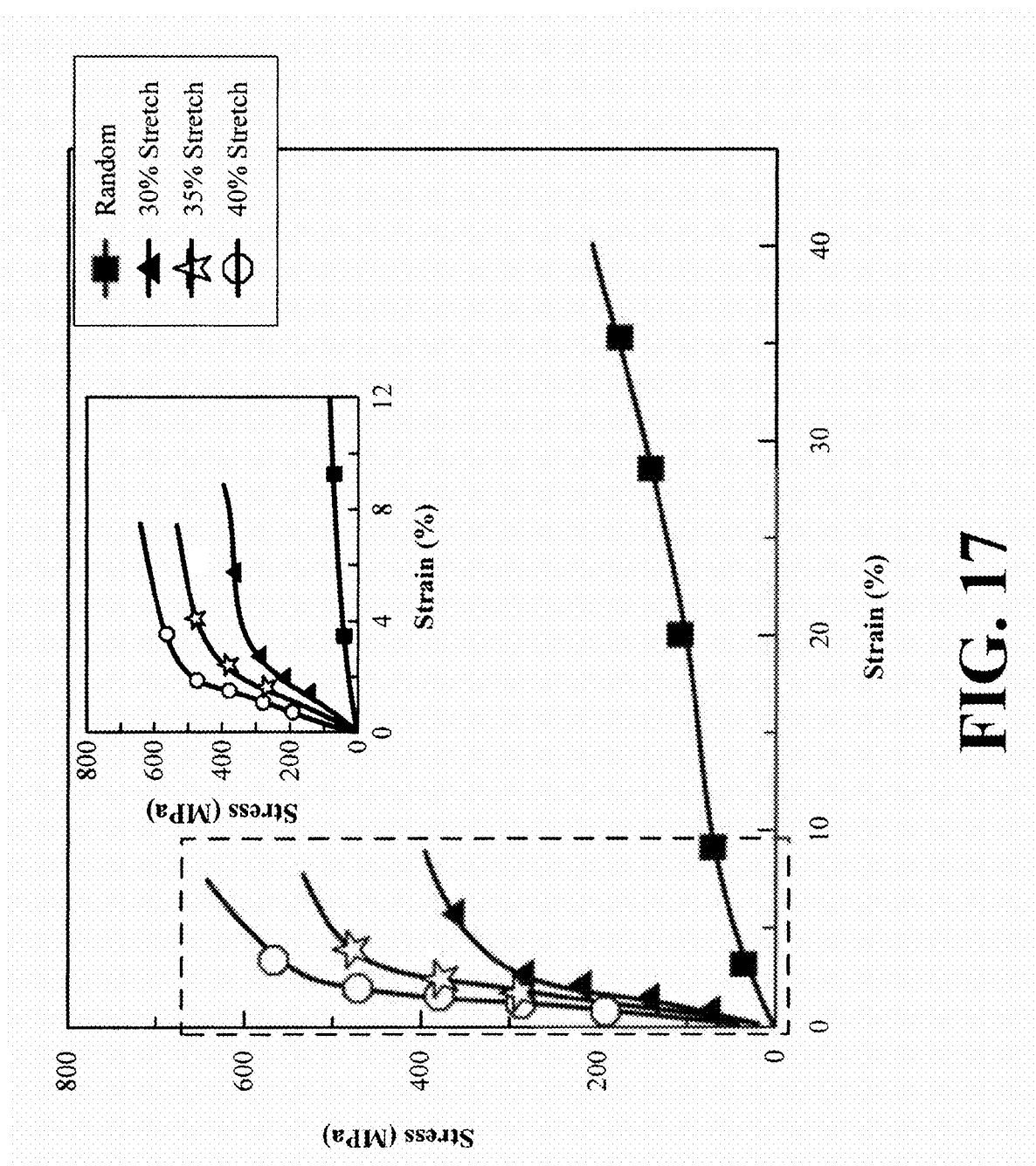
FIG. 17 is a graph showing the stress-strain curves of neat MWNT sheets of different stretch ratios made in Example 3.

Load carrying along the alignment direction was seen in the post-stretching samples. The mechanical properties of the neat (i.e., without polymer binders or resin) MWNT sheets of different stretch ratios were measured, as shown in FIG. 17. The tensile strength at break and Young's modulus of a randomly dispersed CNT sheet (the control sample) were approximately 205 MPa and 1.10 GPa, respectively. During stretching, the MWNTs self-assembled and aligned themselves along the load direction.

Along the alignment direction, the mechanical properties were also improved. The tensile strengths increased to 390 MPa, 508 MPa, and 668 MPa for the 30%, 35%, and 40% stretched samples, corresponding to 90%, 148% and 226% improvements, respectively. The post-stretch Young's modulus measurements along the alignment direction showed even more dramatic improvements, from 1.10 GPa for the randomly dispersed sheet (pre-stretch) to 11.93 GPa, 18.21 GPa, and 25.45 GPa, respectively, showing of 10-, 16-, and 22-fold improvements. Compared to other CNT sheets, the MWNT sheets used in this study resulted in more entanglements that maintained the integrity of the nanotube networks due to a large aspect ratio. As a result, their mechanical properties and creep resistance were relatively high.

Figure 18:
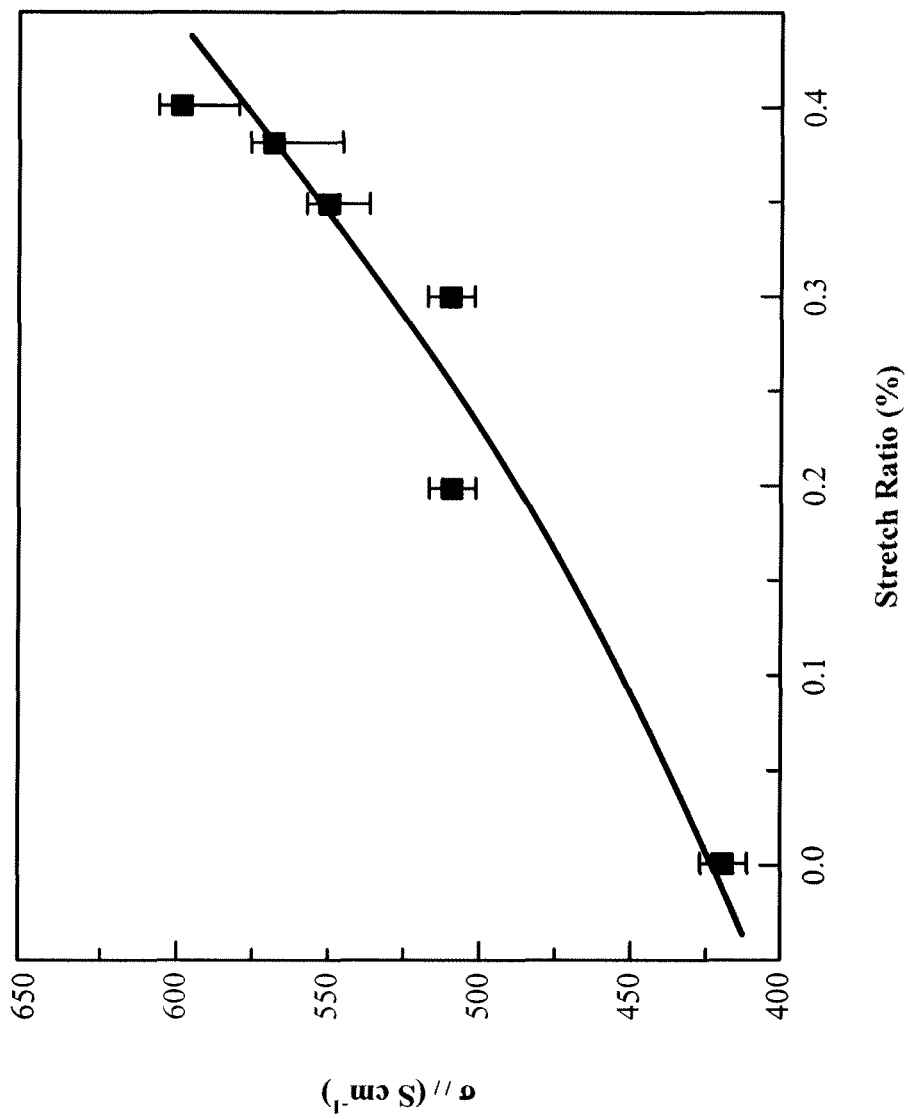
FIG. 18 is a graph showing the electrical conductivity measurements of the neat MWNT sheets made in Example 3 paralleled to the alignment direction.

FIG. 18 shows the electrical conductivity measurements of the neat MWNT sheets paralleled to the alignment direction. The electrical conductivity was higher with the increased stretch ratio. Electrical conductivity ($\sigma_{//}$) paralleled to the alignment direction increased from 420 S/cm in the pre-stretched CNT sheets to 600 S/cm in the CNT sheet with a 40% stretch ratio. The electrical conductivity of the stretched sheets was not very high likely because the neat MWNT sheets were still porous.

Mechanical Properties and Fracture Morphology of MWNT Sheet/BMI Nanocomposites

The MWNT/BMI composites demonstrated a relatively large 2.0-2.5% failure strain as compared to carbon-fiber-reinforced composites, which are typically in the range of 0.6-1.8%. The large tensile strains exceeded 2.0% because of the CNTs' intrinsic flexibility, high failure elongation, and high deformability of the MWNT networks in the sheets, as shown in FIG. 17. The tensile strength of the randomly dispersed MWNT/BMI composite (the control sample) was approximately 620 MPa, and the Young's modulus was 47 GPa. After stretching to improve alignment and nanotube packing, the mechanical properties dramatically increased. The tensile strength and Young's modulus of the 30%-stretched CNT/BMI composite were 1,600 MPa and 122 GPa, respectively. When the stretch ratio increased to 35%, the tensile strength and Young's modulus increased respectively to 1,800 MPa and 150 GPa. The tensile strength and Young's modulus of the 40%-stretched MWNT/BMI composite were as high as 2,088 MPa and 169 GPa, respectively.

The total number of nanotubes in the axial tensile direction dramatically increased (shown in FIG. 16) with an increase in degree of alignment. Efficiency of both load carrying and transfer for the aligned nanotubes in the axial tensile direction was significantly enhanced, leading to dramatically higher mechanical properties. For example, the 40%-stretched sample had an alignment degree of the MWNTs along the axial direction of ~0.8 (seen in FIG. 16), which meant about 80% of the nanotubes were probably aligned along the stress direction to carry a load when the tensile stress was applied. Interfacial bonding between the CNTs and resin matrix was also a relevant factor. Typically, the CNT and polymer chain are weak due to CNTs' atomically smooth surfaces.

Figure 19A:
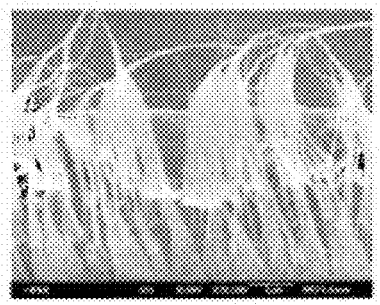
FIGS. 19A-C are SEM micrographs showing the fracture surface morphology a 40%-stretched specimen after tensile tests as described in Example 3.
Figure 19B:
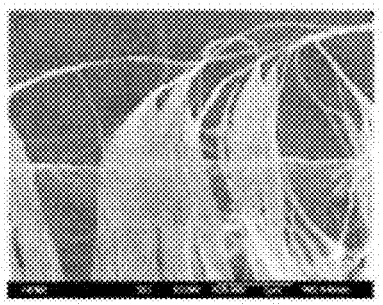
Figure 19C:
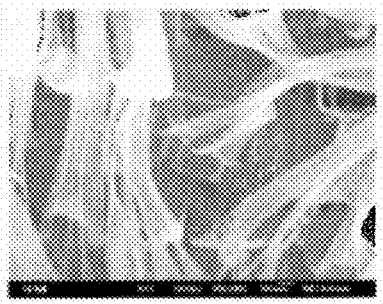

FIG. 19A shows the fracture surface morphology of a 40%-stretched specimen after tensile tests. The MWNTs were peeled off as very thin and transparent films. BMI resin was suspected to coat on the nanotube bundle surface because high nanotube concentration and no bulk neat resin fractures were observed. This peeled off failure mode was not a result of individual MWNT sheets sliding to each other because the thickness of individual sheet is more than 10 μm. The thickness of the peeled off thin films are much less than 100 nm (FIG. 19C). Many stretch deformations of the MWNT/BMI thin films were observed, indicating effective load transfer between the MWNTs and BMI resin matrix in the composites. The evidence of MWNT slippage failure mode also was seen in FIGS. 19A and 19B. The MWNTs were pulled out from the composites and became very stretched strips with obvious diameter change and sharp breaks at the end due to MWNT slippage within the bundles. Furthermore, although the resultant composites showed record-high mechanical properties. almost no broken nanotubes were seen evidence that the full potential of CNTs' strength has yet to be completely realized. The formed CNT/BMI thin films were transparent (seen in FIG. 19B), indicating that the thickness consisted of only a few layers of well-spread nanotubes. The spreading of nanotube bundles meant the MWNT ropes morphed from original round and large-diameter shapes into flat thin-film shape during to mechanical stretching and prepregging processes. Such thin-film strips of nanotube assemblies have more nanotubes at the outmost layer to interact with other nanotube assemblies and resin matrix to achieve good load transfer. The MWNTs were also well-aligned along the loading direction, which helped in realizing good load carrying. Such unique microstructures of the MWNT/BMI nanocomposites were results of the mechanical stretching and prepregging under pressure.

Thermal Mechanical Performance of MWNT Sheet/BMI Nanocomposites

DMA tests were conducted to confirm measured Young's modulus and measure glass transition temperature ($T_g$) values of the MWNT/BMI samples. The results were similar to those see in the composites of Example 2. The storage modulus measurements of the composites were 55 GPa, 123 GPa, 147 GPa, and 172 GPa for the pre-stretched sample (the control sample), 30%-, 35%-, and 40%-stretched MWNT/BMI samples, respectively. The storage moduli of the CNT/BMI composites were consistent with the Young's modulus values in the tensile testing.

Electrical Conductivity of MWNT/BMI Nanocomposites

The electrical conductivities of the MWNT/BMI composites were also similar to those of the composites made in Example 2.

Conclusions

In summary, high mechanical and electrical properties of MWNT/BMI composites were realized. The coupling effects of MWNTs an average length of at least 1 millimeter, mechanical stretching, and prepregging under high pressures led to high loading, good alignment, and enhanced load transfer. These factors led to mechanical property improvements.

Additionally, successful dispersion of the nanotube ropes into spread-out extra-thin films led to better contacts among MWNTs, giving rise to effective load transfer and enhanced electrical conductivity. Integration of the high mechanical properties and electrical conductance indicated these MWNT/BMI composites will lead to excellent materials for lightweight composite conductors for a wide range of multifunctional/structural applications.

Example 4

Functionalized CNT sheets were used to reinforce BMI composites. The mechanical properties of the resultant CNT sheet/BMI composites were normalized to 60 vol % nanotube volume content and compared with the unidirectional (UD) carbon fiber composites. These composites demonstrated mechanical properties beyond aerospace—grade unidirectional carbon fiber composites for structural applications.

Materials and Functionalized CNT Sheet/BMI Nanocomposite Fabrication

Randomly oriented CNT sheets (supplied by Nanocomp Technologies Inc.) were mechanically stretched using an AGS-J Shimadzu machine to substantially improve nanotube alignment as described in Example 3. The resin system used was Cytec's BMI 5250-4 resin, which contains three components, 4,4'-bismaleimidodiphenylmethane, o,o'-diallyl bisphenol A and BMI-1, 2-tolyl. According to a phenol-epoxy curing mechanism, the active epoxy groups can react with hydroxyl groups of o,o'-diallyl bisphenol A. Hence, epoxidation functionalized CNTs were used to realize covalent bonding with BMI resin matrices. This functionalization method was suitable for tailoring the degree of functionalization (DOF) using a gentle reaction condition to avoid damage of preformed nanotube alignment and sheet structural integrity.

Peroxide acid (m-chloroperoxybenzoic acid, m-CPBA) was used to treat single-walled carbon nanotubes (SWNT) and introduce an epoxy ring on the structure of the SWNTs. Both randomly dispersed and aligned CNT sheets were treated with a m-CPBA solution prepared in the same manner as the m-CPBA solution of Example 3 to realize a tailored 4% functionalization degree to minimize CNT structure damage and composite mechanical property degradation. Specifically, the aligned CNT sheets were placed in a m-chloroperoxybenzoic acid (m-CPBA)/dichloromethane solution for epoxidation functionalization, and then washed using dichloromethane to remove residual m-CPBA. The functionalized CNT sheets were placed into the vacuum oven at 80° C. for 30 min to evaporate the residual dichloromethane.

Then, CNT sheets were impregnated with BMI 5250-4 resin solution to make individual CNT prepreg sheets with approximately 60 wt % nanotube concentration or loading. The BMI resin solution was prepared in the same manner as the BMI resin solution described in Example 3. The prepregging process was a solution impregnation process. The residual solvent (acetone) was removed under 80° C. in the vacuum oven for 2 hours to make BMI/CNT sheets prepreg. Six prepreg layers were stacked together and cured by the hot-press with 5-20 MPa pressure following the curing cycle: 375° F. for 4 hours and then 440° F. for 2 hours. The CNT weight fraction in the final composites was 60±2 wt %.

Figure 20:
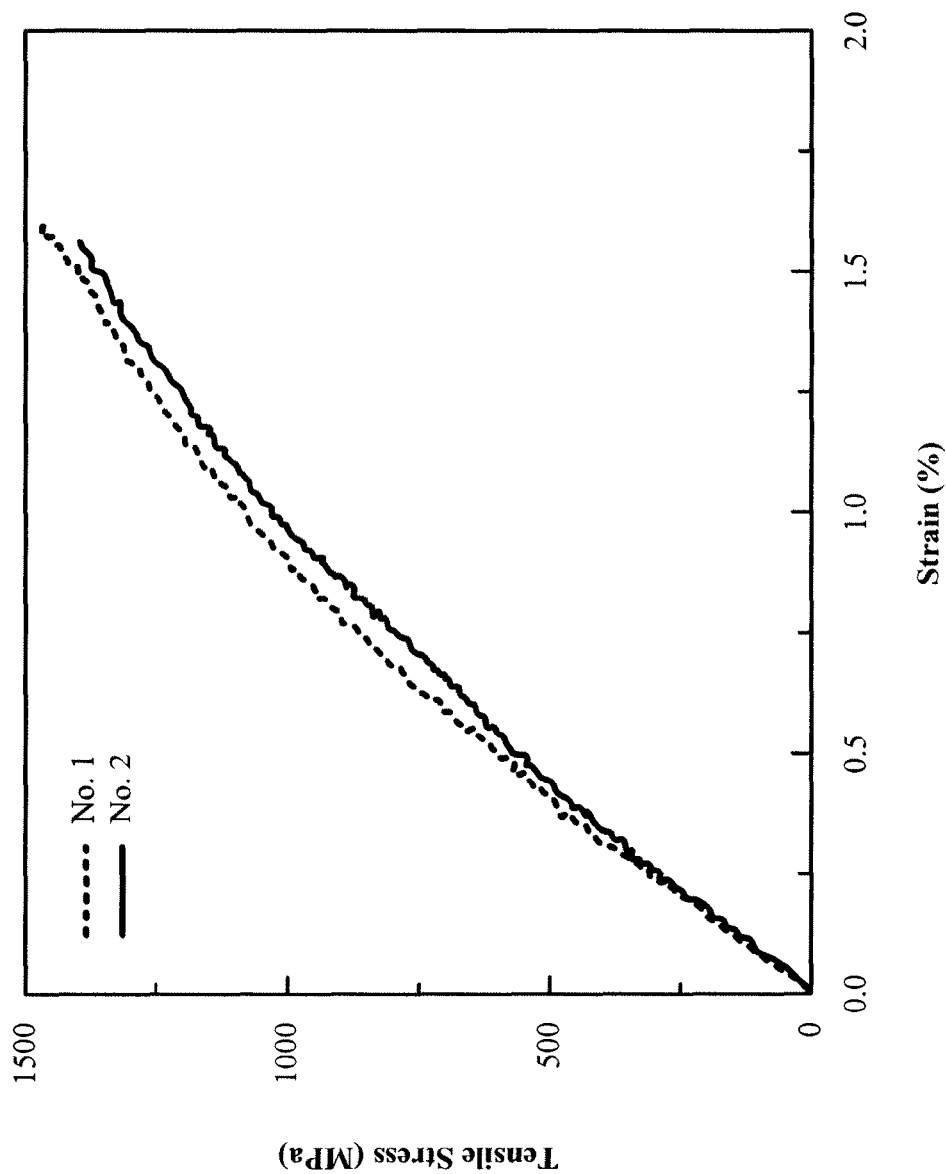
FIGS. 20-22 are graphs showing typical tensile stress-strain curves of functionalized CNT sheet/BMI composites made in Example 4.
Figure 21:
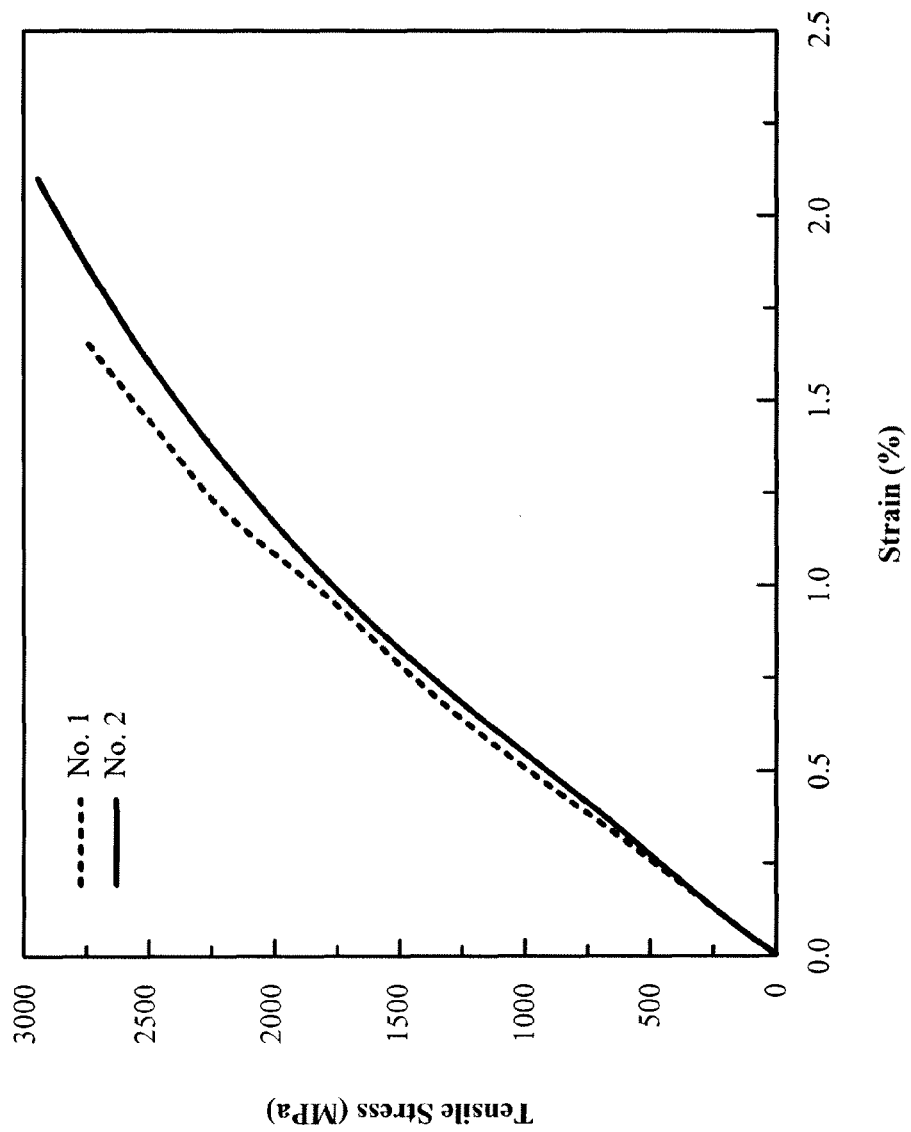
Figure 22:
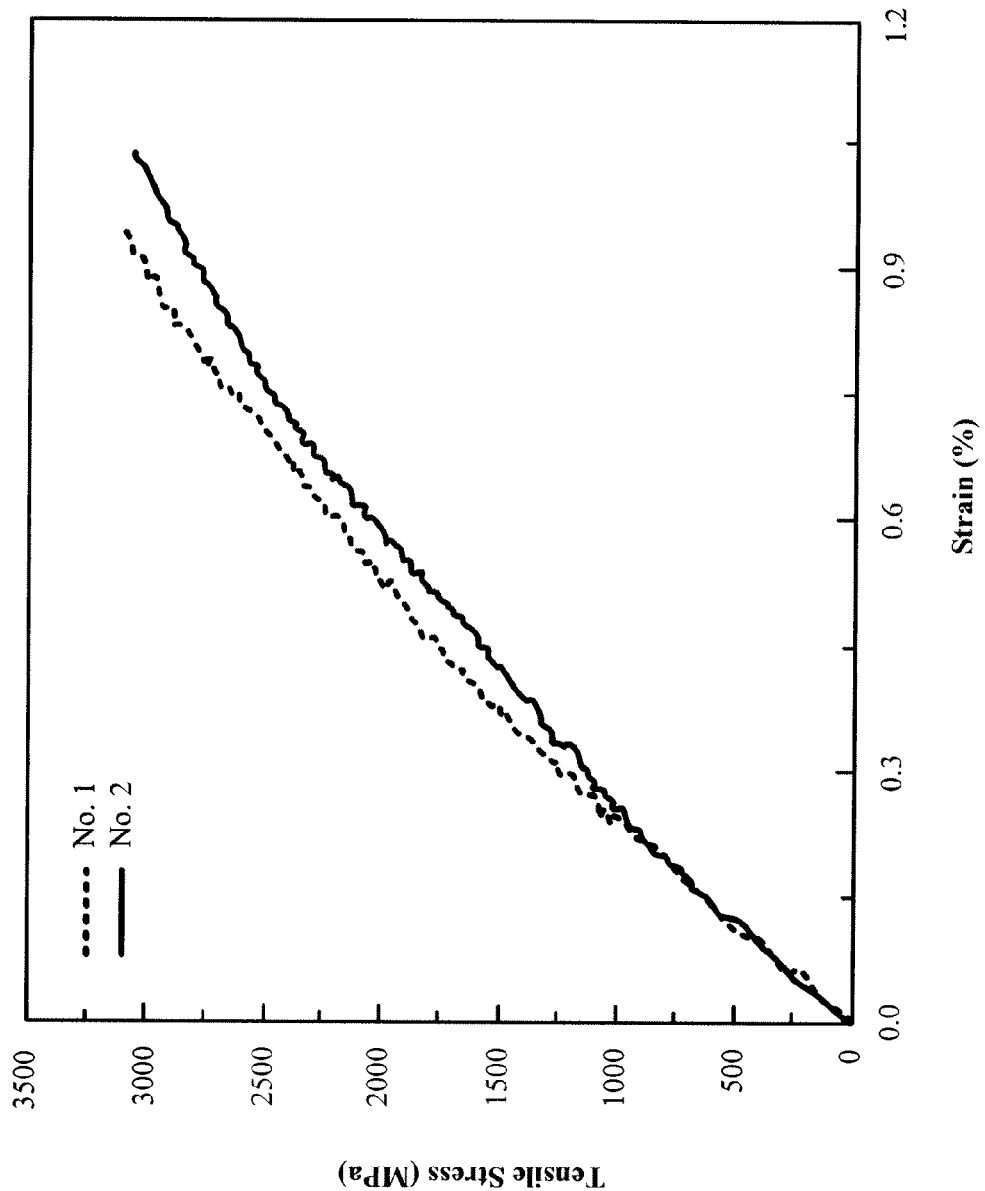

Characterization:

Mechanical properties test were conducted using a Shimadzu machine with crosshead speed of 1 mm/min and the gauge length of 20 mm under room temperature. The strain ratio was recorded by Shimadzu non-contact video extensometer DVE-201. The specimens were cut into dog-bone shape with a length of 35 mm and thickness of 60 μM according to ASTM D638. The typical tensile stress-strain curves of functionalized CNT sheet/BMI composite are shown in FIGS. 20-22. After the tensile tests, the fracture surface morphology of the specimens was coated with a gold layer and observed using an electronic scanning microscope (JEOL JSM-7401F USA, Inc.). DMA was performed on a DMA 800 machine (TA instrument Inc.) using the film mode with a constant frequency of 1 Hz from room temperature to 400° C. with a heating rate of 5° C./min. The electrical conductivity of the functionalized CNT sheet/BMI composites was measured using the four-probe method.

Figure 23:
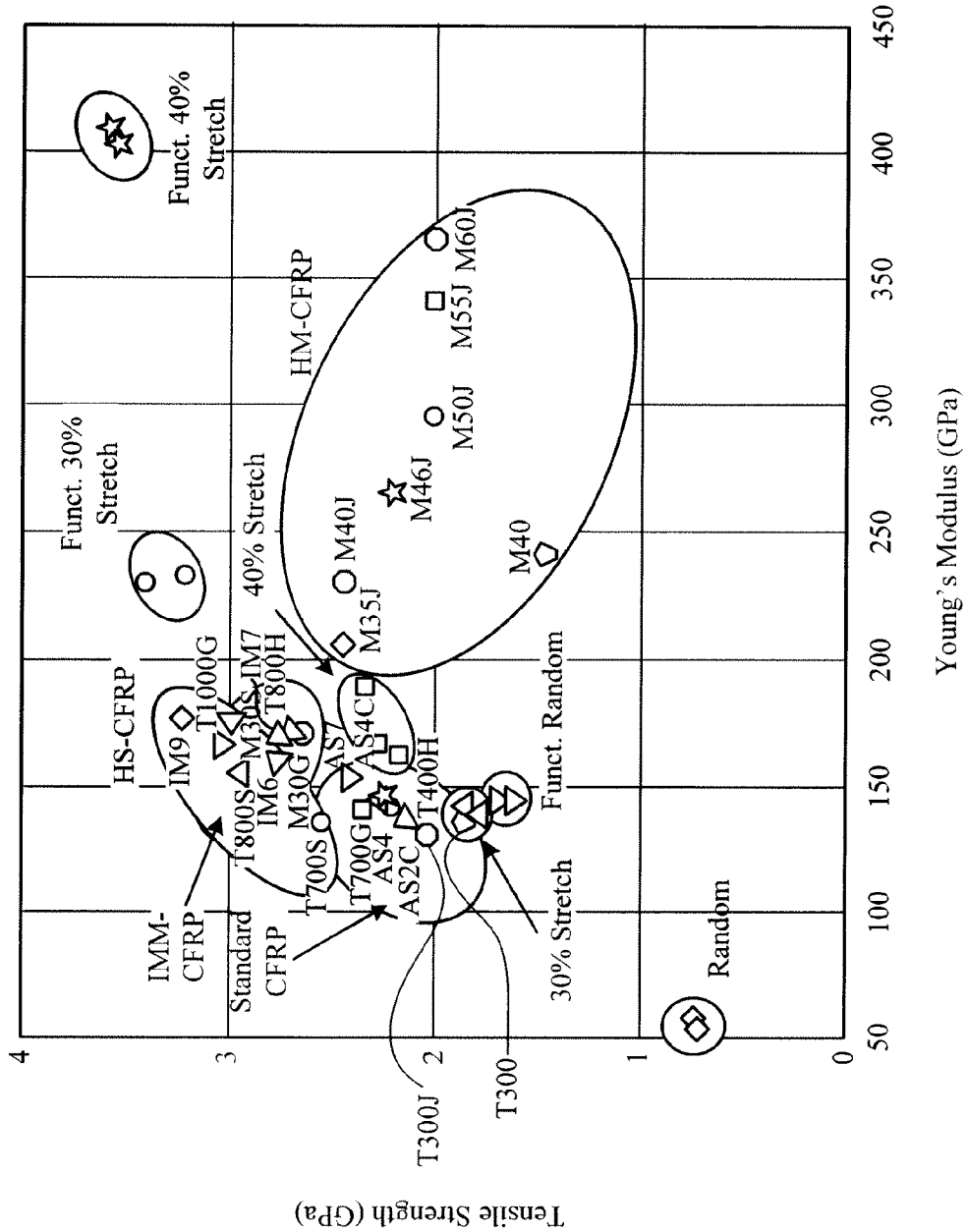
FIG. 23 is a graph showing the mechanical properties of CNT sheet/BMI composites made in Example 4 as compared to UD carbon fiber reinforced composites.

As shown in FIG. 23, the mechanical properties of pristine 40% stretch (stretched to a 40% strain to increase nanotube alignment) CNT sheet/BMI composites achieved the mechanical properties of standard UD carbon fiber reinforced composites, such as AS4 and T300 carbon fiber composites. After functionalization, the mechanical properties of functionalized 40% stretch alignment CNT sheet/BMI composites were improved to an even higher level. The Young's modulus exceeded that of highest-modulus carbon fiber composites, such as M60J epoxy composite, and the tensile strength was 15-20% higher than that of high-strength T1000G epoxy composites.

Figure 24:
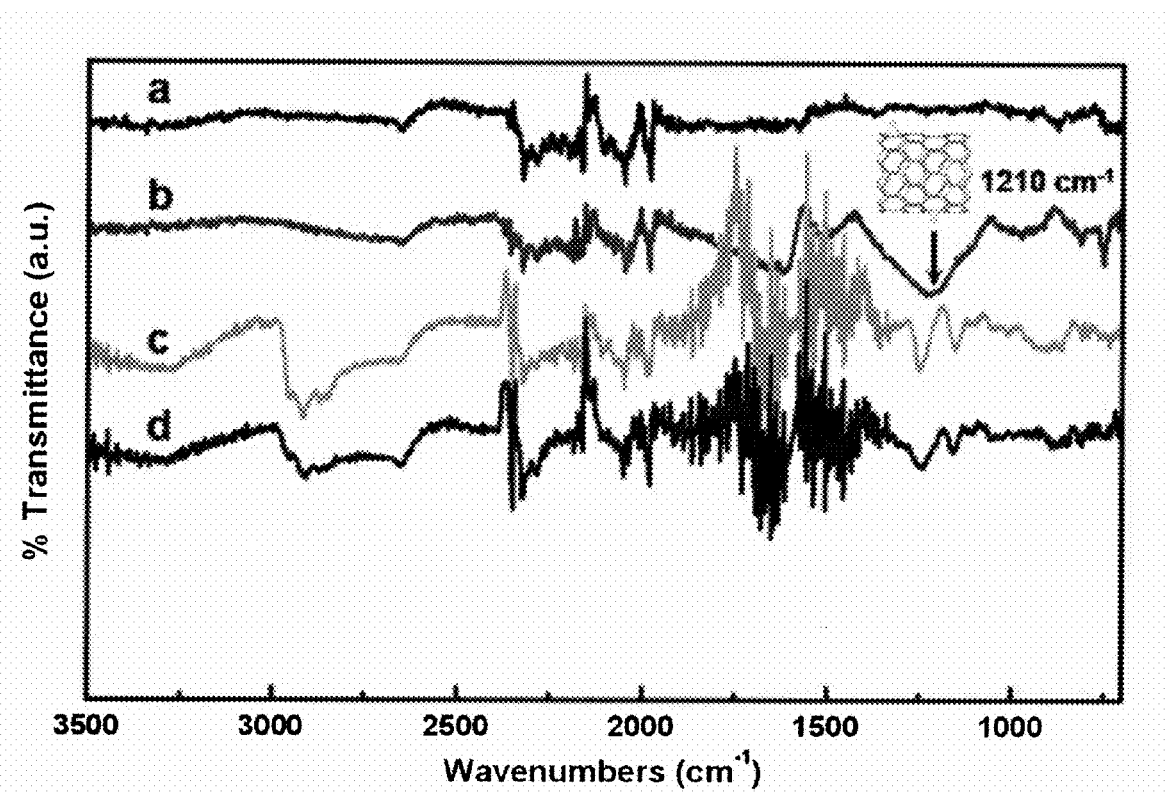
FIG. 24 is a graph of ATR-FTIR spectra of pristine CNTs, functionalized CNTs, and pristine and functionalized aligned (40% stretch) CNT sheet/BMI composites made in Example 4 (Trace a: pristine CNT; Trace b: expoxidation functionalized CNT; Trace c: pristine 40% aligned CNT/BMI nanocomposite; Trace d: functionalized 40% aligned CNT/BMI nanocomposite).

FIG. 24 is a graph of ATR-FTIR spectra of pristine CNTs, functionalized CNTs, and pristine and functionalized aligned (40% stretch) CNT sheet/BMI composites. The peak at 1210 $cm^{-1}$ was attributed to epoxy ring groups, which confirms the epoxy group successfully attached to the CNT structure. After curing with BMI resin (see Trace d), the peak at 1210 $cm^{-1}$ dispeared, which indicated the epoxy ring group reacted with BMI resin. The FTIR spectra of pristine CNT sheet/BMI composite is shown in Trace c. Both FTIR spectra were almost same, which further confirms the epoxy rings on the CNT structures reacted to form covalent bonding with the BMI resin matrix.

Figure 25:
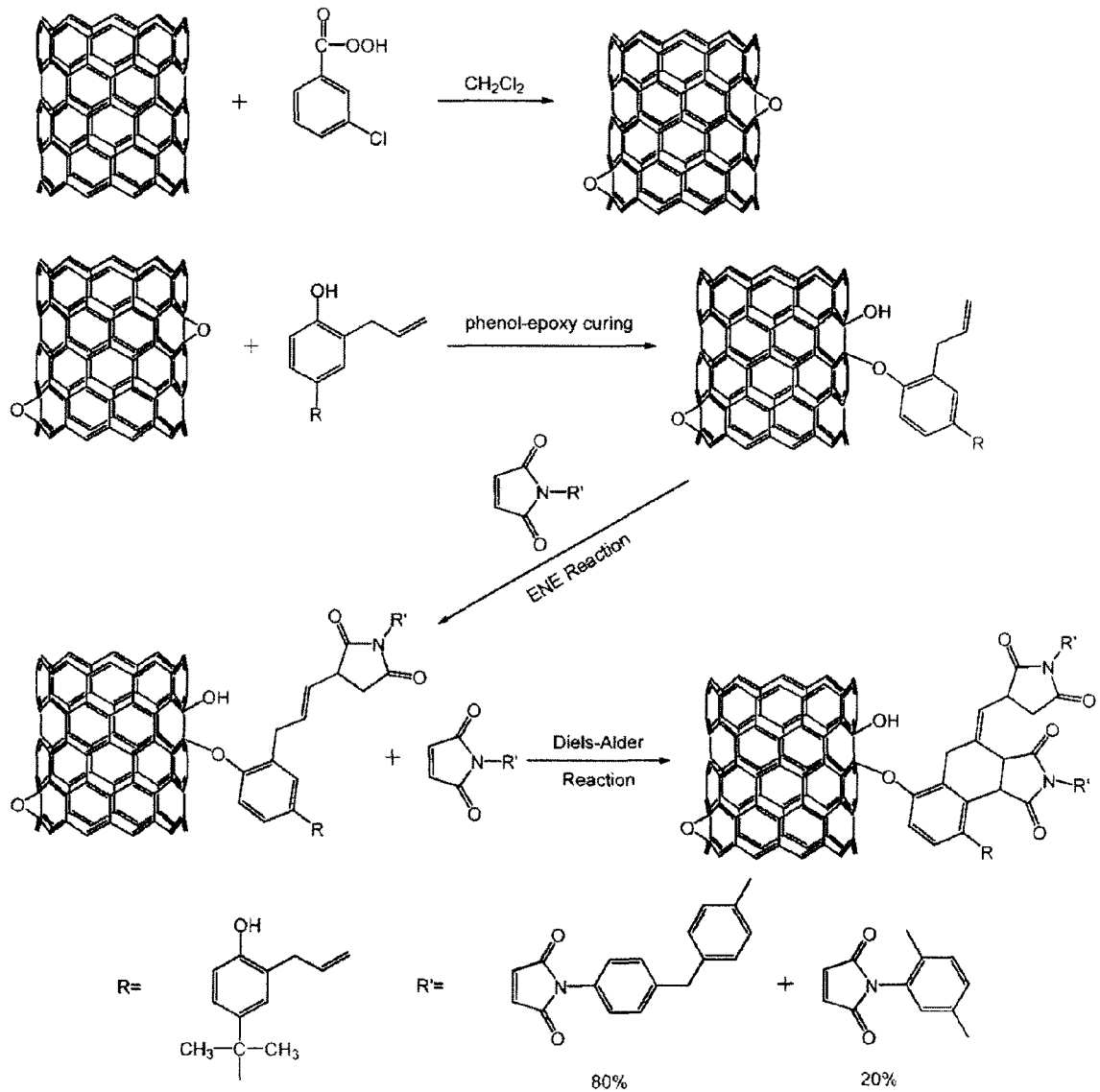
FIG. 25 shows the proposed reaction mechanism for functionalization of CNTs as described in Example 4.

FIG. 25 shows the proposed reaction mechanism. The epoxide groups of functionalized CNT first reacted with o,o'-diallyl bisphenol A in accordance with the mechanism of epoxy-phenol reaction. Then, the derivative reacted with the other two BMI components to form the three dimensional crosslinked structures through ENE and Diels-Alder reactions. The formation of carbon-oxygen bonds between CNT and BMI resin dramatically enhanced the interfacial bonding, and hence the load transfer efficiency was improved after functionalization.

Figure 26:
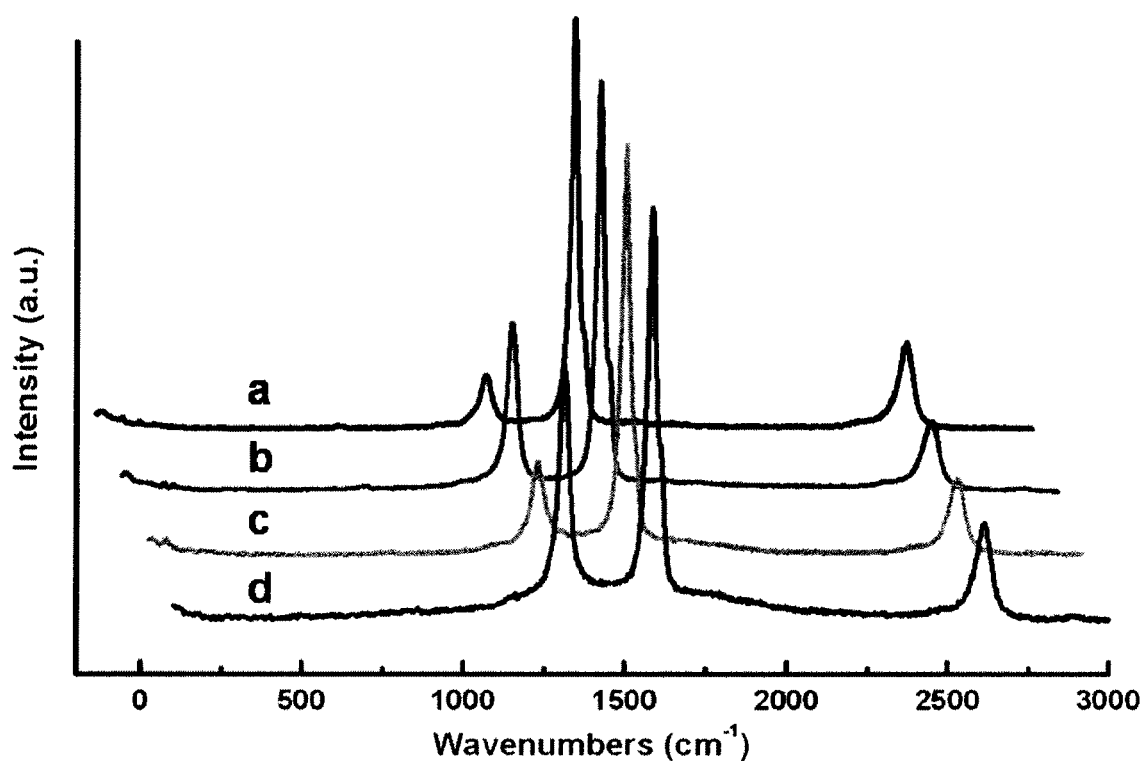
FIG. 26 is a graph of the Raman spectrometer data for the curing mechanism described in Example 4.

The curing mechanism was also studied using a Raman spectrometer. The intensity ratio of disorder band (D band at ~1310 $cm^{-1}$) with G band (~1580 $cm^{-1}$) of the functionalized CNT increased, which indicates the formation of epoxy rings on the structure of the CNTs, as shown in FIG. 26. The R-value ($I_D/I_G$) of pristine CNTs was 0.13. After functionalization, the $I_D/I_G$ value increased up to 0.41. In the pristine CNT sheet/BMI composite, the $I_D/I_G$ value increased to 0.23 due to the coupling effect of CNTs and BMI crosslinked structure. For functionalized CNT sheet/BMI composite, the $I_D/I_G$ further increased up to 0.62, which further indicates stronger interactions, possibly due to the formation of chemical bonding between the functionalized CNT with BMI resin.

Figure 27:
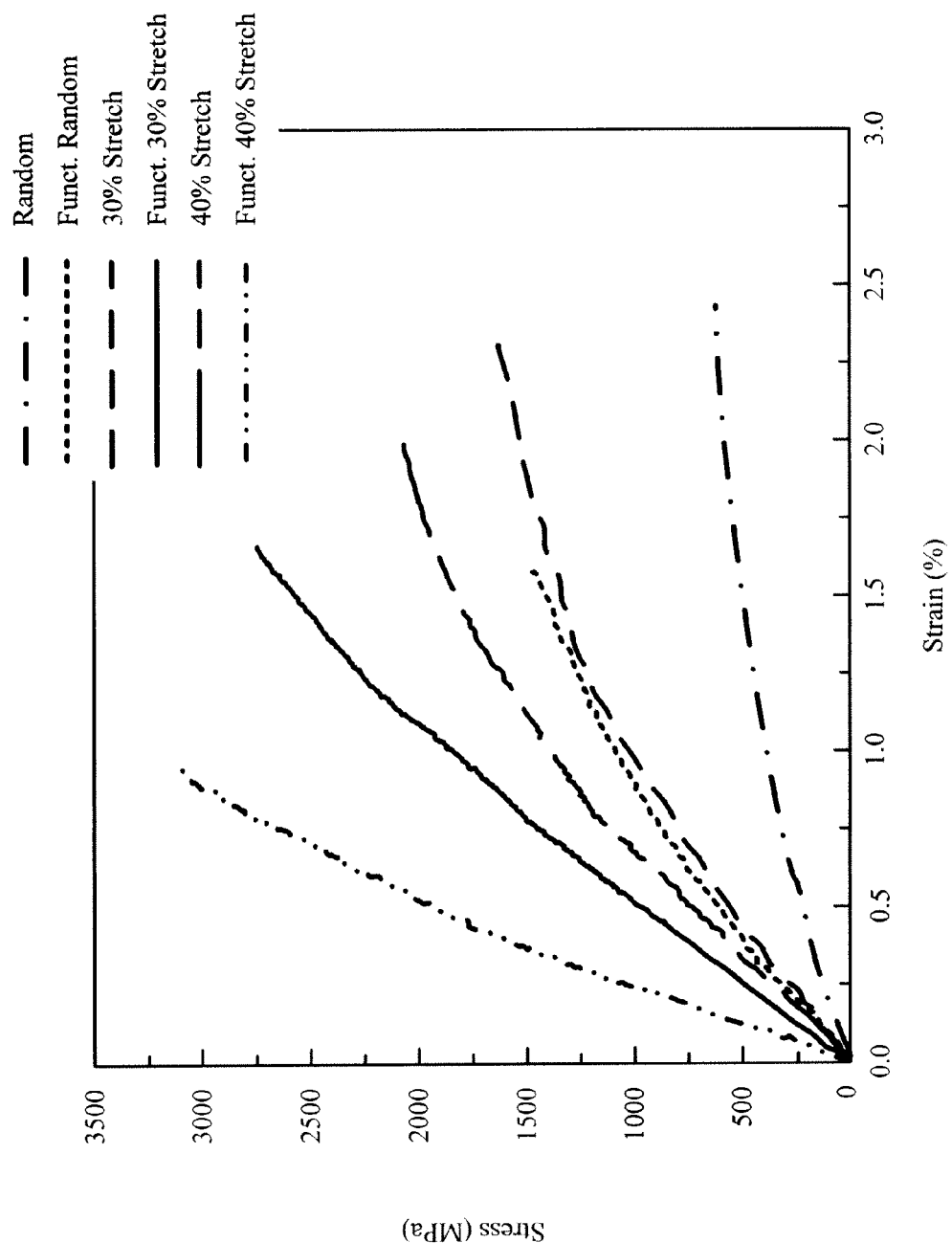
FIG. 27 shows the typical stress-strain curves of CNT sheets reinforced BMI nanocomposites made in Example 4 along the nanotube alignment direction.
Figure 28A:
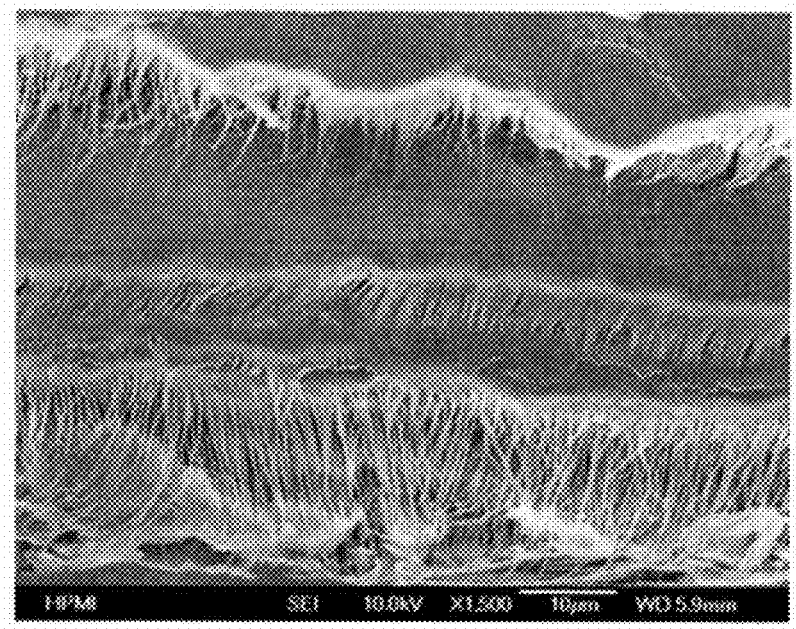
FIGS. 28A-B are SEM micrographs showing the fracture surface morphology of a functionalized 40% stretch alignment specimen after tensile testing as described in Example 4.
Figure 28B:
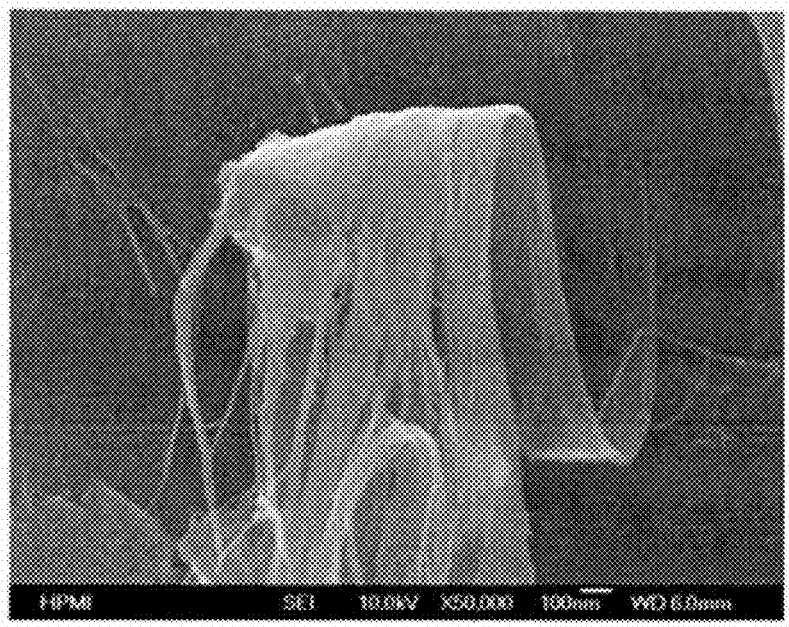

FIG. 27A shows the typical stress-strain curves of CNT sheets reinforced BMI nanocomposites along the nanotube alignment direction. For pristine random CNT sheet reinforced BMI nanocomposites, the tensile strength and Young's modulus dramatically increased as the alignment degree increased. The degree of nanotube alignment had a significant impact on the mechanical properties. The results show the degree of CNT alignment can reach as high as 80% along the stretching or alignment direction when the CNT sheets were stretched to a 40% strain. The tensile strength and Young's modulus of the resultant CNT sheet/BMI composites were as high as 2,088 MPa and 169 GPa, respectively.

After functionalization to introduce epoxy groups on the CNTs and then covalently bonding with the BMI resin matrix, the mechanical properties of the resultant nanocomposites were dramatically improved. The tensile strength and Young's modulus of functionalized random CNT sheet/BMI nanocomposites reached up to 1,437 MPa and 124 GPa, respectively, which is two times greater than that of pristine random CNT sheet/BMI nanocomposites previously reported. For functionalized 30% stretch alignment CNT sheet/BMI nanocomposites, the tensile strength and Young's modulus reached up to 2,843 MPa and 198 GPa, which is a 78% and 62% improvement above that of the pristine 30% stretch alignment CNT sheet/BMI nanocomposites. For functionalized 40% stretch alignment CNT sheet/BMI nanocomposites, the tensile strength and Young's modulus reached up to 3,081 MPa and 350 GPa, which are 48% and 107% improvements over that of pristine 40% stretch CNT sheet/BMI nanocomposites. However, the failure strain of functionalized CNT sheet/BMI nanocomposites decreased sharply, as shown in FIG. 27A. The failure strain of functionalized 40% stretch alignment CNT sheet/BMI nanocomposites dropped to 0.95%. This may be due to two possible reasons: (1) the formation of covalent bonding significantly reduced nanotube pullout and restricted nanotube network deformation capability and (2) possible nanotube structural damage due to the functionalization resulted in a loss of certain degree of ductility of the CNTs. Therefore, degree of functionalization should be examined and optimized to improve strength and modulus without sacrificing failure strain. Here, the degree of functionalization was adjusted to 4% to minimize CNT damage and failure strain reduction of the composites.

Figure 29A:
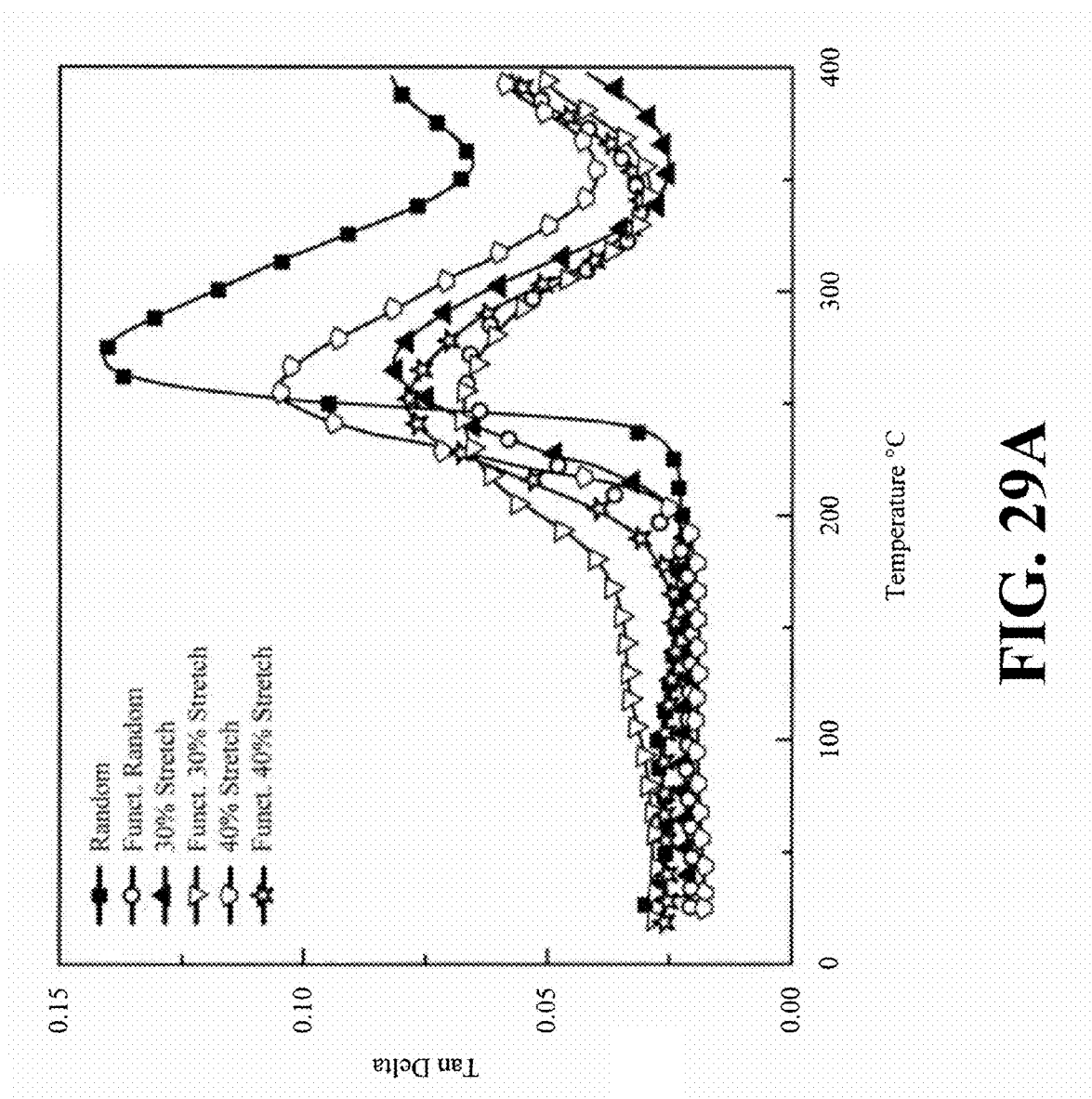
FIGS. 29A-B are graphs showing dynamic mechanical analysis (DMA) results for the samples made in Example 4.
Figure 29B:
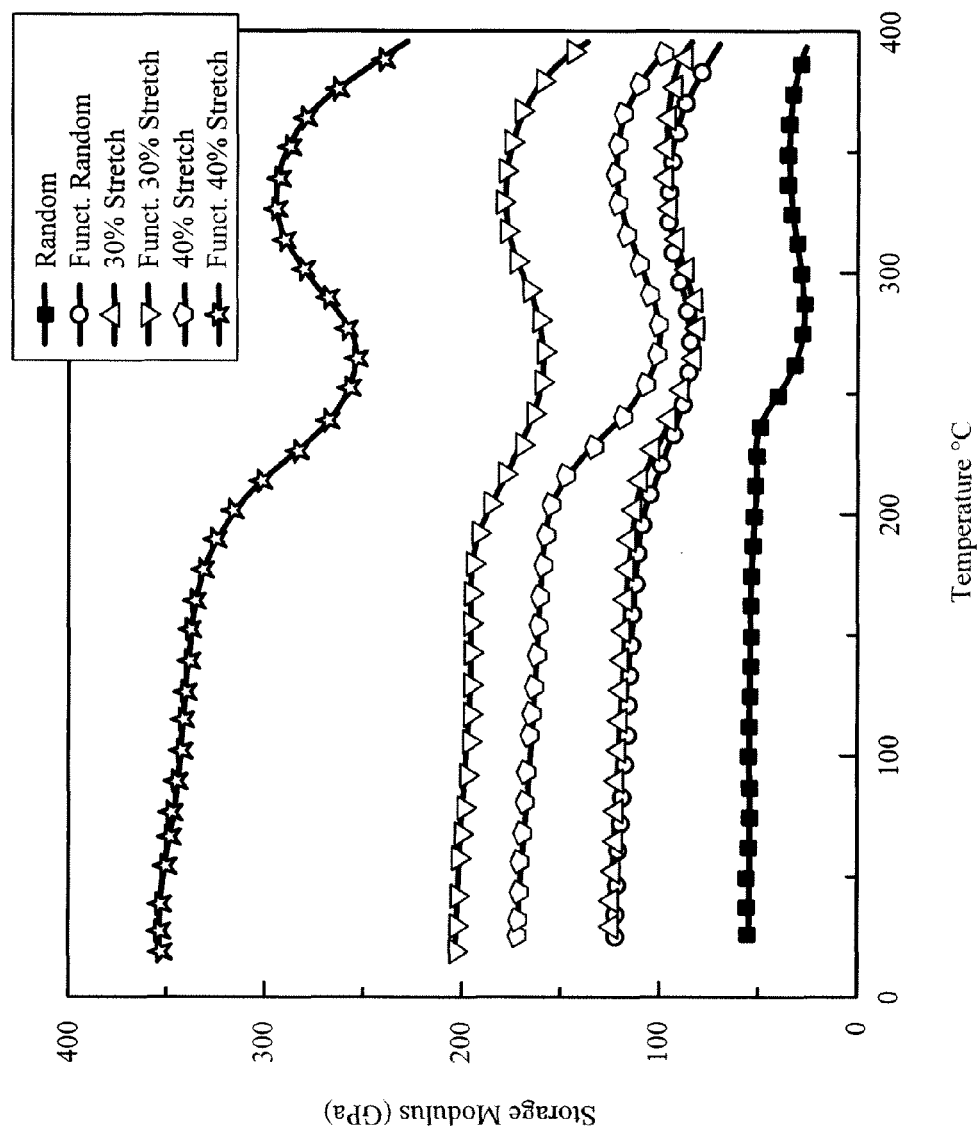

FIGS. 29A-B show the fracture surface morphology of a functionalized 40% stretch alignment composite after tensile testing. Rather than peeling off as seen in the pristine CNT sheet/BMI samples previously reported, it can be seen that BMI resin and aligned CNT layers adhered well due to good interfacial bonding. Although the interfacial bonding and load transfer efficiency were dramatically improved with this chemical functionalization, resulting in the high mechanical properties exceeding that of the state-of-the-art aerospace—grade unidirectional carbon fiber composites, many CNT slippage and pulled-out modes were still observed. Also, most of nanotubes were not broken after tensile testing, which implies the full potential of CNTs' strength has yet been achieved.

Figure 30:
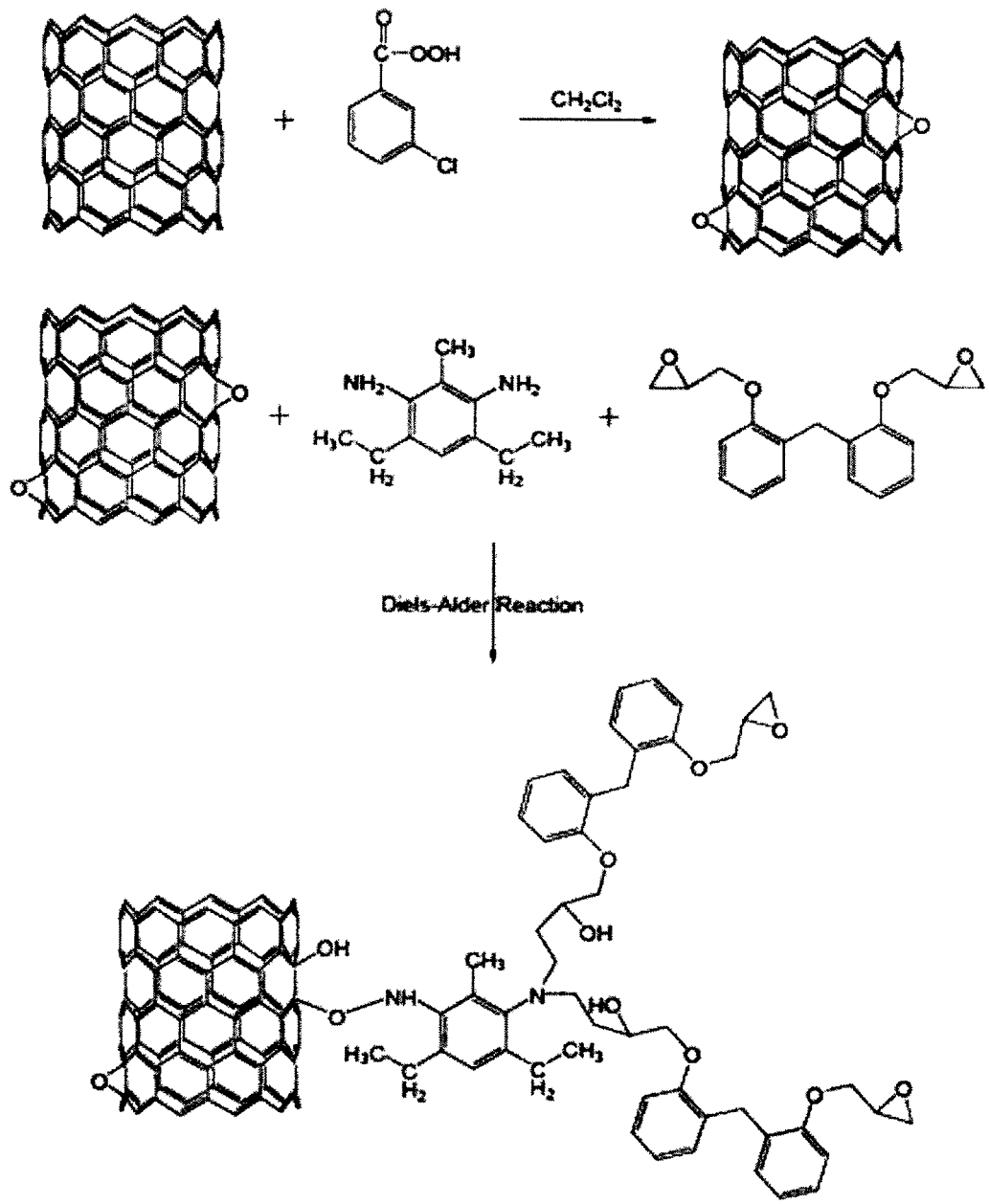
FIG. 30 shows the reaction mechanism between the functionalized CNTs and epoxy resin matrix as described in Example 5.

FIGS. 30A-B show dynamic mechanical analysis (DMA) results. Table 1 shows the storage modulus of the samples.

TABLE 1

| Specimen | Storage modulus (GPa) | $T_g$ (° C.) |
| --- | --- | --- |
| Pristine random CNT sheet/BMI composite | 55 | 269.98 |
| Functionalized random CNT sheet/BMI composite | 122 | 262.67 |
| Pristine 30% stretch CNT sheet/BMI composite | 123 | 266.77 |
| Functionalized 30% stretch CNT sheet/BMI composite | 203 | 241.80 |
| Pristine 40% stretch CNT sheet/BMI composite | 172 | 256.70 |
| Functionalized 4% stretch CNT sheet/BMI composite | 354 | 247.44 |

The $T_g$s of all CNT sheet/BMI composites dropped due to the introduction of high loading of CNTs, which possibly reduced the crosslink density of the BMI resin matrix. Compared with pristine CNT sheet/BMI composites, the $T_g$ of functionalized CNT composites further dropped, which may be due to the epoxy groups of functionalized CNTs reacting and consuming some functional groups of BMI resin, and hence further reducing crosslink density. However, the $T_g$ drop of the functionalized CNT/BMI composites was only 23° C., and the composites still had a $T_g$ of 247° C. for high temperature applications. Another side effect of chemical functionalization of CNTs is degradation of electrical conductivity. Usually, chemical functionalization will damage original CNT electronic structure and lower the electrical conductivity. In this Example, the degree of functionalization was at a lower level, 4%, to limit electrical conductivity degradation. The electrical conductivities of the functionalized CNT composites only show a small reduction, less than 5%, due to the lower degree of functionalization.

Conclusions

An epoxy group was introduced on CNT structures through epoxidation functionalization, and demonstrated high performance for the CNT sheet/BMI composites, which was beyond the state-of-the-art high strength and high modulus unidirectional carbon fiber composites for structural applications. The limited effect of CNT functionalization on $T_g$ and electrical conductivity was observed due to a tailored low degree of functionalization. The results demonstrate great potential for utilizing CNTs to develop the next generation high-performance composites for wide structural and multifunctional applications.

Example 5

Development of high mechanical properties of CNT reinforced epoxy composites was achieved by tailoring the DOF and improving alignment of CNTs an average length of at least 1 millimeter. The resultant composites showed an unprecedented integration of high strength and modulus, and large failure strain, compared to the state-of-the-art carbon fiber reinforced composites.

Randomly oriented CNT sheets supplied by Nanocomp Technologies Inc. were mechanically stretched using an AGS-J Shimadzu machine to substantially improve nanotube alignment. The aligned CNT sheets were placed in m-chloroperoxybenzoic acid (m-CPBA)/dichloromethane solutions for epoxidization functionalization, and then washed using dichloromethane to remove residual m-CPBA. The functionalized CNT sheets were placed into a vacuum oven set at 80° C. for 30 min to evaporate the residual dichloromethane. Finally, the CNT sheets were impregnated with a 10 wt % epoxy resin solution in acetone to make individual CNT prepreg sheets with approximately 60% nanotube concentration or loading by weight. The concentration of epoxy resin in the solution must be adjusted to ensure low viscosity for facilitating impregnation. Six prepreg layers were stacked together and cured by the hot-press with approximately 1 MPa pressure following the curing cycle: 200° F. for 30 min and then 350° F. for 4 hours. The CNT weight concentration or loading in the final composite samples was controlled in the range of 60±2 wt %.

Millimeter-long (1-2 millimeter) nanotubes used in this example were in thin sheets (20-25 μm), provided by Nanocomp Technologies. Epoxide groups were introduced on the structure of CNT to directly functionalize the CNT sheet materials through epoxidation functionalization, as shown in FIG. 30A. Epoxide groups created on the CNTs were very active and participated in the curing reaction of epoxy resin to realize covalently bonding between the CNTs and epoxy resin matrix. The proposed reaction mechanism between the functionalized CNTs and epoxy resin matrix is shown in FIG. 30A. The epoxy ring group was first introduced through functionalizing CNT sheets in m-CPBA/CH2Cl2 solutions.

Then, the epoxy ring groups on the CNTs reacted with curing agent-diethyltoluenediamine (DETDA). Finally, derivatives reacted with the Epon 862 molecules to form the three dimensional crosslinked structures through the Diels-Alder reaction.

DOF of the functionalized CNTs is defined as the ratio of the number of carbon atoms directly connected with oxygen atoms to the total number of carbon atoms of the CNT. To tailor the DOF values, m-CPBA/dichloromethane solutions of 0.5%, 1%, 2%, 5% and 10% by weight concentrations were made. The functionalization was conducted at room temperature (22-25° C.) by varying reaction times from 10 minutes to 30 hours. The CNT sheets were immersed into the solution for various periods of times, and removed to complete the functionalization without damaging sheet structural integrity. The DOF values were determined by the thermogravimetric analysis (TGA) in the range of 50-800° C. under nitrogen atmosphere.

Mechanical properties test were conducted using a Shimadzu machine with a crosshead speed of 1 mm/min and the gauge length of 20 mm under room temperature. The strain ratio was recorded by Shimadzu non-contact video extensometer DVE-201. The specimens were cut into dog-bone shapes at lengths of 35 mm and 60 μm thick, in accordance with ASTM D638. After the tensile tests, the fracture surface morphology of the specimens was coated with a gold layer and observed using an electronic scanning microscope (JEOL JSM-7401F USA, Inc.). The pristine aligned CNT sheet reinforced epoxy composite was cut perpendicular to the CNT alignment direction using Leica EM UC6/FC6 ultramicrotome (German) and observed by high resolution transmission electron microscopy Tecnai F30 (Philips, Holland).

Results and Discussion

Figure 31:
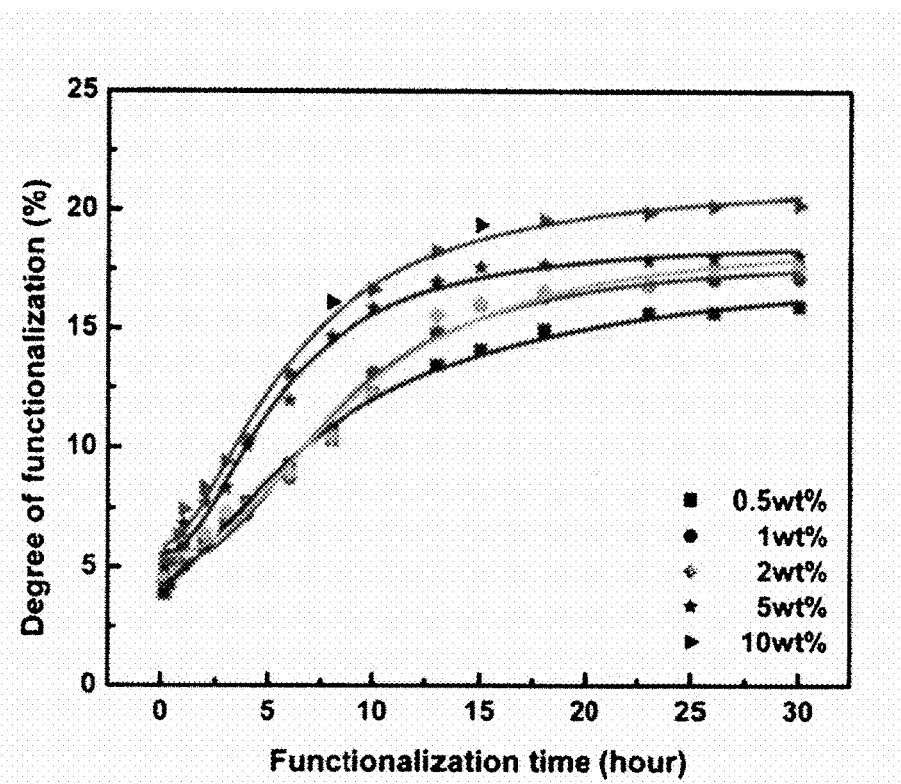
FIG. 31 is a graph showing the curves of degree of functionalization (DOF) versus functionalization time and m-CPBA concentration for the composites made in Example 5.

FIG. 31 shows the curves of DOF versus functionalization time and m-CPBA concentrations. For all cases, the DOF values initially increased rapidly with the reaction time and then reached an almost constant value. With the same treatment time, the DOF increased with the increase of m-CPBA concentration, indicating the desired DOF can be accurately tailored through adjusting reaction time and m-CPBA solution concentration. The goal of introducing the epoxy rings on the structures of CNTs is to facilitate creating covalent bonding between functionalized CNTs and epoxy resin matrix.

Figure 32A:
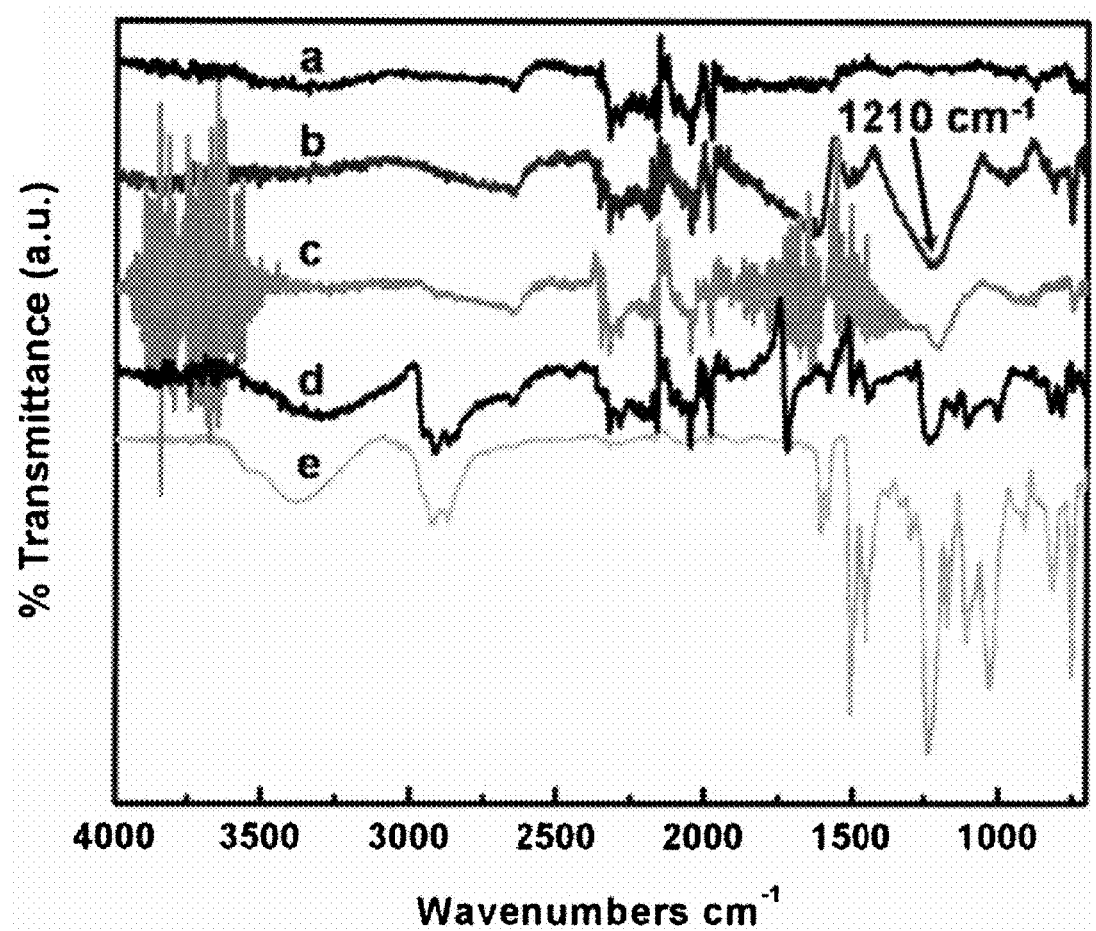
FIG. 32A is a graph showing the attenuated total reflection Fourier transform infrared (ATR-FTIR) spectrum comparison of the composites made in Example 5.

FIG. 32A shows the attenuated total reflection Fourier transform infrared (ATR-FTIR) spectrum comparison to verify the formation and reaction of the epoxide groups on functionalized CNTs ((a) pristine CNT, (b) functionalized CNT, (c) functionalized CNT sheet/epoxy composites, (d) pristine CNT sheet/epoxy nanocomposites and (e) cured neat epoxy resin). Compared with pristine CNTs, the peak of 1210 cm$^{-1}$ of functionalized CNTs was assigned to the carbon oxygen stretching frequency of epoxide moiety as seen in Trace b. After curing with epoxy resin, this peak became smaller, showing that the epoxy ring groups on the CNT reacted with epoxy resin, as seen in Trace c. The ATR-FTIR spectra of pristine CNT sheet/epoxy composite and pure epoxy resin are shown as Traces d and e. The peak of 1210 cm$^{-1}$ still existed in the pristine CNT sheet/epoxy composites due to residual epoxy group of Epon 862 (epoxy resin matrix), same as Trace e of pure cured epoxy resin with the same curing cycle.

Figure 32B:
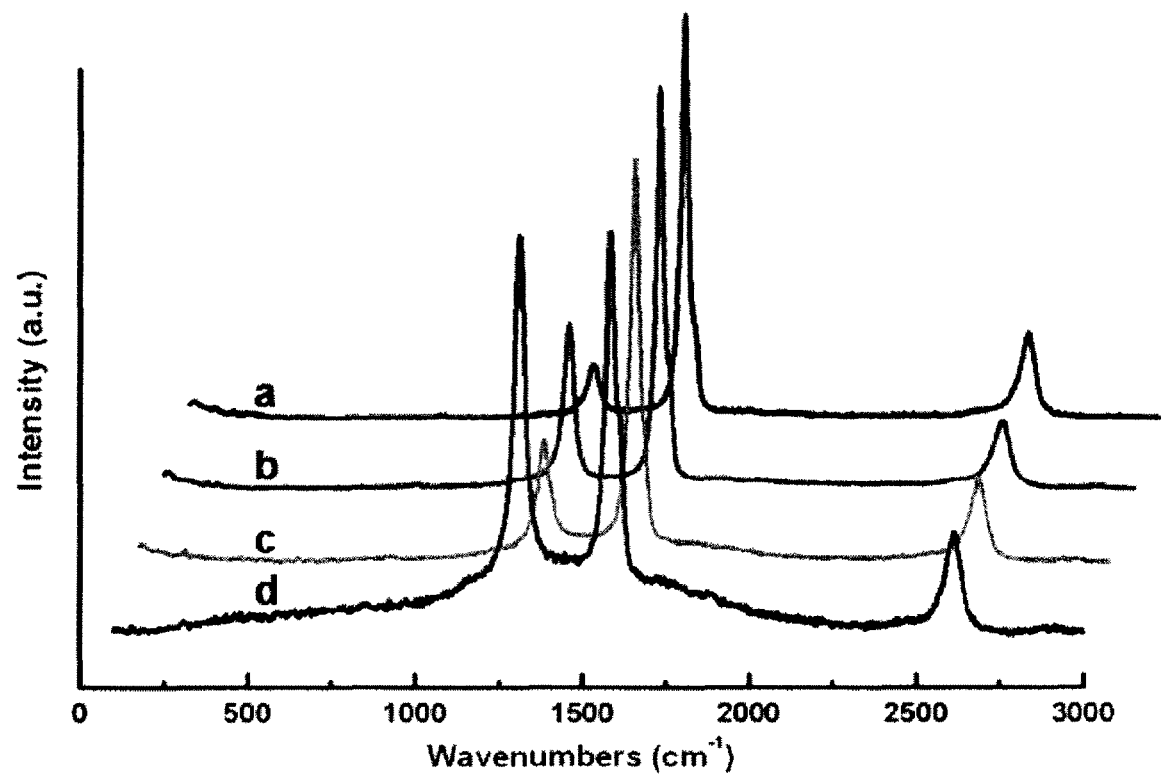
FIG. 32B is a graph of the Raman spectrometer data for the reaction mechanism described in Example 5.

Raman spectrometer was used to verify the proposed reaction mechanism. As shown in FIG. 32B, the R-value (ID/IG) of pristine CNT of 0.13 indicates the quality of CNT is very good with a lower defect density ((a) pristine CNT, (b) functionalized CNT, (c) pristine CNT sheet/epoxy composite and (d) functionalized CNT sheet/epoxy composite). After functionalization, the ID/IG value increased up to 0.41, which indicates epoxy rings formed on the structures of the CNT. For the pristine CNT sheet/epoxy composite, the ID/IG value increased to 0.30 due to the coupling with cured epoxy crosslinked networks. For functionalized CNT sheet/epoxy composites, the ID/IG value further increased up to 0.99, which further indicates much stronger interactions between the CNTs and resin matrix due to the formation of chemical bond between the functionalized CNT with the epoxy resin matrix.

Figure 33A:
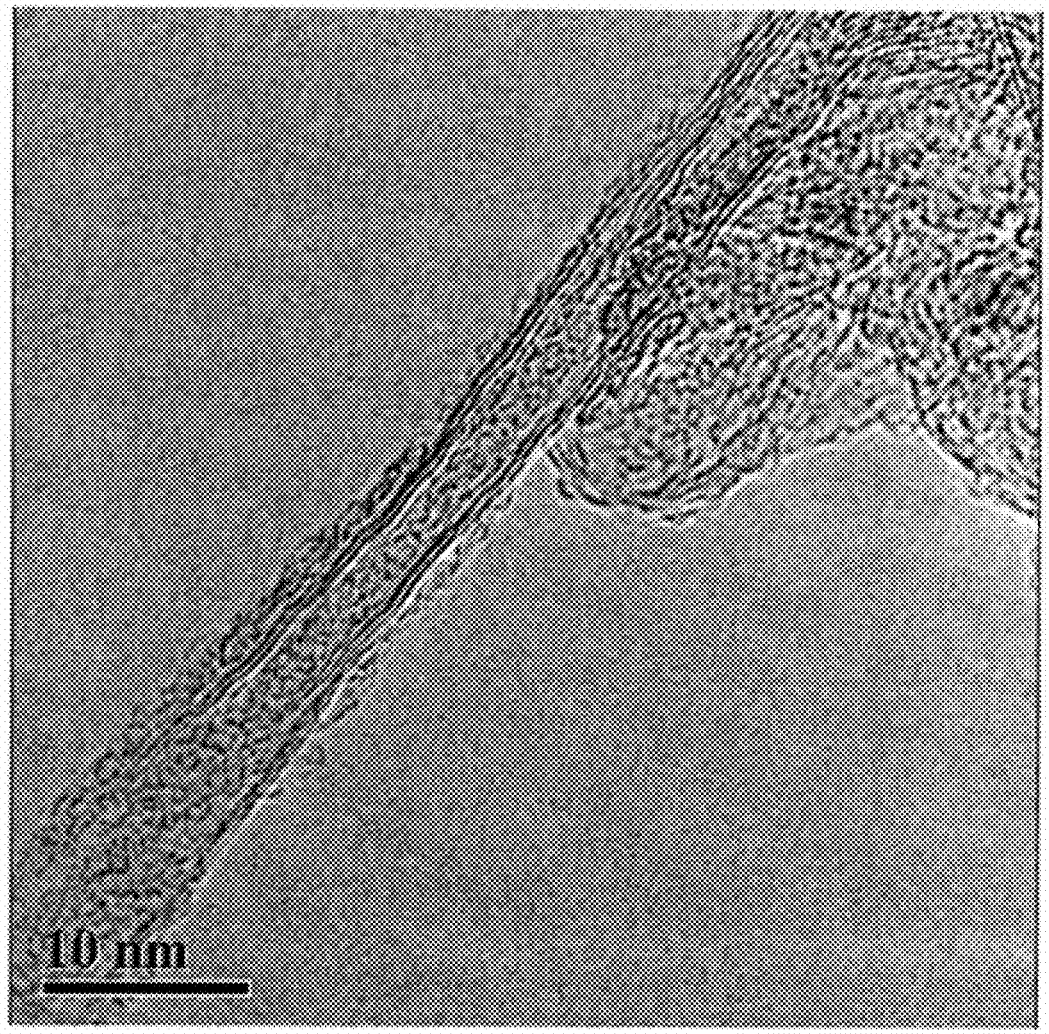
FIGS. 33A (pristine double-walled nanotube) and 34B (functionalized double-walled nanotube) are HRTEM micrographs of the samples made in Example 5.
Figure 33B:
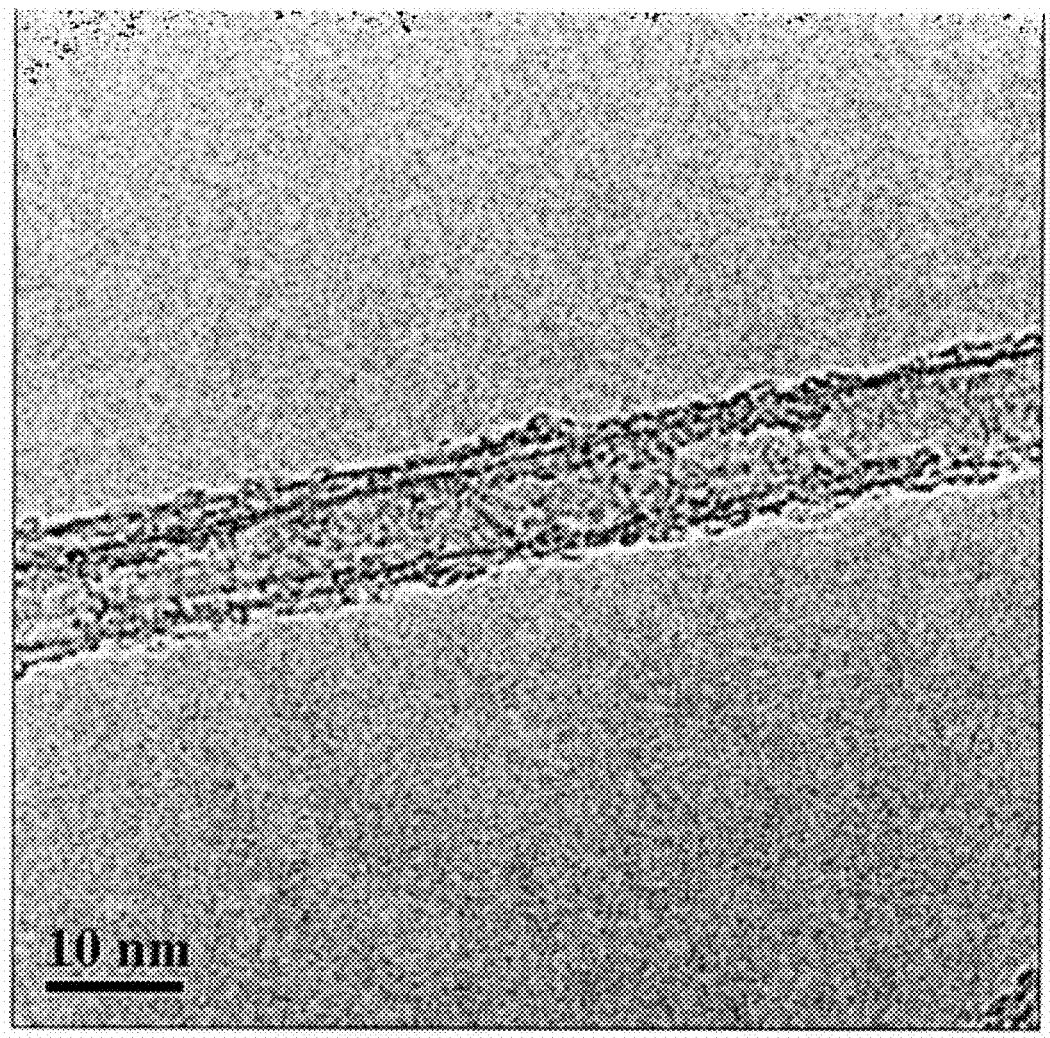

To further confirm the proposed reaction mechanism, the high resolution transmission electron microscopy (HRTEM) was conducted to observe the nanotube surface structure before and after functionalization, shown in FIG. 33A (pristine double-walled nanotube) and FIG. 33B (functionalized double-walled nanotube). Most of nanotubes used in this example are double-wall nanotubes. After functionalization, the epoxide groups are attached on the outside wall which results in the roughness of nanotube, seen FIG. 33B.

Figure 34:
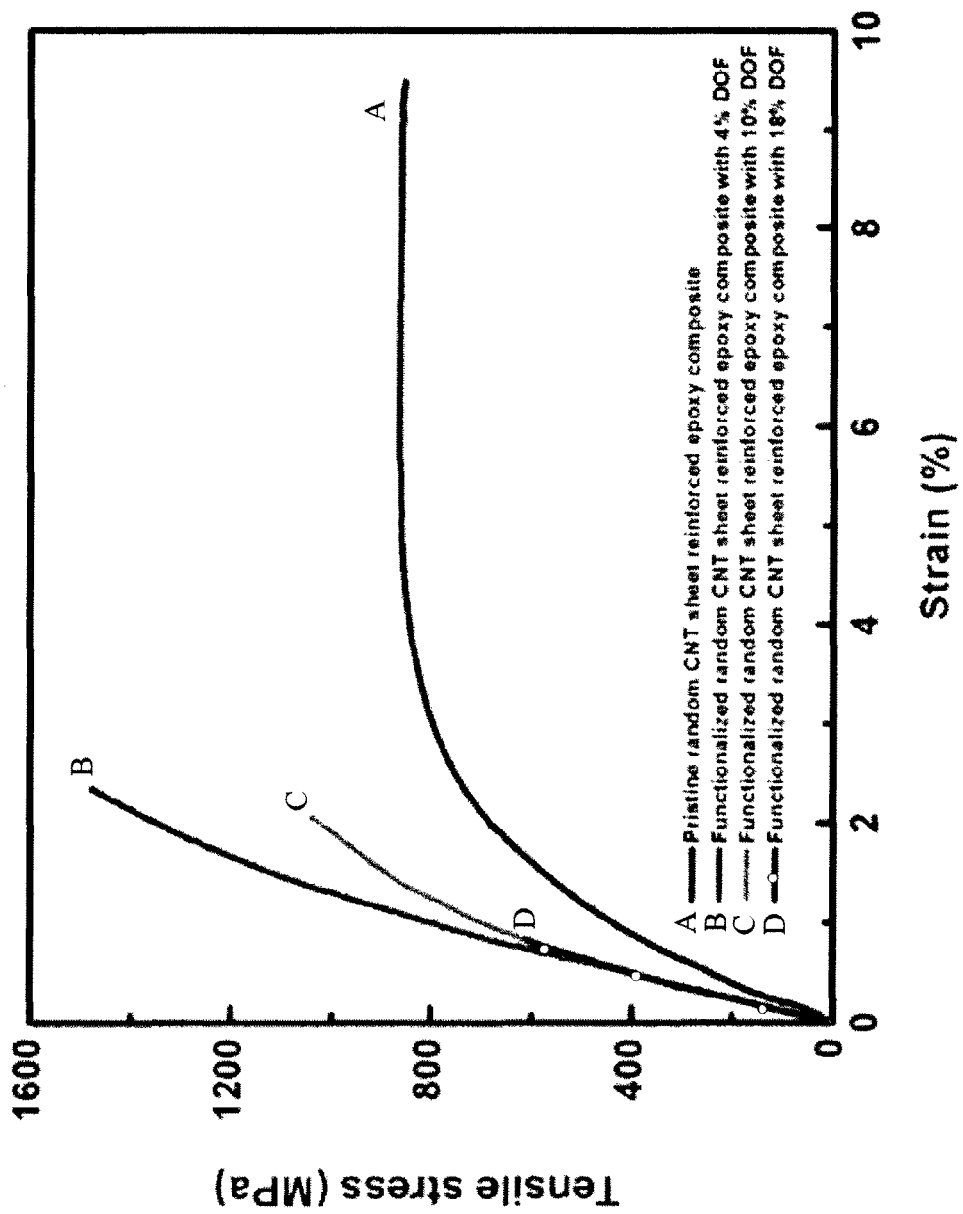
FIG. 34 is a graph of showing the mechanical properties of resultant nanocomposites of Example 5.

To study the effect of different DOF on the mechanical properties of nanocomposites, the DOF values of random CNT sheets were tailored to 4%, 10% and 18%. FIG. 34 shows the mechanical properties of resultant nanocomposites. For the pristine random CNT sheet nanocomposites, the tensile strength and Young's modulus were 851 MPa and 45 GPa, respectively. After functionalization, the Young's modulus of CNT sheet nanocomposite increased. However, for all three different DOFs, the Young's modulus was almost the same at 80 GPa. The effects of interfacial bonding enhancement between nanotubes and epoxy resin on load transfer efficiency may be at the same level for all three cases. However, the tensile strength of resultant nanocomposites with higher DOF values decreased, which indicates the high DOF damages the CNT structure and degrades the CNT mechanical properties. The 4% DOF is likely adequate to substantially enhance load transfer between epoxy resin and functionalized CNTs without large strength degradation in the resultant nanocomposites.

To quantify load transfer efficiency improvement, a DOF-load transfer efficiency model was proposed. The modified rule of mixtures (ROM) equation is used for predicting properties of discontinuous short fiber reinforced polymer composite, which assumes a perfect load transfer efficiency between fibers and resin matrix. That is not true for CNT reinforced nanocomposites, as evidenced by many CNT pull-out without breaks and very low mechanical performance. Thus, the modified the rule of mixture was used to consider load transfer efficiency effect, as shown in Equation (2).

$$E_c = \eta_0 \cdot \eta_L \cdot \eta_B \cdot V_f E_f + (1 - V_f).\quad\quad\text{Equation 2.}$$

where $E_c$, $E_m$, and $E_f$ are Young's moduli of the resultant composites, matrix and fiber, respectively. $V_f$ is the volume fraction of the CNTs. The orientation factor, $\eta_0$, was introduced to account for fiber orientation effect, which equals to 1 for fully aligned fibers. For randomly oriented fibers, the $\eta_0$ value was 0.33. The length efficiency factor, $\eta_L$, was introduced to account for the efficiency of load transfer from the matrix to the fibers due to aspect ratio effect. $\eta_L$ can vary between 0 and 1.

In this example, the length of the CNTs was approximately at the millimeter level, which is much larger than the diameters (3-8 nm) of the CNTs; therefore, $\eta_L$ as 1. Herein, the interfacial loading transfer efficiency factor, $\eta_B$, was defined and used to account for load transfer efficiency determined by interfacial bonding quality between fiber and matrix. Equation (2) was changed into a logarithmic form to obtain Equation (3)

$$1\ g(E_c-(1-V_f)\cdot E_m)=1\ g(\eta_B)-1\ g(\eta_0\cdot\eta_L)-1\ g(V_f\cdot E_f) \qquad \text{Equation 3.}$$

Figure 35A:
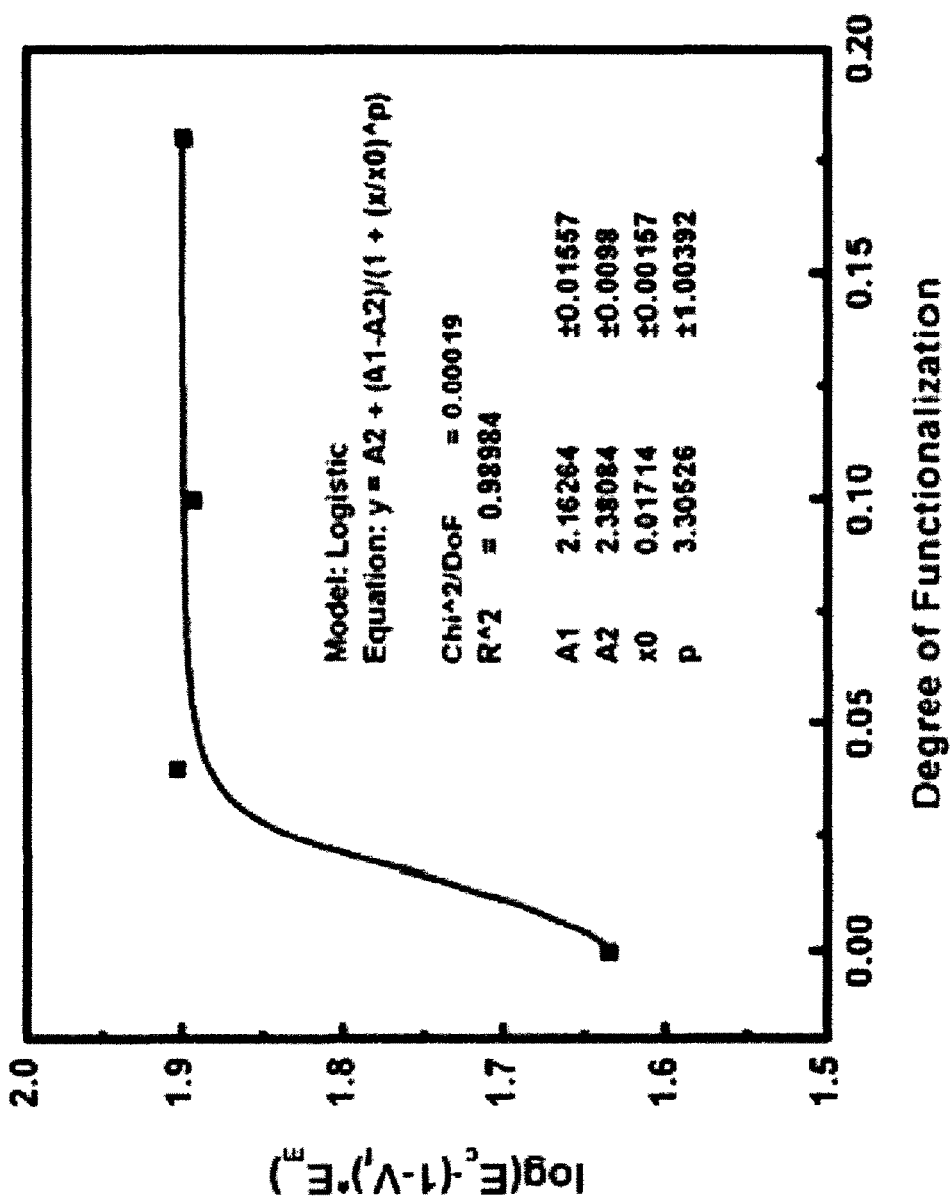
FIG. 35A is a graph showing the load transfer efficiency factor $\eta_B$ logistic fitting to determine $\eta_B$ as described in Example 5.
Figure 35B:
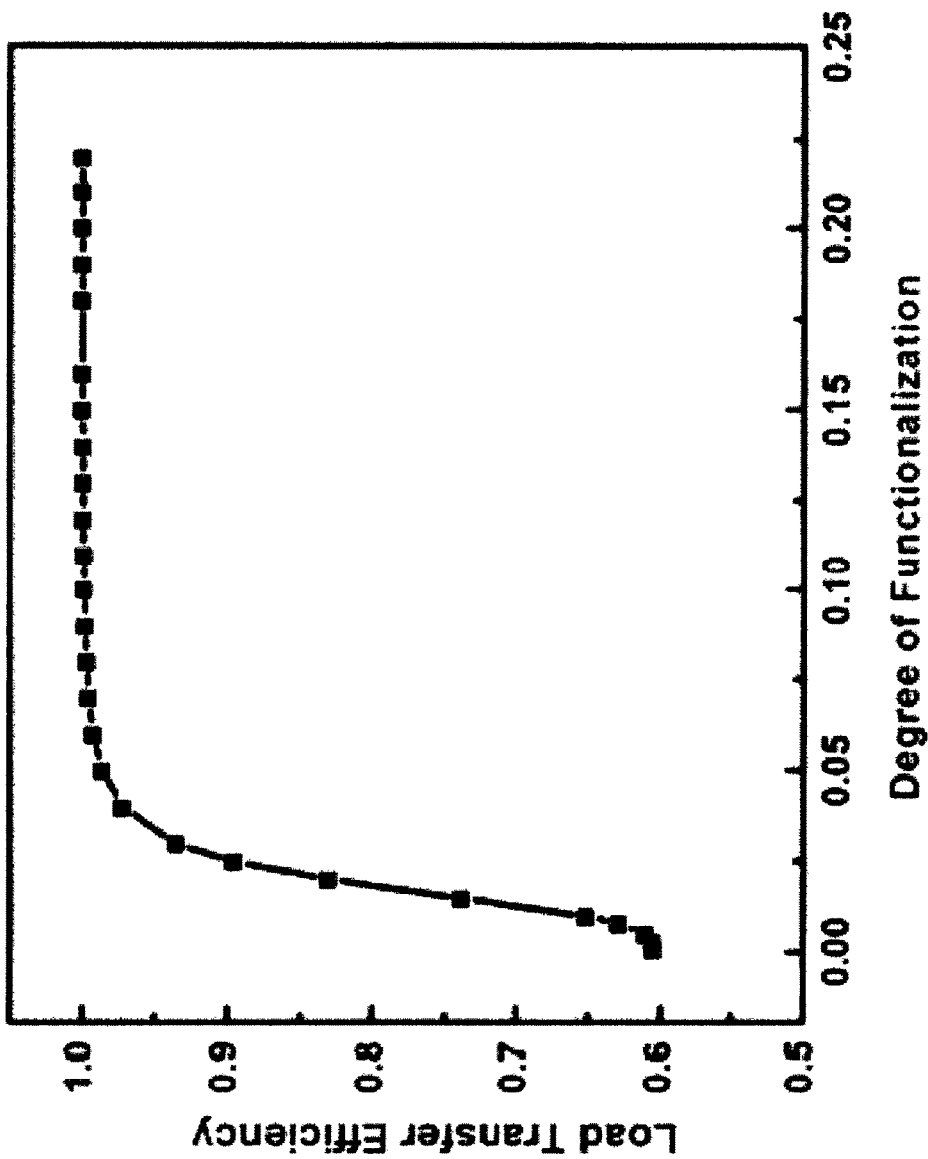
FIG. 35B is a graph showing the relationship of load transfer efficiency and DOF.

Assuming $\eta_B$ is a function of DOF, then utilizing the results shown in FIG. 34, the curve of $1\ g(E_c-(1-V_f)\cdot E_m)$ versus DOF, as shown in FIG. 35A. Through logistic fitting, the relationship between $\eta_B$ and DOF directly can be shown, as seen in Equation (4) and FIG. 35B.

$$\eta_B = 10^{\frac{-0.2182}{1+6.57\times10^5\times(DOF)^{3.3}}}. \qquad \text{Equation 4}$$

Figure 36A:
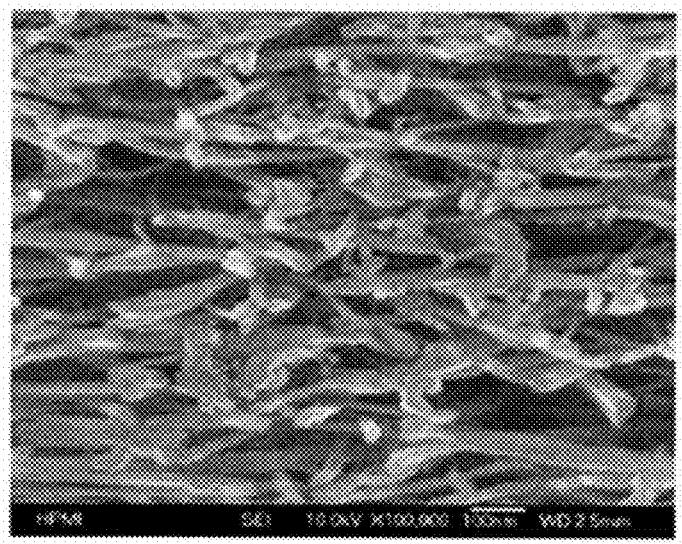
FIGS. 36A (random) and 36B (aligned) are SEM micrographs showing the cross-section of random and aligned CNT sheets made in Example 5.
Figure 36B:
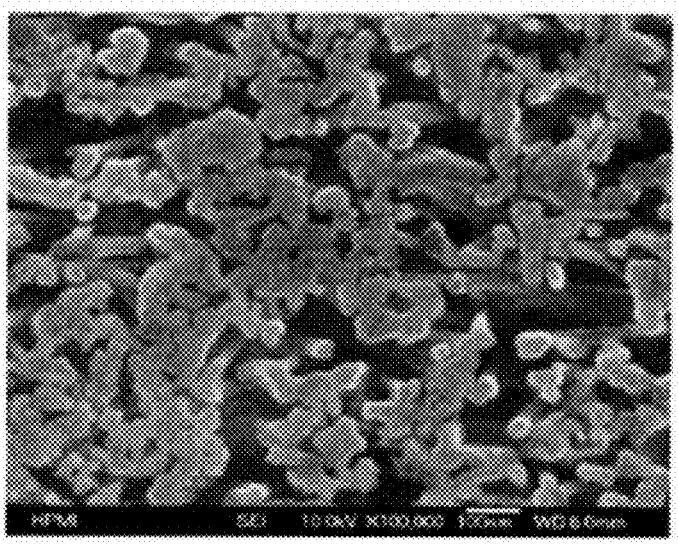

If DOF=0 and the $\eta_{B,0}$=0.605, which means the load transfer efficiency induced by nonbinding interfacial interactions is only 60.5% for the pristine CNT sheet of millimeter long nanotubes. If DOF=0.04, then $\eta_{B,0.04}$=0.972, which means the load transfer efficiency is adequate. It also shows that $\eta_B$ dramatically increased with the increase of DOF values at the beginning, then tended to become constant and saturated, which was in good agreement with other simulation results. Nanotube alignment is another factor to consider in realizing high mechanical properties as previously discussed. The sheets of randomly oriented long CNTs were stretched to about 40% strain to realize an alignment of ~80% of the CNTs along the stretch direction, as determined by polarized Raman analysis. The cross-section of random and aligned CNT sheets are shown in FIG. 36A (random) and FIG. 36B (aligned). After stretching, most nanotubes assembled along the stretching direction very well which further verified ~80% alignment degree determined by polarized Raman analysis.

Figure 37:
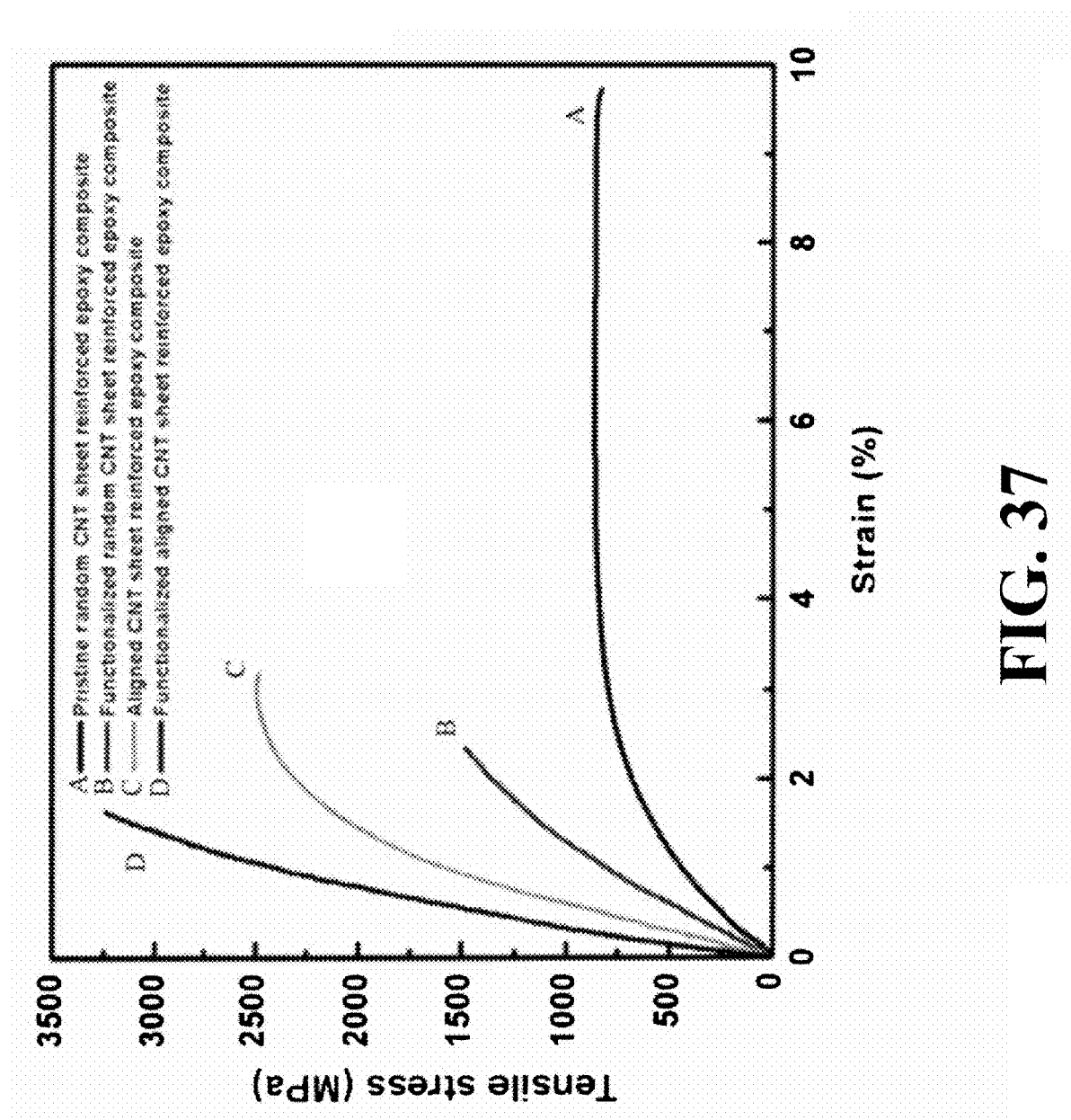
FIG. 37 is a graph showing the typical stress-strain curves of CNT sheet reinforced epoxy nanocomposites with/without alignment and functionalization as made in Example 5.
Figure 38A:
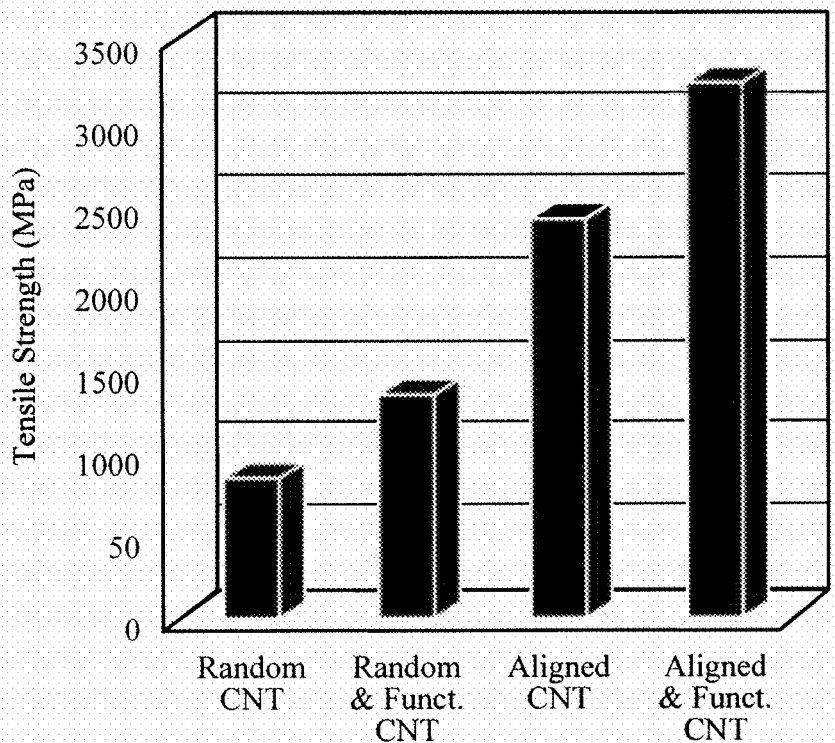
FIG. 38 shows graphs of the tensile strength and Young's modulus of random CNT sheet nanocomposites as made in Example 5.
Figure 38B:
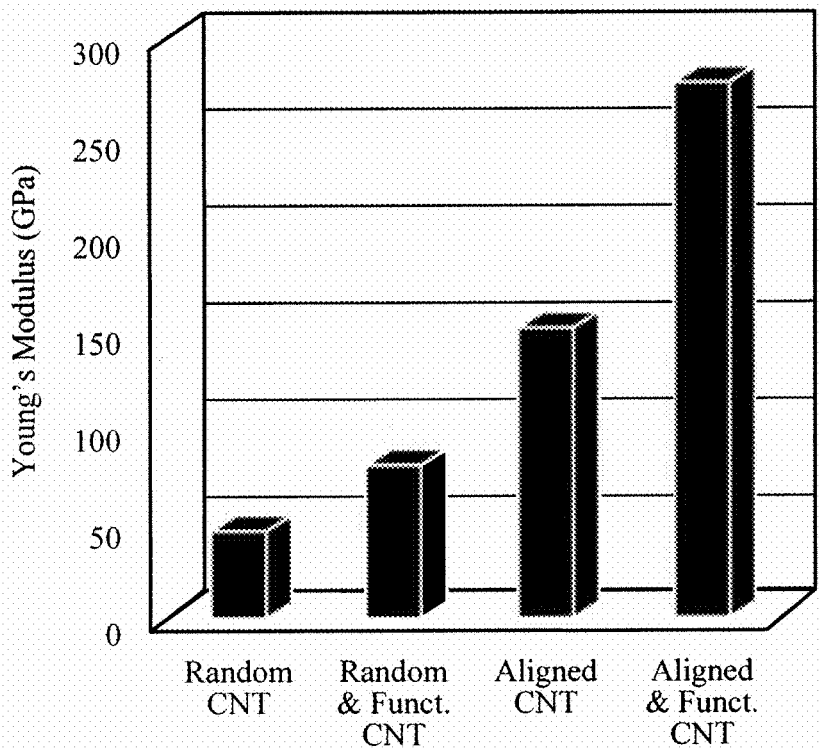

The highly aligned CNT sheet was further functionalized with a tailored DOF of 4% to achieve a better performance of CNT reinforced epoxy composites. FIG. 37 shows the typical stress-strain curves of CNT sheet reinforced epoxy nanocomposites with/without alignment and functionalization. After functionalization, the tensile strength and Young's modulus of the random CNT sheets nanocomposites increased to 1333 MPa and 80 GPa, respectively, as shown in FIG. 38. Such performance is comparable to carbon fiber fabric composites. It is worth noting that the tensile failure strain of the pristine random CNT sheet nanocomposites reached 8.21%, which is much higher than that (3.5-5%) of conventional carbon fiber fabric composites. Two possible reasons are attributed to this: (1) the pure randomly oriented CNT sheets have good deformation ability due to entanglements and slippages in the randomly oriented networks of long CNTs; and (2) possible interface slippage between CNT and resin matrix can allow large deformations of the CNT networks within the composites. After functionalization, the interfacial bonding were dramatically enhanced due to the formation of chemical bonding between CNTs and epoxy resin, which greatly constrains the slippage between CNT and epoxy resin and result in the low failure strain of resultant nanocomposites.

The tensile strength, Young's modulus and failure strain of the aligned CNT composites were 2,375 MPa, 153 GPa and 3.2%, respectively. These results exceeded the mechanical properties of AS4 unidirectional carbon fiber epoxy composites. The failure strain was double that of AS4 composites. After functionalization, the tensile strength and Young's modulus increased to 3,252 MPa and 279 GPa, respectively. This is 80% and 250% higher than the tensile strength and Young's modulus of coagulation-spun, single-walled carbon nanotubes/polyvinyl alcohol composite fiber previously reported. The failure strain of functionalized aligned CNT nanocomposites dropped to 1.6% from 3.2% due to the chemical bond formation between CNT and epoxy resin. Based on this measured Young's modulus of aligned and functionalized CNT sheet reinforced epoxy composite, an orientation factor $\eta_O$=0.8 can be had, according to the results of Polarized Raman spectra analysis, and a load transfer efficiency factor of $\eta_B$=0.972 as previously discussed.

Figure 39A:
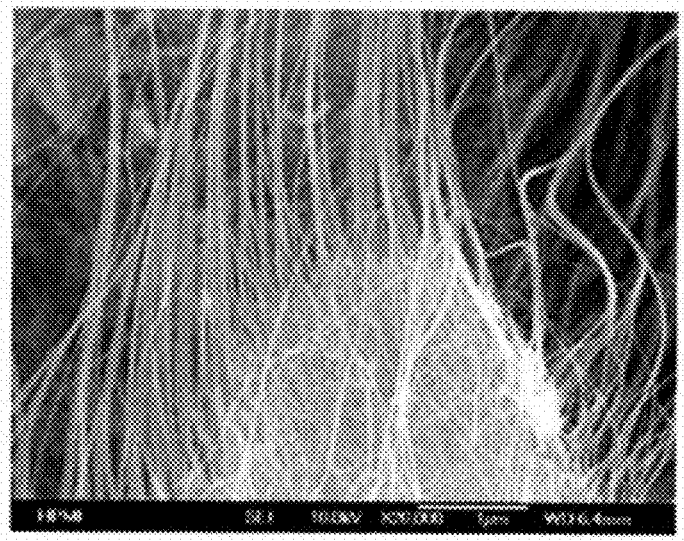
FIGS. 39A-B are SEM micrographs of the fracture surface morphology of a pristine aligned CNT sheet reinforced epoxy composite specimen as made in Example 5.
Figure 39B:
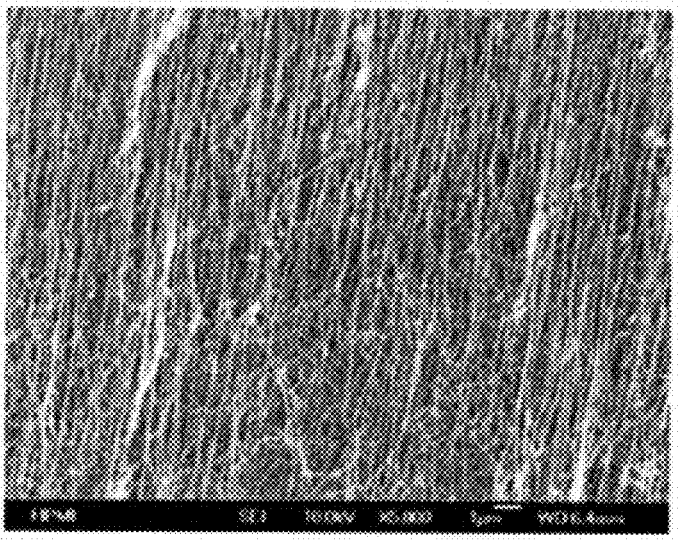
Figure 39C:
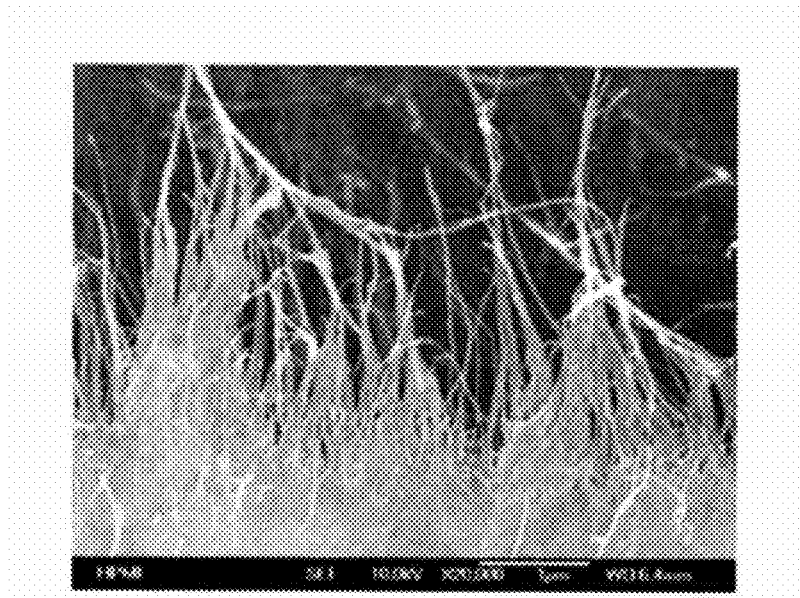
FIGS. 39C-D are SEM micrographs of the fracture morphology of a functionalized aligned CNT sheet reinforced epoxy composite as made in Example 5.
Figure 39D:
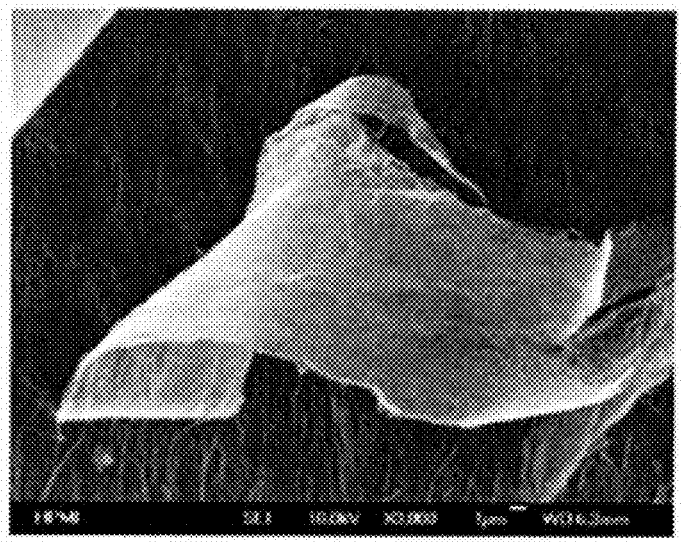
Figure 39E:
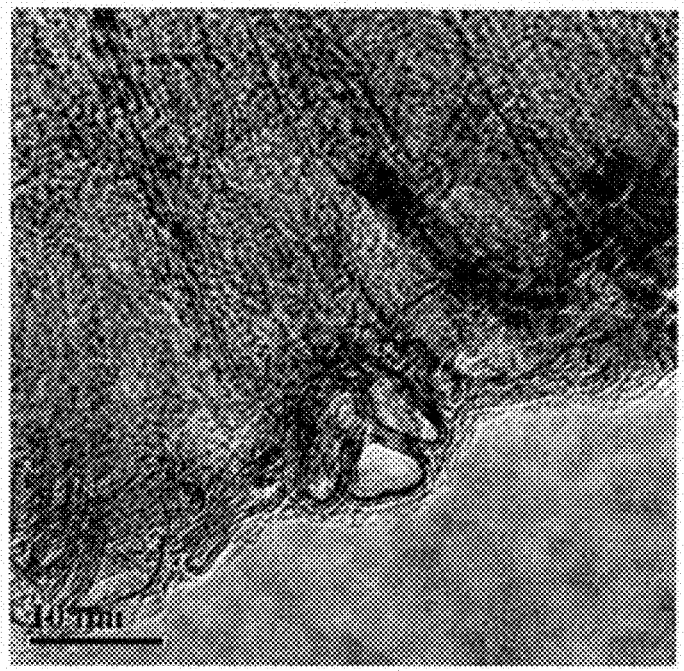
FIG. 39E is the HRTEM image of cross-section of a pristine aligned CNT sheet reinforced epoxy composite as made in Example 5.
Figure 40A:
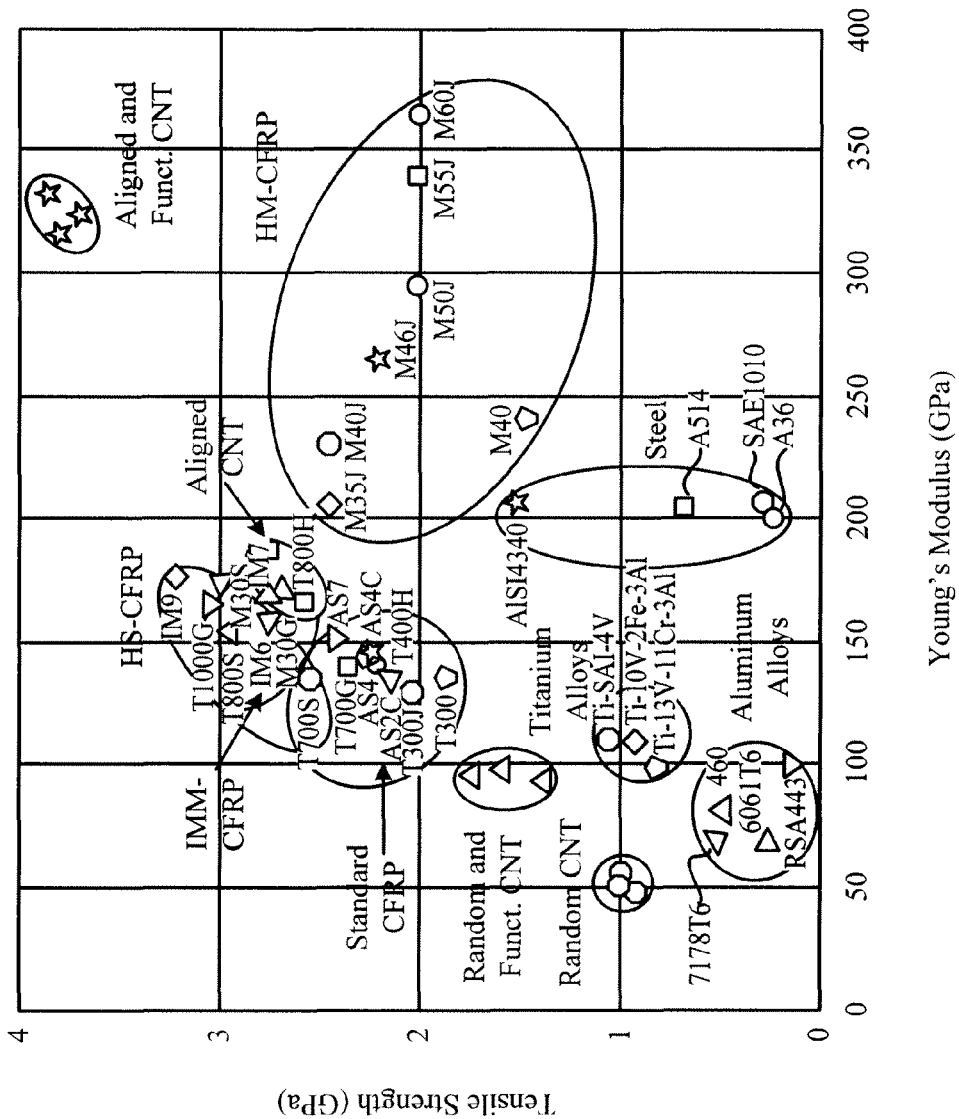
FIG. 40A is a graph of the tensile strength of the functionalized and aligned CNT composites made in Example 5 in comparison to state-of-the-art high-strength unidirectional structural CFRP systems.
Figure 40B:
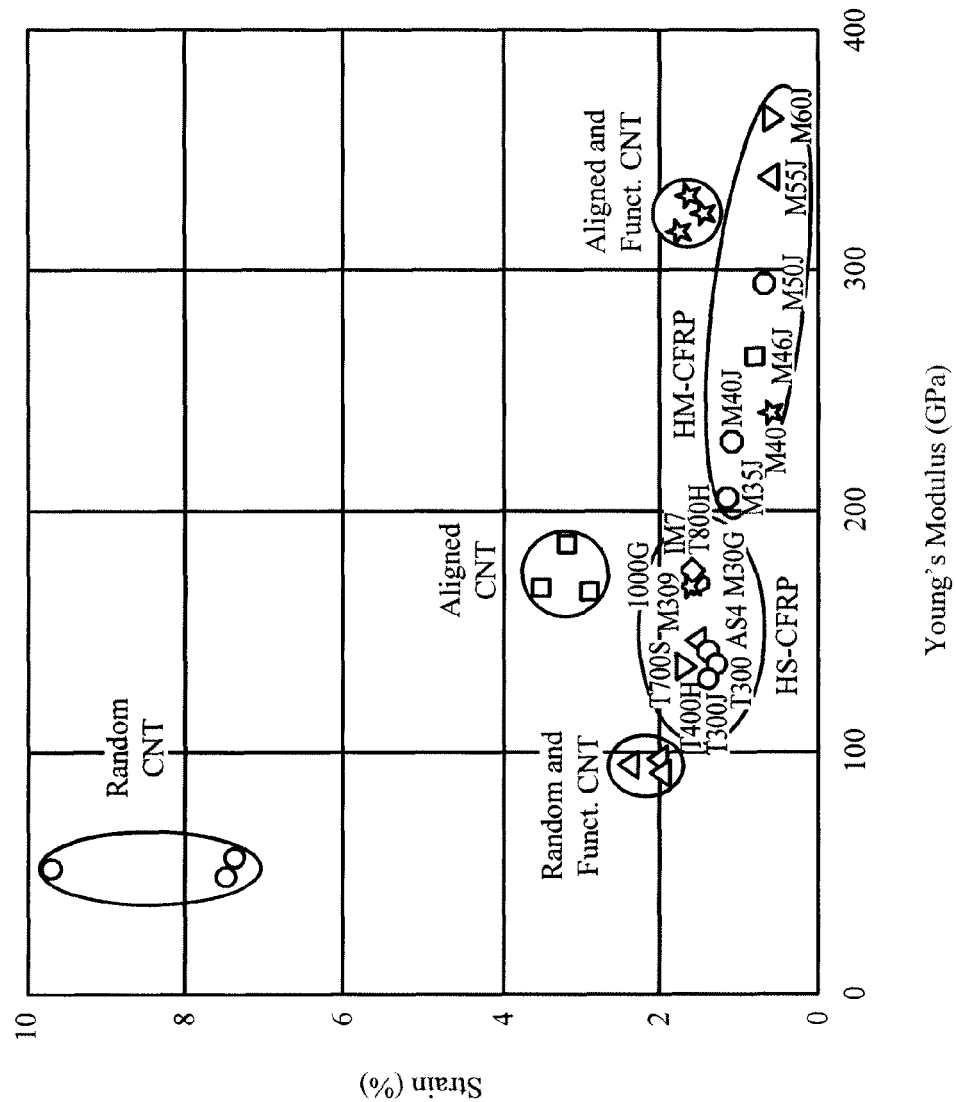
FIG. 40B is a graph showing the failure strain of the functionalized and aligned CNT composites made in Example 5 in comparison to state-of-the-art high-strength unidirectional structural CFRP systems.

Hence, Equation (2) can be used to calculate the Young's modulus of CNT bundles. The result was 714 GPa, which is consistent with the experimental values reported. FIG. 39A shows the fracture surface morphology of pristine aligned CNT sheet reinforced epoxy composite specimen after tensile tests. There are no broken nanotubes observed. FIG. 39B shows the nanotubes separated from the epoxy resin, which indicates the poor interfacial bonding between pristine CNT and epoxy resin. After functionalization, some of broken nanotubes can be observed at the fracture surface of the functionalized aligned CNT sheet/epoxy composite, as shown in FIG. 39C, indicating better interfacial bonding. FIG. 39D shows a heavily curved thin film formed of functionalized CNTs well bonded with epoxy resin peeled from the fracture surface, further illustrating interfacial bonding improvement. FIG. 39E is the HRTEM image of cross-section of pristine aligned CNT sheet reinforced epoxy composites. Most double-walled nanotubes collapsed into "dog-bone" shape and stacked very well along the alignment direction. The results reveal the intertube frictional force can be increased by a maximum factor of 4, when all tubes collapse and the bundle remains collapsed. Furthermore, the bundle will become stronger due to the significant decreasing of overall cross-sectional area for the collapsed structure. Herein, the collapsed double-walled nanotubes were observed in the pristine aligned CNT sheet reinforced epoxy composite. One reason for collapse may be the high pressure in the press of fabricating the composites. These collapsed nanotubes packed very well, which resulted in high CNT loading and high mechanical properties of CNT sheet reinforced epoxy composites. Normalized to 60% reinforcement volume fraction, the tensile strength of the functionalized and aligned CNT composites was 10-20% higher than the state-of-the-art high-strength unidirectional structural CFRP systems, such as unidirectional T1000G composites, as shown in FIG. 40A, and about 5×, 3× and 2× greater than that of aluminum alloys, titanium alloys and steels for structural applications, respectively. The Young's modulus of the resultant CNT composites was two times higher than typical unidirectional AS4, IM7, T300, T700 and T1000 CFRPs, and close to the best high-modulus CFRP systems (M55J and M60J graphite fiber composites). The strain of this nanotube composite was 2 times that of the CFRP systems at the same level of Young's modulus, as seen FIG. 40B, which is an improvement toward developing more resilient composites. The measured density of our CNT composites was 1.53 g/cm$^3$, slightly less than carbon fiber composites.

Thus, a new class of resilient, high-mechanical performance nanotube composites may be developed by utilizing extra-large aspect ratio CNTs, optimizing alignment and improving interfacial bonding. These composites will lead to uncompromised design freedom and unprecedented performance advantages for engineered systems in aerospace, automotive, medical devices and sporting goods industries. Advantages include weight reduction, high stiffness and strength, great resilience and toughness for improved damage tolerance and structural reliability, as well as high electrical and thermal conductivity for multifunctional applications.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

We claim:

1. A method for aligning nanoscale fibers, the method comprising:
   providing a network of nanoscale fibers, wherein the network of nanoscale fibers is a buckypaper that is substantially devoid of a liquid, and comprises carbon nanotubes that are randomly oriented;
   providing a supporting medium on or in the network of nanoscale fibers; and
   mechanically stretching the network of nanoscale fibers and the supporting medium in a first direction.

2. The method of claim 1, wherein the nanoscale fibers are carbon nanotubes having an average length of at least 1 millimeter.

3. A method for aligning carbon nanotubes or other nanoscale fibers comprising:
   providing a network of nanoscale fibers, wherein the network of nanoscale fibers is a buckypaper comprising carbon nanotubes that are randomly oriented;
   providing a supporting medium on or in the network of nanoscale fibers; and
   mechanically stretching the network of nanoscale fibers and the supporting medium in a first direction.

4. The method of claim 3, wherein the supporting medium comprises a flexible thermoplastic material.

5. The method of claim 4, wherein the flexible thermoplastic material comprises a polyethylene film.

6. The method of claim 3, further comprising, after the stretching, removing the supporting medium from the network of nanoscale fibers.

7. The method of claim 6, wherein the removing comprises thermally decomposing the supporting medium.

8. The method of claim 7, further comprising annealing the supporting medium before the thermally decomposing.

9. The method of claim 1, wherein the mechanically stretching is a continuous process.

10. The method of claim 3, wherein the mechanically stretching is a continuous process.

11. The method of claim 1, wherein the supporting medium comprises a flexible thermoplastic material.

12. The method of claim 11, wherein the flexible thermoplastic material comprises a polyethylene film.

* * * * *